(12) United States Patent
Scannell, Jr.

(10) Patent No.: US 10,417,298 B2
(45) Date of Patent: Sep. 17, 2019

(54) PERSONALIZED CONTENT PROCESSING AND DELIVERY SYSTEM AND MEDIA

(75) Inventor: Robert F. Scannell, Jr., Lebanon, NJ (US)

(73) Assignee: Insignio Technologies, Inc., Nashua, NH (US)

(*) Notice: Subject to any disclaimer, the term of this patent is extended or adjusted under 35 U.S.C. 154(b) by 1557 days.

(21) Appl. No.: 11/291,384

(22) Filed: Dec. 1, 2005

(65) Prior Publication Data
US 2006/0123053 A1    Jun. 8, 2006

Related U.S. Application Data

(60) Provisional application No. 60/632,643, filed on Dec. 2, 2004.

(51) Int. Cl.
*G06F 16/00* (2019.01)
*G06F 16/957* (2019.01)
*H04M 3/42* (2006.01)
*G06F 16/435* (2019.01)

(52) U.S. Cl.
CPC ........ *G06F 16/9577* (2019.01); *G06F 16/437* (2019.01); *H04M 3/42229* (2013.01)

(58) Field of Classification Search
CPC .............. G06F 17/30241; G06Q 30/02; G06Q 30/0207; G06Q 30/0205; H04M 3/42229
USPC ..... 348/207.1; 707/705, 736, 721, 724, 725, 707/732, 733, 734, 748, 751, 784, 918, 707/919, 920; 718/102
See application file for complete search history.

(56) References Cited

U.S. PATENT DOCUMENTS

| | | | | |
|---|---|---|---|---|
| 5,999,179 | A | * | 12/1999 | Kekic et al. .................. 715/734 |
| 6,038,295 | A | * | 3/2000 | Mattes ................ H04M 3/4938 348/211.3 |
| 6,101,534 | A | | 8/2000 | Rothschild |
| 6,314,457 | B1 | | 11/2001 | Schena et al. |
| 6,317,777 | B1 | * | 11/2001 | Skarbo et al. ................ 709/204 |
| 6,377,793 | B1 | * | 4/2002 | Jenkins ..................... 455/412.1 |
| 6,396,537 | B1 | * | 5/2002 | Squilla et al. ........ 707/E17.026 |

(Continued)

OTHER PUBLICATIONS

International Search Report in PCT application No. PCT/US06/43040 dated Mar. 25, 2008, 13 pages.

*Primary Examiner* — Vincent F Boccio
(74) *Attorney, Agent, or Firm* — Young Basile Hanlon & MacFarlane, P.C.

(57) ABSTRACT

A personalized content system enables a user with a communications device to convert and/or passively receive pre-selected content from multiple resources. A communications device has hardware and software to provide input and transmission to convert content from any form of media. The converted content is created by retrieving a digital copy of a digital record associated with it, and processing the digital copy for at least a web-based personalized application. Conversion is based on input of a code such as a telephone number, server program address, and a set of and/or range of characters. The transmission is communicated to at least one server that recognizes the code, the originating telephone number associated with the communications device, the device identifier associated with the communications device, and combinations thereof. The server retrieves a digital record and processes content and outputs based on user input, a user and/or program profile, and combinations thereof.

62 Claims, 13 Drawing Sheets

(56) References Cited

U.S. PATENT DOCUMENTS

| | | |
|---|---|---|
| 6,430,554 B1 | 8/2002 | Rothschild |
| 6,448,979 B1 | 9/2002 | Schena et al. |
| 6,512,570 B2 * | 1/2003 | Garfinkle et al. ............. 348/96 |
| 6,651,053 B1 | 11/2003 | Rothschild |
| 6,691,914 B2 | 2/2004 | Isherwood et al. |
| 6,732,152 B2 * | 5/2004 | Lockhart et al. ............. 709/206 |
| 6,766,296 B1 | 6/2004 | Adachi |
| 6,766,363 B1 | 7/2004 | Rothschild |
| 6,769,018 B2 | 7/2004 | Gagnon |
| 6,816,904 B1 * | 11/2004 | Ludwig et al. ............. 709/226 |
| 6,985,694 B1 * | 1/2006 | De Bonet ............. H04H 20/40 |
| | | 725/95 |
| 7,042,583 B1 * | 5/2006 | Wilkins et al. ............. 358/1.15 |
| 7,089,264 B1 * | 8/2006 | Guido et al. ............. 707/956 |
| 7,099,837 B1 * | 8/2006 | Weibel et al. ............. 705/34 |
| 7,265,779 B2 * | 9/2007 | Sato et al. ............. 455/556.1 |
| 7,307,658 B2 * | 12/2007 | Mino ............. 348/231.1 |
| 7,337,948 B2 * | 3/2008 | Melick et al. ............. 707/E17.113 |
| 7,363,024 B2 * | 4/2008 | Jenkins ............. 455/456.3 |
| 7,590,997 B2 * | 9/2009 | Diaz Perez ............. 725/109 |
| 7,606,918 B2 * | 10/2009 | Holzman et al. ............. 709/229 |
| 2002/0013727 A1 | 1/2002 | Lee |
| 2002/0021809 A1 * | 2/2002 | Salo ............. H04H 60/23 |
| | | 380/239 |
| 2002/0095333 A1 * | 7/2002 | Jokinen et al. ............. 705/14 |
| 2002/0099661 A1 * | 7/2002 | Kii et al. ............. 705/51 |
| 2002/0102996 A1 * | 8/2002 | Jenkins ............. 455/456 |
| 2002/0171670 A1 | 11/2002 | Clernock et al. |
| 2003/0023489 A1 * | 1/2003 | McGuire ............. G06Q 30/02 |
| | | 705/14.55 |
| 2003/0076369 A1 | 4/2003 | Resner et al. |
| 2003/0098790 A1 | 5/2003 | Andres et al. |
| 2003/0112949 A1 | 6/2003 | Brown et al. |
| 2003/0179090 A1 | 9/2003 | Morris |
| 2004/0003073 A1 | 1/2004 | Krzyzanowski et al. |
| 2004/0030531 A1 | 2/2004 | Miller et al. |
| 2004/0100376 A1 | 5/2004 | Lye et al. |
| 2004/0117255 A1 | 6/2004 | Nemirofsky et al. |
| 2004/0117823 A1 | 6/2004 | Karaoguz et al. |
| 2004/0135699 A1 | 7/2004 | Salzhauer et al. |
| 2004/0176958 A1 | 9/2004 | Salmenkaita et al. |
| 2004/0181404 A1 | 9/2004 | Shedd |
| 2004/0235416 A1 | 11/2004 | Chan et al. |
| 2004/0267625 A1 * | 12/2004 | Feng et al. ............. 705/26 |
| 2005/0002407 A1 | 1/2005 | Shaheen et al. |
| 2005/0038717 A1 * | 2/2005 | McQueen et al. ............. 705/27 |
| 2005/0101841 A9 | 5/2005 | Kaylor et al. |
| 2005/0108413 A1 | 5/2005 | Melmon |
| 2005/0119939 A1 | 6/2005 | Henning et al. |
| 2005/0120050 A1 * | 6/2005 | Myka ............. G06F 17/30067 |
| | | 707/999.107 |
| 2005/0239447 A1 * | 10/2005 | Holzman et al. ............. 455/414.3 |
| 2005/0256926 A1 * | 11/2005 | Muhonen ............. H04L 67/303 |
| | | 709/235 |
| 2006/0026655 A1 * | 2/2006 | Perez ............. 725/91 |
| 2006/0212899 A1 | 9/2006 | Steelberg et al. |
| 2006/0232414 A1 * | 10/2006 | Franks ............. 340/572.1 |
| 2007/0089137 A1 | 4/2007 | Clark |
| 2007/0089158 A1 | 4/2007 | Clark |
| 2007/0233732 A1 | 10/2007 | Porter et al. |
| 2008/0059288 A1 | 3/2008 | Kokernak |
| 2008/0103875 A1 | 5/2008 | Kokernak et al. |
| 2008/0114648 A1 | 5/2008 | Chen et al. |
| 2008/0167992 A1 | 7/2008 | Kokernak et al. |
| 2008/0318529 A1 | 12/2008 | Harb |
| 2009/0158316 A1 | 6/2009 | Kokernak et al. |

* cited by examiner

Step 1) User scrolls to Content and presses button below Select prompt.

Step 2) User presses button below Select prompt.

Step 4) Screen display after Step 3.

Step 3) User presses button below Select prompt.

5) Screen display after Step 4.

6) Screen display depicting Mode Functions.

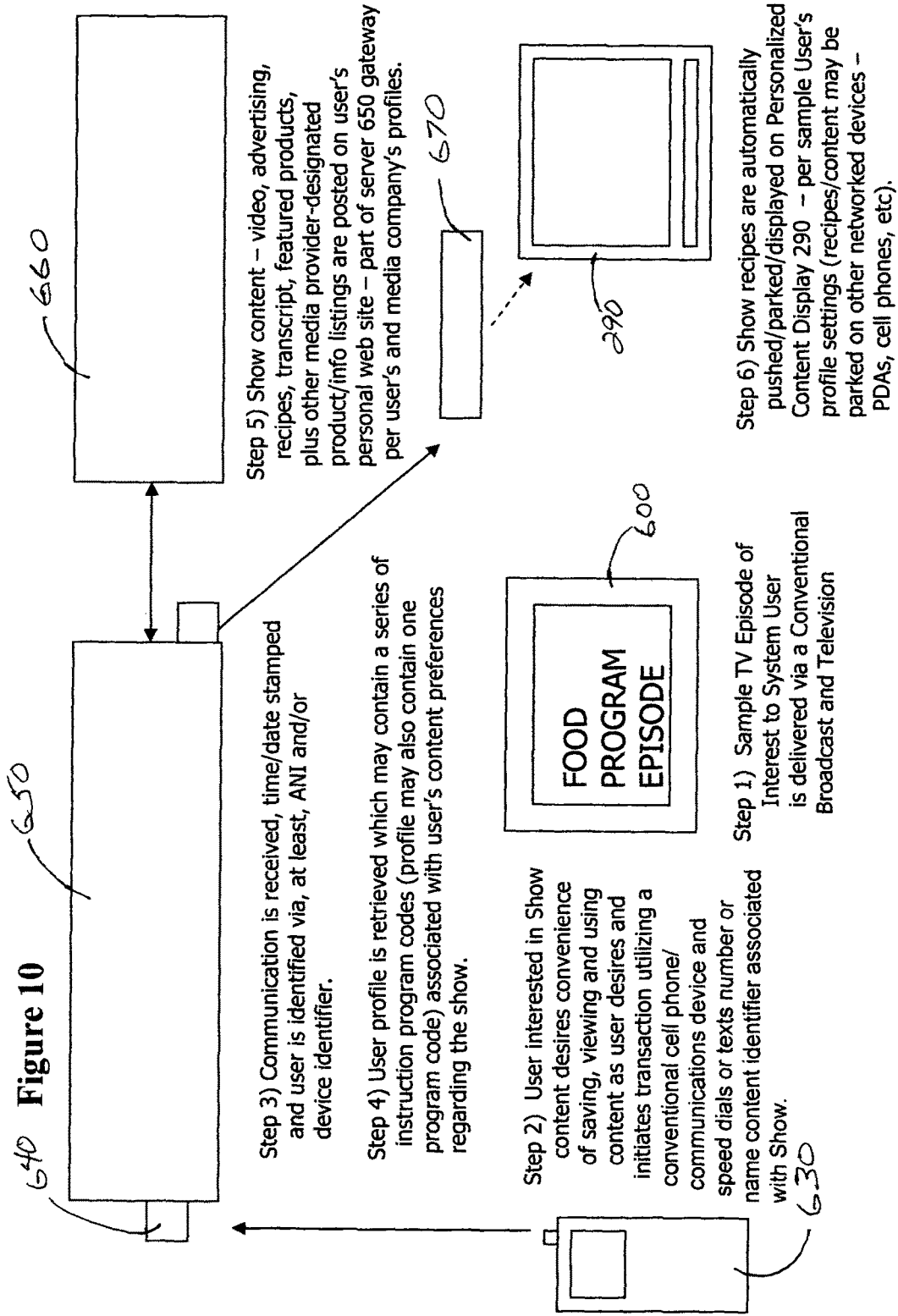

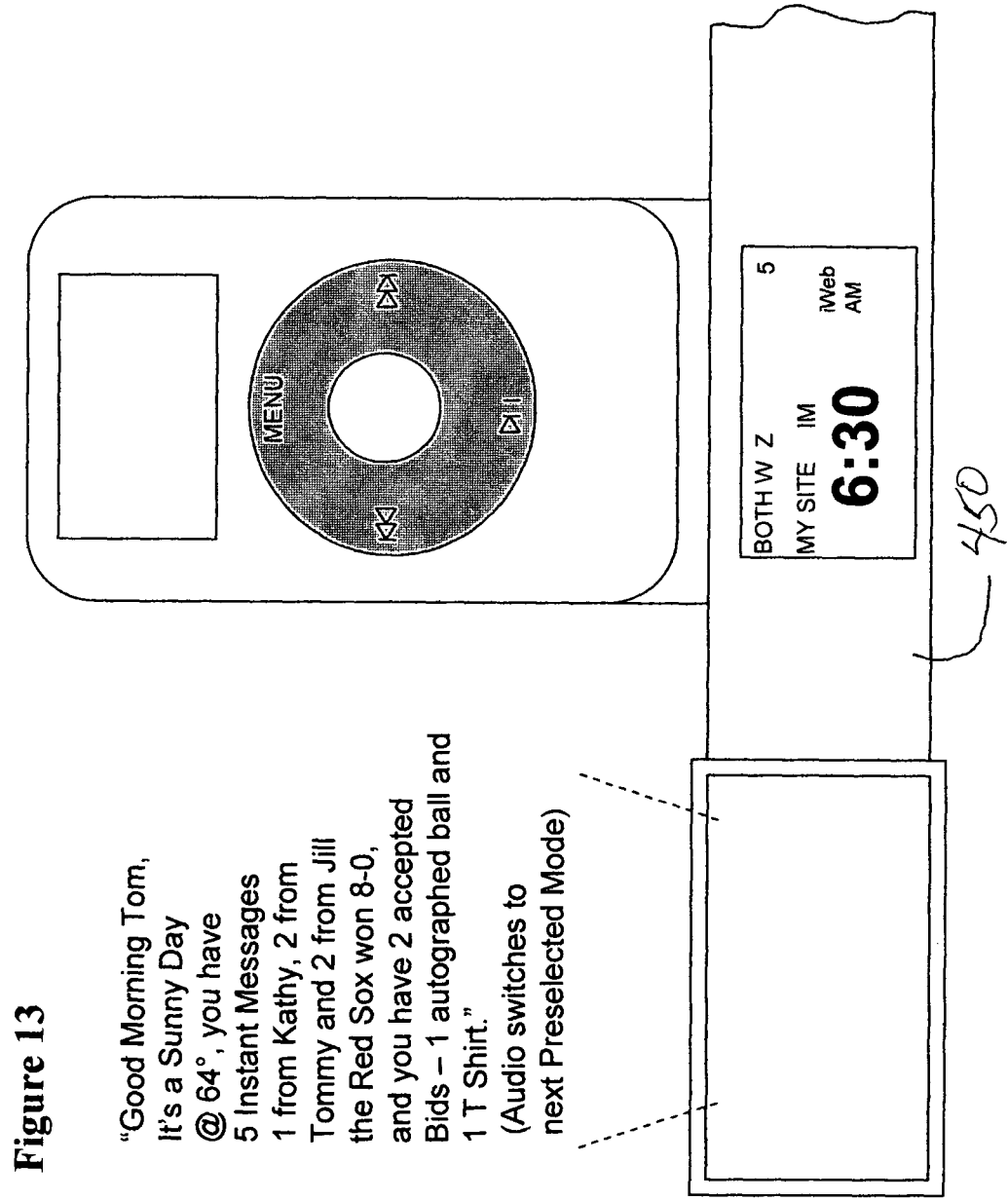

PERSONALIZED CONTENT PROCESSING AND DELIVERY SYSTEM AND MEDIA

REFERENCES TO RELATED APPLICATIONS

This application is based on and claims priority on U.S. Provisional Patent Application No. 60/632,643, entitled, "PERSONALIZED CONTENT PROCESSING & DELIVERY SYSTEM AND MEDIA" and filed on Dec. 2, 2004 by the same inventor herein. This present application is also a continuation-in-part of United States utility patent application by the same inventor herein filed on Feb. 18, 2005, entitled "MULTIFUNCTION-ADAPTABLE, MULTI-COMPONENT DEVICES", and a Ser. No. of 11/062,039, claiming priority on U.S. Provisional Patent Application No. 60/545,939, entitled, "Lighting Fixture, Switch Assembly and Enclosure With Interconnecting, Interchangeable and Modular Components" and filed on Feb. 20, 2004. Further, this present application is also a continuation-in-part of United States utility patent application by the same inventor herein filed on Apr. 7, 2005, entitled "MULTIFUNCTION-CAPABLE HEALTH RELATED DEVICES", and a Ser. No. of 11/101,066, claiming priority on U.S. Provisional Patent Application No. 60/560,908, entitled, "Multi-utility fixtures, enclosures, pedestals, and bases with interchangeable, modular, integrated and/or networked components" and filed on Apr. 10, 2004. Further, this present application is also a continuation-in-part of United States utility patent application by the same inventor herein filed on Sep. 2, 2005, entitled "MEDICAL AND HEALTH, ENVIRONMENTAL, AND SECURITY MONITORING ALERT, INTERVENTION, INFORMATION AND NETWORK SYSTEM WITH ASSOCIATED AND SUPPORTING APPARATUSES", and a Ser. No. of 11/218,948, claiming priority on U.S. Provisional Patent Application No. 60/607,961 entitled, "Medical & health, environmental, and security monitoring, alert, intervention, information network system" and filed on Sep. 8, 2004.

FIELD OF THE INVENTION

The present invention relates generally to content delivery systems and media and, more specifically, relates to methods and apparatuses for generating, customizing, processing, integrating and/or disseminating personalized, and/or logistical content through, at least, either or both visual and/or audible means. In addition, the present invention system also utilizes processing and application economy by comprising an innovation described herein as information and device controller embodiments that are adapted for supporting not only the preceding personalized and logistical content, but also in activating, operating and/or interacting with other apparatuses and content in a variety of modes by receiving, processing and disseminating command, and/or instruction set content, as well as content identifiers (as described herein) in accordance with user or users' preferences.

One of the primary utilities of said information and device controller is to provide an infrastructure and capability for unique products and/or services with or through software and networking means to enhance a work, living, and/or dwelling area when networked and interacting with other present invention components to support widespread system acceptance. One of the keys to achieving such widespread acceptance of the present invention embodiments, especially in a networked means, is offering such embodiments, such as but not limited to, the controllers, in conjunction with at least one associated apparatus, such as, but not limited to, a present invention personalized weather and information system, to provide for a compelling framework and value whereby such present invention embodiments (for example, said controller), when coupled with such associated apparatus (for example, personalized weather and information system), offers a new utility and a bridge for more utilities, applications, and a means for widespread acceptance of the present invention system described herein and its associated embodiments.

One of the primary utilities of the present invention system content identifiers is to facilitate the selection, processing and dissemination of personalized and logistical content from a variety of media and other sources with and over a variety of devices, including, but not limited to, the present invention devices and components described herein to support widespread acceptance of the present invention system.

INFORMATION DISCLOSURE STATEMENT

The following patents are of interest to the present invention:

U.S. Patent Application Publication No. US 2005/0101841 A9 describes a healthcare network is provided for sharing information concerning the health of a user with at least one outside source, the network including a biosensor associated with the user that generates a biosensor signal containing the information; and a personal data control means including receiving means for receiving the biosensor signal, input means for receiving a privacy input from the user, and output means for generating a response signal based on the biosensor signal and privacy input. The network also includes a data allocation and processing module including means for receiving the response signal, and means for generating and directing an output signal to the at least one outside source, wherein the module is responsive to the response signal, and wherein the availability of the information to the at least one outside source is responsive to the privacy input.

United States Patent Application Publication No. US 2005/0002407 A1 describes a method and apparatus delivering voice/data services within a piconet operating over a limited range or over a WLAN communicating with 3GPP devices by reformatting data into IP format before delivering to the WLAN. The service is short message service (SMS). Upon receipt of an SMS message, relevant routing information is retrieved. A PDGW address for the SMS message is identified and is sent to the PDGW address which identifies the WLAN user equipment (UE) for receiving the SMS and reformats the SMS message into IP format (text or encapsulation) for delivering to the UE. A protocol architecture is provided for SMS delivery over WLANs, in particular, for UMTS/CDMA based SMS over WLAN through two alternative mechanisms, i.e., SMS tunneling and SMS proxy, for protocols for the delivery of SMS across the WLAN. The invention enhances standard 802.11 in the context of UMTS and CDMA 2000; as well as other scenarios.

United States Patent Application Publication No. US 2004/0235416 A1 describes an apparatus, and an associated method, for facilitating personalization of a weather band radio that receives SAME messages broadcast by the NWR system. Alphanumeric indicators of locations are displayed upon a user display element. And, a listener of the radio enters, by way of a user input actuator, selection of selected geographical areas, identified by the alphanumeric indicators. The selected alphanumeric location is used to form a six-digit location code defined by the Federal Information Processing Standards (FIPS). And, the code so-formed is used by the weather band radio, selectably to alert weather anomalies broadcast by the NWR system within the selected geographical area of interest.

United States Patent Application Publication No. US 2004/0181404 A1 describes this device uses a communication link to obtain audio weather information then uses a voice recognition means to convert the audio weather information into text, then converts this text information into display information. This device uses a means selecting means to evaluate the text and determine what text is to be displayed. This device uses a display to display weather information. This device displays weather information and, can play aloud the transmitted broadcast.

United States Patent Application Publication No. US 2004/0135699 A1 describes in accordance with embodiments of the present invention, a method for alerting a quiescent person, may include recording a personal alert message, receiving an alarm over a wireless communications link, and, in response to the alarm, playing the personal alert message. In accordance with other embodiments of the present invention, a device for alerting a quiescent person may include an audio input to record a personal alert message, a memory to store the personal alert message, an audio output to play the personal alert message, a wireless receiver to receive an alarm, a power supply and a processor, coupled to the audio input, the audio output, the memory, the wireless receiver and the power supply. The processor may be adaptively configured to receive an alert signal from the wireless receiver, and in response to the alert signal, send a play signal to play the personal alert message.

United States Patent Application Publication No. US 2004/0100376 A1 describes a wireless healthcare monitoring system and method are provided. At least one UWB biosensor transmitter is assigned to at least one individual to be remotely monitored. The biosensor transmitter includes a biosensor disposed to detect a health condition of a user and generate a corresponding biosensor reading. The reading is converted by the biosensor transmitter to an ultra wideband (UWB) biosensor signal transmitted by the biosensor transmitter. A UWB receiver disposed remote from and within range of the transmitter receives and converts the UWB biosensor signal to a signal containing information from the biosensor reading. A processor in communication with the UWB receiver processes and displays the converted signal as a readable output indicating a health condition of the user detected by the biosensor.

United States Patent Application Publication No. US 2004/0030531 A1 describes an automated system and method for monitoring and supporting and actor in an environment, such as a daily living environment. The system includes at least one sensor, at last one effector and a controller adapted to provide monitoring, situation assessment, response planning, and plan execution functions. In one preferred embodiment, the controller provides a layered architecture allowing multiple modules to interact and perform and desired monitoring and support functions.

United States Patent Application Publication No. US 2004/0003073 A1 describes a control server, or similar central processor, manages the distribution of data (including audio and video), voice, and control signals among a plurality of devices connected via a wired and/or wireless communications network. The devices include audio/visual devices (such as televisions, monitors, PDAs, notepads, notebooks, MP3, portable stereo, etc.) as well as household appliances (such as, lighting ovens, alarm clocks, etc.). The control server supports video/audio serving, telephony, messaging, file sharing, internetworking, and security. A portable controller allows a user to access and control the network devices from any location within a controlled residential and/or non-residential environment, including its surrounding areas. The controllers are enhanced to support location-awareness and user-awareness functionality.

United States Patent Application Publication No. US 2003/0179090 A1 describes environmental condition detector with audible alarm and voice identifier. Due to the presence of various environmental condition detectors in the home and business such as smoke detectors, carbon monoxide detectors, natural gas detectors, etc., each having individual but similar sounding alarm patterns, it can be difficult for occupants of such dwellings to immediately determine the specific type of environmental condition that exists during an alarm condition. The present invention comprises an environmental condition detector using both tonal pattern alarms and pre-recorded voice messages to indicate information about the environmental condition being sensed. Single-station battery-powered and 120 VAC detectors are described as are multiple-station interconnected 120 VAC powered detectors. The pre-recorded voice messages describe the type of environmental condition detected or the location of the environmental condition detector sensing the condition, or both, in addition to the tonal pattern alarm. Provisions are made for multi-lingual pre-recorded voice messages.

United States Patent Application Publication No. US 2003/0112949 A1 describes a method, system, and program for identifying parties to a call to an incoming calling party. A context for a current call is identified, wherein the context comprises at least an identity of a caller and an identity of a callee to the current call. An identifier for an incoming calling party to the current call is identified. The context is filtered according to the identifier for the incoming calling party. The output of the filtered context to the incoming calling party is controlled.

United States Patent Application Publication No. US 2003/0098790 A1 describes an apparatus for the detection of enunciation of hazardous conditions within an environment comprises at least two detection circuits positioned to sense ambient conditions within a home or business environment. One of the detection circuits senses the presence of smoke, and the other detection circuit senses the presence of carbon monoxide. The apparatus also comprises an alarm circuit which is responsive to each of the detection circuits for generating at least one alarm pattern, and preferably a separate alarm pattern for each different sensed condition. A voice synthesizer circuit is also included, and is responsive to each of the detection circuits for generating at least one voice message. As with the alarm patterns, the voice synthesizer preferably generates separate voice messages for each separate detected condition. The apparatus advantageously also contains an interleaving control circuit. This interleaving control circuit interleaves the alarm patterns and voice messages in a predetermined sequence to reduce confusion in an emergency situation. A method for the detection and enunciation of multiple hazardous condition within an environment is also presented, and comprises the steps of: (a) sensing ambient conditions within the environment to detect at least two hazardous conditions; (b) generating an alarm pattern and a voice message in response to sensing the hazardous conditions; (c) interleaving the alarm pattern and the voice message; and (d) enunciating these interleaved alarm patterns and voice.

United States Patent Application Publication No. US 2003/0076369 A1 describes in a system and method for the display, or presentation, of electronic information in an ambient, or pre-attentive, form, a centralized server converts textual or quantitative data into a form suitable for remotely located non-textual ambient displays, or objects. The conversion, or translation, of the information occurs in response to a set of rules which may be fixed at the server, or otherwise modifiable by a user of the display, for example via Web-based interface, or at the display itself. The translated data, referred to herein as "ambient data" is in compressed, encoded form, so as to optimize the efficiency of its periodic transmission of such data to multiple remotely located recipient displays. In one example, the display comprises an analog-type gauge having a hand that varies in angular or linear offset, or multiple hands that independently vary in angular or linear offset, in response to the received ambient data. In another example, the transmission of data from the information server to the ambient displays occurs via a one-way or two-way wireless network.

United States Patent Application Publication No. US 2002/0171670 A1 describes a personalized data delivery system for dynamically integrating viewer-specified data with visual content includes an input port for receiving a visual content signal, an output port for displaying enhanced visual content on a display screen, and an interface operatively coupled to the input port and the output port. The personalized data delivery system may also include an input/output port for receiving data from a data content source other than the visual content signal and/or for sending requests for viewer specified data to the data content source. Parameters for the selection and display of data can be customized by the viewer. The interface includes at least one processor being responsive to one or more viewer personalization parameters and operative to integrate at least a portion of the received data with the visual content signal in accordance with the personalization parameters. Memory included in the interface and coupled to the processor at least temporarily stores the personalization parameters.

SUMMARY OF THE INVENTION

The World Wide Web and other software, processor, memory and communications technology applications have provided the means to facilitate the widespread generation and dissemination of personalized content Such content consists in a variety of embodiments, from targeted advertising generated from a search engine inquiry to user-selected music downloads. Such web content is also generated from user device/software information such as cookies to support a variety of applications, for example, from local weather to certain sports and/or financial results based on pre-selected criteria.

The means for accessing and viewing such visual content is typically through a variety of personal computer, PDA and/or smart phone devices. There are also recent innovations for integrating and viewing such or like content through a television or video broadcast. While these devices are useful, they are limited in the context of having the user either turn on such device or leave such device on to access such information. Even with such device on, the current processes associated with accessing or waiting for such information to be accessible through devices such as personal computers, PDAs or cell phones may not provide for the most efficient means for common or preferable information access. Other devices are available to help facilitate the viewing of certain information such as a watch that displays content such as weather and other like information where such content is transmitted to such watch via a subscription based-radio broadcast service. While helpful, such information is limiting relative to personalized content and said service is only available in certain metro areas.

Audio content such as weather and traffic information is typically broadcast over a variety of radio channels at certain periods or intervals on a frequent basis such as through weather radios or even from metro radio stations, especially during rush hour. Though there are technologies available for replaying such content in the event that the user wants such information repeated, the user is not able to access such information in an on-demand manner unless the user accesses such information, such as traffic, through his/her cell phone upon which he/she typically is prompted to access such desired information. Such means may be cumbersome and detrimental for the user, especially while such user may be driving a vehicle. Another means for accessing traffic information is through a visual means via a smart phone type device where such device and associated system utilizes GPS technology to facilitate the personalization and/or relevance of the traffic content; however, it is typically displayed in a map format with sometimes hard to read graphic and/or text information. Again, such content is also limiting relative to the personalization context towards the user experience, such as not providing a means to propose alternate routes or to suggest the user to make a stop at a user's preferable restaurant or store that may be in close proximity where such device or system suggestion is generated from a pre-selected set or threshold of parameters such as, for example, a traffic backup condition. In the home or office, common visible or audible content apparatuses, from weather displays to alarm radios, are limited by the type and frequency of content communicated by such devices. Innovations such as orbs, which display different colors in association with the type and content of pre-selected information received and processed, are helpful indicators for users to quickly comprehend information at a glance; however, they are limited in the context of providing any deeper content, as well in providing content associated with the immediate surrounding area.

Given the limitations that the above devices have in delivering personalized content to the user in an efficient and substantive manner, there is a need for a system which may include apparatuses and methods for receiving, processing and disseminating content that is personalized for the end user in either or both visual and/or audio form to facilitate the user's use of such content in an efficient manner when such user desires such information in the format and frequency he or she desires. In addition, there is also a need in the area of personal health, medical, aging, or environmental safety or security related matters for a user or user relation to desire to receive information that may facilitate help for such user as it pertains to certain conditions associated with such preceding matters. The latter is considered a vital component when addressing solutions for providing a more substantive, ergonomic, efficient and economic means for utilizing personalized content in a variety of optimal manners for a breadth of applications.

The present invention system comprises a variety of embodiments for addressing the preceding needs and limitations. In addition, such present invention system may also comprise one or more embodiments to perform one or more of the following: receive, process and/or disseminate a variety of information from a variety of network mediums in standalone or combined form, such as but not limited to, web-based, local area network-based, or wide area network-based, even in instances or embodiments where such user does not necessarily require an Internet connection. For example, among a variety of embodiments, a user may receive pre-selected content for display on his/her television at his/her home through a present invention server or device controller where some content may be delivered through a cable box via a portion or frame of a broadcast signal, other content may be sourced from a personal weather station system, while still other content may be generated from a network addressable environmental or medical sensor. In another example, a user in his or her automobile may utilize a present invention device controller or server or combination thereof, which may receive and process local network (within or in proximity to the car) car sensor, voice command and/or GPS information along with radio transmission (such as, but not limited to, digital satellite radio, FM, RDS, sub-channel or HD broadcast radio) content such as traffic and, as a result of such information processing, provide the user with options such as alternate route or stopover destinations in the event of a traffic backup associated with such user's commute.

In addition, said present invention system may also comprise apparatuses and associated components adapted for providing personalized content in an integrated on demand or pre-selected frequency or hierarchical format, where such demand may be user invoked, system invoked (given predetermined parameters, such as, for example, an emergency condition) or apparatus generated (for example, a smoke detector and alert apparatus) content conditions in an economical and ergonomic manner to support widespread user acceptance.

An example of an application that may utilize said present invention user-invoked means for providing personalized content in an on-demand context wherein said application does not necessarily utilize a traditional Internet connection (even though the present invention embodiments may utilize traditional Internet connections) is a use of present invention (a) content identifier(s) that may enable a commuter interested in the content of a radio program to engage or access said content, wherein said content may be, but not limited to, advertising, program, or program service or product content or combinations thereof, such as, but not limited to, a book associated with an author who may be interviewed on said radio program. In this example, said radio program's announcer may communicate to his/her entire listening audience a telephone number (which may be utilized as a present invention system content identifier) and said present invention content identifier(s) associated with said program, book or combination thereof, wherein said telephone number may be associated with a present invention web server port or gateway pertaining to said program or radio station or radio network or present invention service or combinations thereof, and said other content identifier(s) may be associated with, but not limited to, the preceding, as well as said book. Upon hearing said number, book and, potentially, other content identifiers, wherein said number may be programmed as a speed-dial contact number in said commuter's cell phone, said commuter may perform at least one of a variety of functions (pending on the functionality of said user's cell phone or communications device, including, but not limited to communications devices adapted for said present invention system). At a basic functionality level, said commuter may dial, text and/or voice command said telephone (or text address) number. Upon the connection of said call originated from said cell phone device, said present invention server may comprise an interface and associated program for capturing the ANI and/or a device or user identifier associated with said cell phone and/or user. Said identifier may be the input for a server program to generate a user profile search.

Upon the retrieval of said user profile, the server program may generate an interactive session with said user and/or said user's device or combination thereof, wherein said interactive session accounts for the server receipt of at least, said content identifier(s). It is to be appreciated that said server program may comprise a variety of screening and interface programs, including, but not limited to, programs that account for interacting with a user who may not have an associated user profile and/or who may utilize a privacy feature associated with his/her respective cell phone service which may block the communication of an ANI transmission. Upon the input of the content identifier(s), the user may receive a confirmation of said input and said user may input a character such as, but not limited to, an asterisk to complete the session and/or perform a variety of functions associated with said content.

One of the outputs and/or outcomes (out of many outputs) of said session may enable the user to retrieve said program or program information (including, but not limited to, book information, as well as a book download or book purchase) at a more convenient time. Said retrieval may be performed through a variety of means, which will be described in further detail herein.

It is to be appreciated that the communication of said telephone number and content identifier(s) may be performed through alternative means adapted for the present invention system in place of or to complement the communication from the radio program announcer. For example, said number for the present invention server and content identifier information may be transmitted via the radio transmission broadcast signals (such as, but not limited to, via RDS). It is also to be appreciated, as described herein, that said present invention information may also be communicated from a radio receiver appliance adapted for the present invention system and/or present invention device controller to a user's cell phone adapted for the present invention system via a, but not limited to, a Bluetooth interface. It is also to be appreciated that the reference to a server in the preceding example may account for a series of servers and/or networked apparatuses and associated programs and network links, wherein said components may support the creation, storage and variety of uses associated with the present invention content identifiers. The variety and use of said content identifiers, wherein said identifiers may apply to, but are not limited to, television and print media, as well as objects and temporal, location, and search parameters (including, but not limited to, for example, traffic conditions, game score conditions which may be associated with a certain team at a certain point in a game, online gaming, as well as advertising criteria, for example, a commercial for a mortgage company), will be described in further detail herein.

A further embodiment of the present invention system that may support the likelihood of widespread acceptance is an information and device controller adapted for receiving, processing and disseminating content wherein said content may also comprise device and/or program commands to support the activation, operation and/or interaction of devices, apparatuses, and/or systems to a user's, user entity's or relation's preferences.

In yet another embodiment of the present invention system, said information and device controller and web server may provide significant utility in integrating device-interaction generated personal or personalized content with other visual and/or audio or portable devices or systems. Such device-interaction generated personal or personalized content may include, but not be limited to, a variety of health, medicinal, medical, biosensor, environmental sensor, as well as security sensor generated device information. The utilities and economy delivered by integrating said present invention information and device controller and web server with a variety of said devices, systems and methods should help contribute to widespread acceptance of the present invention system by addressing the needs described herein and the limitations of the prior art devices and systems, while supporting convenience and safety for the end user, as well as, with respect to some embodiments, the end user relations.

The present invention provides the means and methods for generating, transmitting, receiving, accessing, processing and/or interacting with data, where such data has been pre-selected by a user or generated by a program according to user-defined parameters and thus personalized by such user's content criteria, where such content may be communicated in separate form and/or integrated with other data in a variety of visual and/or audible output form through mobile, portable, and/or stationary apparatuses, devices and/or interface components (which are illustrated herein as present invention system components). Such personalized content communication and/or data integration in relation to form and frequency may also be personalized by or for the user. Thus, it is understood that present invention means, methods and system process data, in part, by selection and elimination, e.g. by customized directory match; word, phrase symbol or sound filtering; or other preset personalized criterion. The term "processing" is meant to include at least one selection step.

One present invention apparatus is an information and device controller with an input, output and interface means where such controller comprises at least one processor and memory and may be integrated into a display and/or audio appliance or information processing system or component, or may be, preferably, a standalone component that is integrated in providing the means for receiving, accessing, and processing data, and outputting personalized content through (a) dedicated port(s) and/or wired and/or wireless communications means. As will be described herein, the present invention controller is available in a variety of embodiments, where such embodiments may comprise one or a variety of application software program(s) and associated processor, memory, electronics and power means. The capabilities related to such controller may include one or more of the following: 1) a web browser function and web-sourced data personalization conversion and/or communication function; 2) a broadcast data receiver function and broadcast-sourced data personalization conversion and/or communication function; 3) a networked device controller function for disseminating personalized content to one or a variety of peripheral apparatus(es); 4) a networked control and controller device function for controlling, activating, operating, and interacting with one or a variety of peripheral apparatus(es) under one or more program modes; 5) and a networked control and controller device function that performs the preceding operations under one or more of the following modes in separate or combination form—timer (with a variety of feature and setting parameters for a variety of appliances, apparatuses and systems); security; medication; medical device; biosensor; environmental sensor (for example, but not limited to, smoke and/or carbon monoxide detector) and safety; GPS with traffic; weather with vehicular component or system information, as well as destination and alternate route and/or stopover processing; calendar; option calendar; and other modes apparent to one skilled in the art. An "option calendar" will provide the user with selected information in a visual or audio calendar format with designed events related to personal preferences of its user, e.g. TV programs, sports events, music concerts, art shows, professional events, club meetings, seminars, charity events, alumni events, competitions, auctions, races, chess tournaments, special programs or discount periods for selected vendors, e.g., car dealer, hotel, resort, or any other event of interest and tagged for personalized processing of interest to the end user.

The present invention peripheral apparatuses may be in a variety of embodiments either as integrated or standalone apparatuses to support at least either or both visual and/or audible personalized content. The information and device controller innovation embodiments described herein may support a number and variety of said output apparatuses; specifically, one controller may support many said peripheral apparatuses. It is to be appreciated that the output means associated with such personalized content may also be integrated or accompanied with a variety of output means or indicators, such as but not limited to, other visual and/or audible, as well as vibratory (for example, but not limited to, a child's stuffed animal with a vibrating apparatus that becomes activated by a transmission from the present invention device controller upon the receipt of a transmission from a smoke alarm that has become activated by a positive sensor reading), and/or olfactory (for example, but not limited to, a present invention electric air freshener that becomes activated by a device controller timer date/time mode and emits a certain soothing scent for such user), where such means or indicators will be described herein.

One visual output means is a display. The displays comprised in the present invention system may be standalone, or integrated in a variety of instruments (including but not limited to, PDAs, cell phones, televisions, watches, etc.). The displays may depict personalized information or conditions based on such information in the following forms, but not limited to such forms: text, graphic, color (either in background, marker, or various illuminated outer shell or enclosure forms where such enclosure is the display, as well as projected color embodiments), animation, picture, and/or video clip form. In addition certain display systems may also account for an audible component that may be activated based on the controller content (and)/or display content program, as well as a remote device transmission or voice or other audible command. Each display, audio and/or other output apparatus or means may be integrated into the present invention system as a networked device with the associated communications means which will be described herein or connected to a networked device; therefore, said system controller may have profiles (addresses, info, display, program, message and alert content) for each display/audio/vibratory/olfactory output component.

The present invention system's audio output means has a variety of embodiments that are described herein. Such output means may range from, but is not limited to, pre-recorded voice messages or content/message headers to music clips to voice synthesis chips. Such audible components may also be in the embodiments of content-to-voice conversion apparatuses, such as, but not limited to, text recognition to voice conversion software with associated components and associated amplifier and speaker circuitry. Said audio output means may also be integrated into adapted entertainment, radio, speaker and remote control apparatuses as well as personal communicator and/or entertainment apparatuses with a variety of programs of which are also described herein.

As described herein, the present invention system comprises a number of apparatuses that should be construed by one skilled in the art as inventions in standalone or subsystem component forms. A major factor for having such inventions within the present invention system is the information and device controller innovation. Such controller, by being in embodiments that account for most of the processing, program and memory means, may support greater economy and utility for users by having, what may have been considered as, said standalone inventions function as peripheral apparatuses. In addition, such controller embodiments may also provide for supporting a variety of media and content distribution means and disseminating personalized content to certain devices over one, two or more types of communications means based on the communications component(s) associated with the peripheral apparatus. In providing more capability within the controller component, the present invention may comprise one or more peripheral apparatuses that may be adapted to perform a variety of functions and utility that enhances the user experience, as well as, safety (pending on the application), which heretofore, would not be associated with such peripheral apparatus(es).

One such example of a unique peripheral apparatus that is described herein is a Personalized Weather Display (PWD). It may be comprised in a number of embodiments, such as, but not limited to, a hybrid-sourced Personal Weather Station (PWS). Such PWS may account for at least one weather metric associated with one's immediate surrounding, such as, but not limited to, an indoor and outdoor temperature sensor and barometer, as well as comprising other weather metrics and forecasting information which may be from other sources, such as, but not limited to, an internet-based weather service. Such PWS may account for basic residential localized weather information, while also accounting for comprehensive localized weather (such as from a more comprehensive high school weather system which may be located four miles from the user's residence) and forecast information at a price performance capability that is significantly greater than purchasing a comprehensive Personal Weather Station for one's household. Where the difference may be in the hundreds or thousands of dollars in association with a difference of a few miles, the present invention hybrid-sourced PWS provides greater economy. In addition, it also may provide for and display as well as audibly communicate a variety of other user-defined personalized content in a variety of means, where said content and communication means are described herein.

The present invention system also comprises a variety of interactive apparatuses, where said apparatuses may be remote control units or components (comprised in other embodiments) adapted to interact with the information and device controller and/or other innovations which are described herein to provide for greater levels of utility, such as for example, the Personalized Weather Display. Such interactive apparatuses may also be, but are not limited to, alarm (environmental, security, biosensor, medical device, etc.) communications components (including, but not limited to, cell phones), appliances (including present invention answering machines and caller identification components), a variety of sensor components and systems, as well as other information processing devices such as, but not limited to, GPS navigation systems, web servers, etc., all of which are also described herein.

An additional aspect of the present invention is to provide for the capability to support a variety of services (such as, but not limited to, from Internet media to health, medical care, and/or security) and/or third party engagement through software and server means and/or associated software/server-based services (which may include, but are not limited to, intra, inter, and/or extranet, as well as hosting and/or messaging capabilities). The inventor's previous patent filings have accounted for some of such services and capabilities, yet it is worth noting in this summary narrative because such capabilities should be understood to not be excluded as components or elements of some present invention embodiments. The present invention services which may, but not necessarily, include third party services, may also include one or more of the following mediums: a variety of advertising, marketing services, media (including, but not limited to, broadcast, cable, satellite, IP, and/or broadband television and/or radio media, print, movie, music, event, show, concert, and celebrity media, as well as a variety of recorded media), media services and locations (including, but not limited to, gaming, resort and theme park) to support said personalized content conversion, integrated dissemination, economy and widespread use. The present invention means for supporting the generation and use of said personalized content associated with said preceding mediums and other sources are content identifiers. Said content identifiers, as previously noted, and described herein, may also apply to a variety of parameters to facilitate the personalized conversion of content. Other utilities associated with the present invention system are a variety of pricing methods and measurable interactions and/or transactions to support widespread support and acceptance. Other present invention system methods described herein support efficient and compelling means for receiving, accessing and/or inputting content for dissemination, as well as for receiving, processing and outputting certain personalized and logistical content.

BRIEF DESCRIPTION OF THE DRAWINGS

FIG. 10 is an illustration of the present invention personalized content system utilizing the conversion of sample general television media program content to personalized content and personalized content storage and distribution to a present invention device.

FIG. 13 is an illustration of the present invention alarm clock radio depicting an audible personalized content message.

DETAILED DESCRIPTION

Figure 1:
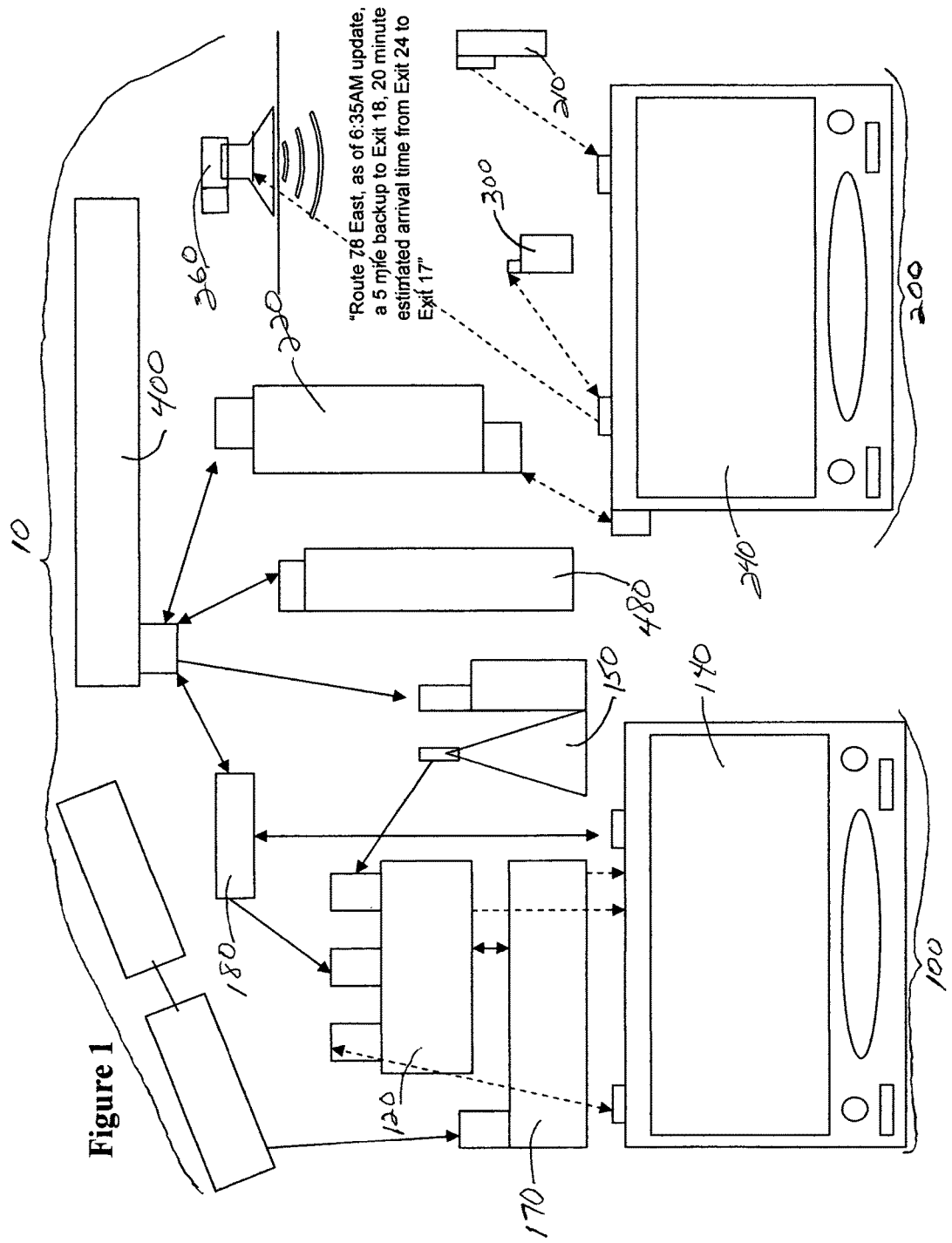
FIG. 1 is an illustration depicting some of the present invention embodiments in communications modes.

The present invention system 10, as depicted in FIG. 1, along with its and other present invention embodiments illustrated and/or described herein are to be appreciated as exemplary configurations. In addition, it is understood that the present invention system and its components may be in a variety of embodiments and generally applied to a wide variety of content systems (such as, but not limited to, a variety of media systems), devices and services, wherein such systems, devices and services, being adapted or integrated with the present invention system, provide new utilities to the user.

It is also understood that any of the embodiments described herein may be combined with one or more of the other embodiments and/or features presented herein. In addition, many of the present invention innovations may comprise a variety, or combination, of separate components as well as customized integrated circuitry and/or software/firmware and/or processor and memory embodiments as alternative configurations and programs for providing the present invention utilities described herein. For example, but not limited to such example, a memory means for a digitized audio content software program may be stored on a variety of storage mediums, such as, but not limited to, random access memory chips, read only memory chips, flash memory apparatuses, optical storage media, magnetic storage media, or magneto-optical storage media.

With reference to the figures for the purpose of illustration, present invention system 10 (FIG. 1) is accounted for in an embodiment of a personalized and logistical content delivery, processing, and dissemination system with the following components:

Personalized Route & Vehicle Information System 100
Information & Device Controller (Motor Vehicle Embodiment) 120
Personalized Display 140
Digital Radio Transmitter (High Definition Embodiment) 150
GPS and Personalized Route Controller & System 170
Cellular Gateway 180
Personalized Weather & Information System 200
Outdoor Sensor with Wireless Communications Means (RF Embodiment) 210
Information & Device Controller (Broadband Interface w/Router & ZigBee Embodiment) 220
Personalized Display 240
Personalized Audio Apparatus 260
Personal Communicator 300
Web Server 400
Corporate Server 480

Personalized route and vehicle information system 100 may comprise the following components: a motor vehicle information and device controller embodiment 120; a personalized display 140; a digital radio transmitter 150; a GPS and personalized route controller and system 170; a cellular gateway 180; a web server 400; and a corporate server 480.

System 100 may be available in a variety of embodiments, as well as being part of a motor vehicle information network and system for either personal, commercial, governmental or military vehicles. As previously noted in this filing, one of its primary utilities is, at minimum, to alert and inform the user of traffic and/or weather conditions or other conditions or factors that may be associated with the user's route and, in addition, provide such user with options for alternate route or stopover destinations.

Such system 100 may operate through a number of communications means. One of the primary components for receiving, processing and disseminating content in a variety of forms and manner is the information and device controller 120.

Such controller 120 may comprise the following input components: a local (within or in reasonable proximity to the vehicle) network wired and/or wireless communications means; a wide area network communications means; and at least one hardwired port connection means. The wired network input means may be associated with a variety of applications, pending on the controller software, processor and memory configurations; for example, such wired network input connection may be associated with a car sensor and diagnostic reporting system where upon the input generated from an activated sensor (in addition, such sensor may also report a reading to other vehicle diagnostic reporting or indicator means, such as a dashboard light), the controller may receive and process such communication and generate a program associated with such information, where such program may access a CD-ROM drive associated with the GPS and personalized route controller 170 apparatus and search for preferred service stations in proximity to a driver's GPS coordinates and/or route and display such information through the display 140 (such program and activation is described further herein) or audibly announce said information. The wireless local area network input means may support a similar application as well as a variety of other applications, especially those associated with a parked vehicle. With respect to a car sensor application, a wireless protocol that may be adapted well to such application is ZigBee, which has been addressed by the inventor herein in the recent utility patent application filings cited in paragraph [0001] above. Such ZigBee configuration would comprise a chip set with software, memory and power means which would be connected to such controller 120 communications interface and input port. Other protocols that support data transmission through a wireless codeable means may also be associated with the preceding, such as, but not limited to Bluetooth. With respect to a parked vehicle in a garage application, ZigBee, as well as Wi Fi and/or Bluetooth, may be, but not limited to, preferable protocols. For example, a Wi Fi interface to such controller 120 may support a variety of applications, for example, from GPS system updates to video and/or music downloads, where such downloads may be received, switched or routed through such controller to the respective application devices. Another wireless means associated with said controller 120 is a voice or audible command recognition input component. Said controller's wireless input means may also support system administration through a variety of apparatuses that comprise compatible wireless components.

The Wide Area Network input means may be associated with one or more of the following interfaces and mediums: a GPS receiver component; a cellular receiver or transceiver component; and/or a radio broadcast (for example, but not limited to, digital HD broadcast or satellite radio or FM) receiver component. One of the purposes for the GPS receiver relative to the present invention application described herein is to receive, process and triangulate associated transmission signals from GPS satellites to determine the associated 2D (latitude and longitude or 3D—the preceding plus altitude) location coordinates for processing such coordinates with route information through system 170, whereby such route information may be output to a controller 120 program that compares traffic information headers and/or 2D/3D coordinates with the user's associated route (which will be described further in this narrative). The cellular receiver component may be associated with a variety of applications that may be generated or routed through the controller 120, from starting a vehicle in an airport parking lot to, but not necessarily, a means for receiving traffic information (which may include associated 2D or 3D coordinates) as input for the controller 120 program noted in the preceding sentence to providing voice communications. The cellular component may be, but not necessarily, integrated with the GPS component. There may be a variety of radio system and transmission and receiver embodiments associated with the present invention system. The receiver embodiment, as illustrated in FIG. 1, may be a HD radio receiver, whereby such receiver may receive in-band data signal transmissions from a HD radio transmitter 150.

Another input means associated with system 120 is a wired input means where such wired input(s) may be associated with a variety of embodiments. One such wired input embodiment is associated with FIG. 1 which supports the receipt of route content information from the GPS system 170. Such content information may be, but not limited to, route numbers, exit numbers, street names, etc. and/or coordinates that are associated with an individual's destination. The content sources and the processing of such content that is associated with the preceding input means will be described further in this narrative. System administration may also be performed through a wired means, such as, but not limited to, a USB or Ethernet compatible connection to a, for example, portable device, PDA and/or pocket personal computer.

The information and device controller 120 may also comprise at least one communications processor and/or information processing means. Such information processing means may comprise a variety of embodiments such as, but not limited to, a central processing unit (CPU), a microcontroller, a communications component such as a multiplexer for receiving inputs from a variety of input means and outputting such input over a data bus to said information processor(s). Such information processing means may also comprise a processor and memory chip configuration. The memory means associated with controller 120 may also comprise a variety of embodiments, such as, but not limited to, random access memory (RAM), read only memory (ROM), a fixed storage component, such as, but not limited to, a hard drive, a removable storage component such as, but not limited to, CD, diskette, USB dongle, flash memory, etc.

The output means associated with controller 120 may also comprise a number of wired and/or wireless embodiments, protocols and applications. The preferable means for the traffic routing embodiment described herein is wired. Such wired output component may be directly connected to the input port of system 170. Controller 120 wireless output components may be associated with transmitting personalized content to designated user devices when such user is in the vehicle or at home, when such vehicle is parked, for example, in the garage.

One of the software program embodiments associated with controller 120 may be, but not necessarily (such program may alternately be associated with system 170), a traffic reporting and analysis program. This program may differ from other telematics systems in the following areas: 1) the receiving point and analysis of the traffic data; 2) the processing and output of alternative solutions associated with such data; and 3) the linkage of applying like technology, applications and content organization (and)/or formatting to a home and/or work based content network.

Unlike other telematics systems, which include combining traffic information with map associated information before such information is transmitted to a vehicle navigation system, where the resulting output is map-based information, the present invention system preferred embodiment transmits traffic data to a vehicle where such data is combined with the vehicle information system at either or both (pending on the configuration embodiment) the information and device controller 120 or GPS system 170 level where such resulting output may be in map-based as well as other forms. The importance and distinction of having the receiving point and analysis of traffic data within the vehicle system supports the output of a variety of formats such as, but not limited to, map, text, graphic, other visual means such as color or symbol coded indicators, a variety of mash-up applications, as well as a variety of audio output means, for example, from tone, chirp or alert to voice synthesis to digitized to analog voice frames. It also utilizes economy of processing and communications design where such processing and communications components may also support other content and device dissemination applications, some of which will be described herein (such as, but not limited to, present invention content identifier applications).

Such processed data output may also be utilized as input for program processing and output content such as alternative routes and stopover solutions. The processing of traffic and other data within the vehicle system also supports greater economy for the use of such transmitted data with other systems, such as for home and/or work based content networks, as described herein.

With respect to the present invention traffic and analysis program, such program may read traffic information which may be transmitted with subject matter identified as major traffic route or highway number headers or street name headers as well as congestion condition headers with associated content (which may include 2D or 3D coordinates), where such information is received from one or more of the controller 120 wireless communications input components, and recorded and stored in designated memory. Upon the receipt of data input generated from system 170, the controller 120 operating system may generate an application program that reads system 170 GPS-based route information and associated subject headers (such as, but not limited to, exit numbers and/or names, street names, etc. associated with such route from origin to destination address) relative to such route information from system 170 and record and store such subject headers and associated content in designated memory.

Upon the storage of the system 170 route information, the device controller software system may generate a program that matches, for example, 170 route header and/or 2D information with stored traffic content information in priority of closest proximity data points where such data points may be determined by means of real-time GPS route coordinate processing relative to such traffic information. The matched information may be read and processed by the controller 120 program with respect to providing warning and alert output information as well as other output, pending on the type of information offered. For example, some traffic reporting services and systems may provide average vehicular speed associated with congested traffic points. Such information may be processed in the present invention system with respect to comparing current and average vehicle speed of the vehicle using such present invention system with the average vehicular speed associated with the traffic congestion and produce a change increment or alert in an estimated arrival time output associated with a vehicle navigation system.

If a matched traffic information frame contains a header or content identifier indicating a significant delay, such information may be utilized as input to generate another present invention system program which may process such information and run through sequences based on logic statements such as time of day or other user defined parameters where such system may search for user preferred alternative routes or for user preferred stopovers based on such parameters and content condition(s). For example, if a congestion condition occurs during lunch time, the controller 120 program may generate a command to search for user specified stopover restaurant preferences.

Another application associated with the present invention that supports alternative solutions associated with such traffic data is advertising. Such traffic data streams may include advertising content where such content may comprise, for example, coupon information, among a variety of other ad content, to create an incentive for a user to pull off a congested route and utilize such coupon at a store or restaurant that is in proximity to said route or an alternate route. In yet another embodiment of the present invention system, said traffic information may be delivered to and read by a server via a RSS feed, wherein said information may contain parameters that trigger a web server program to generate and transmit advertising content that may include content identifiers to facilitate the operation of, but not limited to, a controller 120 application program, a personal communicator 300 cell phone application program, a cell phone, and/or an application program associated with a variety of devices adapted for the present invention system to process said advertising content.

As previously noted, the preceding controller 120 application program embodiment may also reside in system 170. The purpose for accounting for system embodiments that may account for the application program residing in either one of or both systems is to support the economy of other applications. For example, controller 120 may function as a communications receiving and switching system for a variety of entertainment media and content sourced from within the vehicle as well as outside the vehicle, as well as diagnostic content associated with the vehicle system. In the preceding application, it may be beneficial, but not necessarily (pending on processor and memory configuration) to not apply another processing application to the 120 configuration, and thus support the traffic and information application on system 170.

The present invention traffic and analysis system may be adapted with other GPS navigation systems such as those provided by, but not limited to, Garmin and MapSource®. The traffic content may be adapted from source providers such as, but not limited to, SmartRoute Systems, Inc.

Another present invention system embodiment of information and device controller 120 is a multiplexing and channel switching component to facilitate capturing user specified streaming or broadcast content. Said content may comprise, but not limited to, certain sports results, weather, marine, financial and/or outdoor activity information, such as certain ski conditions, as well as a variety of content identifiers to facilitate user action associated with radio and/or television program content. Pending on the present invention controller configuration, said controller 120 may also comprise at least one additional receiver to support the receipt of and the frequency of a variety of content.

Such content may also be associated with home or work-networked content offerings and services which may also be adapted for the present invention system. Said content offerings and services may be supported through either or a combination of subscription (and)/or advertising services to support the viability and widespread acceptance of such service.

The output for providing the GPS route and relevant traffic content and alternate solutions may be either or both a visual (and)/or audible means. Such output is preferable from GPS system 170 to a display 140 where some or all of said content may be displayed in a graphical-map based format. In addition, given that the traffic content is processed at the GPS system and/or information and device controller 120 level, text relevant to the commute, such as, but not limited to, backup estimate and/or adjusted destination travel time, as well as user selectable preferred metrics may also be displayed on a portion of said display 140 screen. Such text or information may also be complemented or provided in audio form, along with audio chimes or beeps associated with a change in route condition or other changes associated with the route such as, but not limited to, a decline in weather temperatures to a freezing threshold.

Such information may also be provided through the information and device controller 120 where such controller may be networked to other telematics devices, such as other displays in the vehicle, as well as, but not limited to, users' watches, PDAs or PCs who may comprise, for example, a Bluetooth or ZigBee or Wi Fi communications component(s) that become(s) activated to receive information when said telematics system comprises a communications apparatus that intermittently signals a designated list of device addresses or user addresses or receives said device transmissions from such device indication of said device's presence in or on the system. Such information may comprise, but is not limited to comprising, advertising content such as electronic coupons wherein said coupon information or electronic coupon may be transmitted to said devices either automatically or at the request of a user. It is to be appreciated that the term, "electronic coupon", may account for the following: coupons, gift cards, discounts, credits, electronic currency and/or other means to facilitate transactions over a variety of networked devices, including, but not limited to, cell phone and other portable devices.

The information and device controller 120 (and/or GPS system 170) may also comprise an output component to said vehicle's audio system where said component and audio system may be in a variety of embodiments. One such audio embodiment may comprise a digital to analog (D/A) voice synthesis chip that may be connected to a circuit that terminates into the vehicle audio system amplifier where such circuit connection, upon activation either through a controller 120 or system 170 initiated content processing program or on-demand user invoked command, said circuit connection overrides the standard audio system audio circuit and amplifier connection, where such D/A chip reads and enunciates, for example, the relevant system generated route traffic alert content or user command generated route traffic status.

The content sources associated with the present invention may be providers such as, but not limited to, WeatherBug®, SmartRoute Systems, Inc., Mobility Technologies, Inc., and/or governmental agencies, as well as new service providers.

It is preferable that such content be sourced from web servers, such as server 400 (FIGS. 1, 2, 4, 5, 6, and 8), which may be connected to other servers such as 410 and/or 480 (FIG. 1) for a variety of purposes and applications.

With respect to FIG. 1, server 400 may be the server associated with a main content provider. Such provider may aggregate content, such as, traffic, weather, sports, etc. or may be a sole aggregator of one type of content subject matter, such as traffic. For purpose of illustration, such traffic content may be aggregated and input, connected to or transferred into a database associated with server 400. Such server may link or download certain traffic content to other servers such as 410 which may support regional traffic for a metropolitan area. Said server 410 may be associated with a certain metropolitan radio station where such station may broadcast such regional traffic content over its respective metropolitan market. The transmitting means and medium, associated with such content, as previously noted, may be one or more of a variety of transmitters, such as, but not limited to, HD radio 150, satellite FM in-band signaling, as well as cellular-based messaging.

Unlike other telematics systems, which are more specialized to respective markets, such as, for example, personal vehicle versus commercial trucking markets or passenger bus markets, the present invention system may comprise certain embodiments to support commercial applications and other embodiments to support personalized content. The distinction in serving different markets may be based on the software and hardware configuration within said vehicle, without necessarily making changes at the web server content level.

For example, the traffic content broadcast from transmitter 150, may be received by an information and device controller 120 input receiver associated with either a personal or commercial vehicle. Said controller 120 may interface with a GPS system 170 and said systems may process such traffic content in relation to said system 170 route information.

In addition, pending on the desired configuration, either or both controller 120 and GPS system 170 may output a cellular transmission to a designated server via a cellular gateway 180 where such transmission may account for the latest traffic route information where such information may be forwarded and processed by a corporate server 480. Such information and server 480 may be associated with, for example, a freight company logistics management system to facilitate optimal scheduling and contingencies based on said traffic and route content, and other factors.

The present invention system traffic and route embodiment may deliver greater economy and use over other telematics systems, because, as previously noted, such content, especially traffic content, may be utilized for other applications, some of which will be described herein, without the need, necessarily, for modifying such content from one application to another. This present invention economical benefit supports a broader content distribution channel and markets, and thus supports the greater likelihood of acceptance and economic justification for the use of such content, where such factors should help support widespread support of such content.

As previously noted, another system which may utilize the traffic content adapted for the present invention system as well as other content which may be personalized is a Personalized Weather & Information System. This system may be in a variety of embodiments. One such embodiment is depicted in FIG. 1 as Personalized Weather & Information System 200.

System 200 may comprise the following: at least one outdoor sensor 210 (as noted in the embodiment of an outdoor temperature sensor with wireless communications means), (FIGS. 1 through 8); an information and device controller 220 (as noted in the embodiment of or with a broadband communications interface with a router, preferably, but not necessarily, with Wi Fi communications means, and ZigBee), (FIGS. 1 through 4, and 7); at least one indoor sensor (not depicted); a personalized display 240 (FIGS. 1 through 5); a personalized audio apparatus 260 (FIGS. 1 and 7); a personal communicator 300 (FIG. 1); and a web server 400 (FIGS. 1, 2, 4, 5, 6, and 8).

A key component of the system 200 functionality, economy and versatility is the information and device controller 220. Such controller 220 may be in a variety of embodiments. As previously noted in the Summary of Invention herein above, pending on the desired configuration and applications, embodiments may consist of the following: being integrated into a display and/or audio appliance, or an information processing system or component, which may include a personal computer that may, optionally support application software to process or present, for example, weather information, or, preferably, being a standalone component that may be connected with other apparatuses for providing the means for receiving, accessing, and processing data, and outputting personalized content through (a) dedicated port(s) and/or wired and/or wireless communications means. It (220) may also comprise one or a variety of application software program(s). As also noted, the capabilities and/or interactions related to such controller may include one or more of the following: 1) a web browser function and web-sourced data personalization conversion and/or communication function; 2) a broadcast data receiver function and broadcast-sourced data personalization conversion and/or communication function; 3) a networked device controller function for disseminating personalized content to one or a variety of peripheral apparatus(es); 4) a networked control and controller device function for controlling, activating, operating, and interacting with one or a variety of peripheral apparatus(es) under one or more program modes; and 5) a networked control and controller device function that performs the preceding operations under one or more of the following modes in separate or combination form—timer (with a variety of feature and setting parameters for a variety of appliances, apparatuses and systems); security; medication; medical device; biosensor; environmental sensor (for example, but not limited to, smoke and/or carbon monoxide detector) and safety; and other like modes apparent to one skilled in the art.

One of the primary utilities associated with controller 220 and the preceding functions is to account for such functions through networked processing so as to enable a variety of low cost devices and/or peripherals to support a variety of functions (including new and unique, as described herein) that would otherwise be more expensive in standalone and duplicative configurations.

Such controller 220 may comprise the following key components: input and output means, processing and memory means, communications means (which, pending on the configuration, may be associated with the input and output means), and an interface means (which, pending on the configuration, may be associated with the input and output means).

The controller 220 input and output means may have the following components: a local network wireless and/or wired communications means; pending on the embodiment, a wide area network communications means; and, pending on the embodiment, at least one direct connection input and output port means which may support a variety of applications, including, but not necessarily, administration functions, as well as peripheral and optional configurations, which will be addressed in this narrative. In certain embodiments, a direct connection means may be for supporting a display and/or audio component or system connection.

The wired local area network (LAN) input and output means may be associated with a breadth of applications and network topologies and means, pending on the controller software, processor and memory configurations. For example, such wired network input connection may be associated with a home network powerline (such as, but not limited to, HomePlug™ and/or X10) and/or Ethernet compatible wired network interface. One preferable embodiment for such wired input means is for connection to a router, such as, for example, a wired and wireless, preferably, Wi Fi or Wi Fi and ZigBee router, where such router may connect to controller 220 through a, for example, Ethernet cord and interface connection. In this embodiment, such controller 220 may have a designated IP address, which may facilitate a variety of functions for the present invention system and device users, as will be described herein. The wireless LAN communications input means may comprise a variety of communications interfaces and protocols such as, but not limited to Wi Fi, Bluetooth, ZigBee, Zensys, basic FCC Part 15 RF communications means, infrared, ultra wideband (UWB), proprietary coded wireless means, proprietary coded 2-way wireless communications means, other offshoots of the preceding protocols, as well as evolving open standard protocols.

The present invention information and device controller wired area network (WAN) input and output means may vary based on the configurations associated with WAN access and content. The controller 220 embodiment depicted in FIG. 1 accounts for (thought not illustrated) an interface to a router, where such router interfaces to a broadband internet connection. Controller 220 may be in a variety of embodiments, where one embodiment may account for an integrated Wi Fi router and controller apparatus. For the purpose of illustration associated with FIG. 1, it is understood that such controller be a standalone component that is connected to a router. Other controller embodiments and configurations are described further in this narrative and in associated illustrations.

Even though such controller 220 may comprise an interface to a router for broadband internet communications, such controller may also be in one or more embodiments that may have other communications interfaces such as, but not limited to, from and to cellular networks, from a variety of broadcast and/or satellite radio providers (as noted in the controller 120 narrative) to television media associated networks, or other networks which may or may not be in addition to or in place of the broadband interface means such as Wi Max or even dial-up.

The information and device controller direct connection input and output means, as previously noted, may be in a variety of embodiments that support a variety of applications, functions and configurations. The controller 220 embodiment, as depicted in FIG. 1, may comprise a direct connection input and output means through an Ethernet compatible port connection. Other direct connection input and output means will be described and illustrated further in this narrative.

Figure 5:
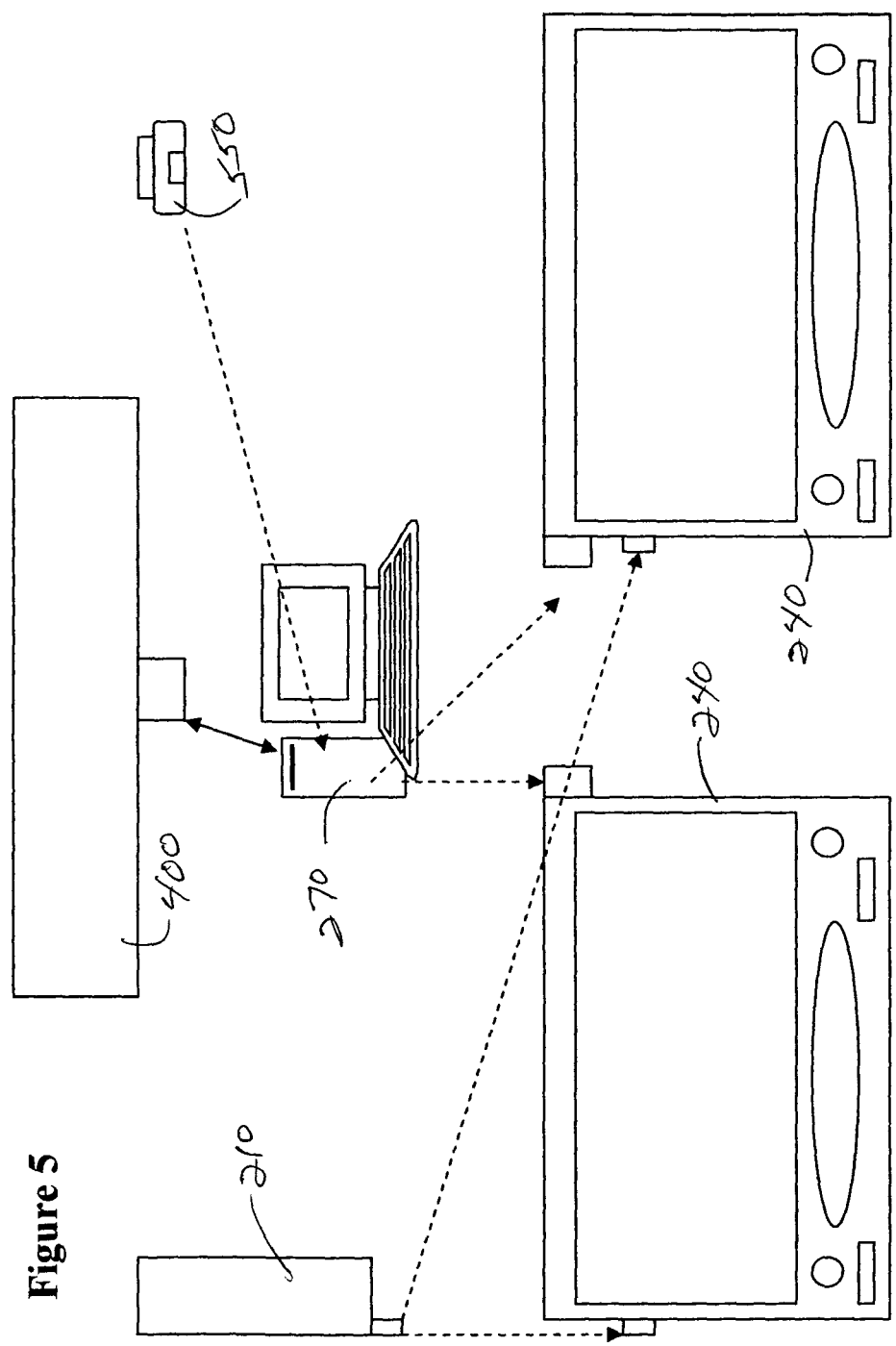
FIG. 5 is an illustration of the present invention information and device controller in the embodiment of a networked personal computer with associated networked present invention personalized weather and information displays.
Figure 8:
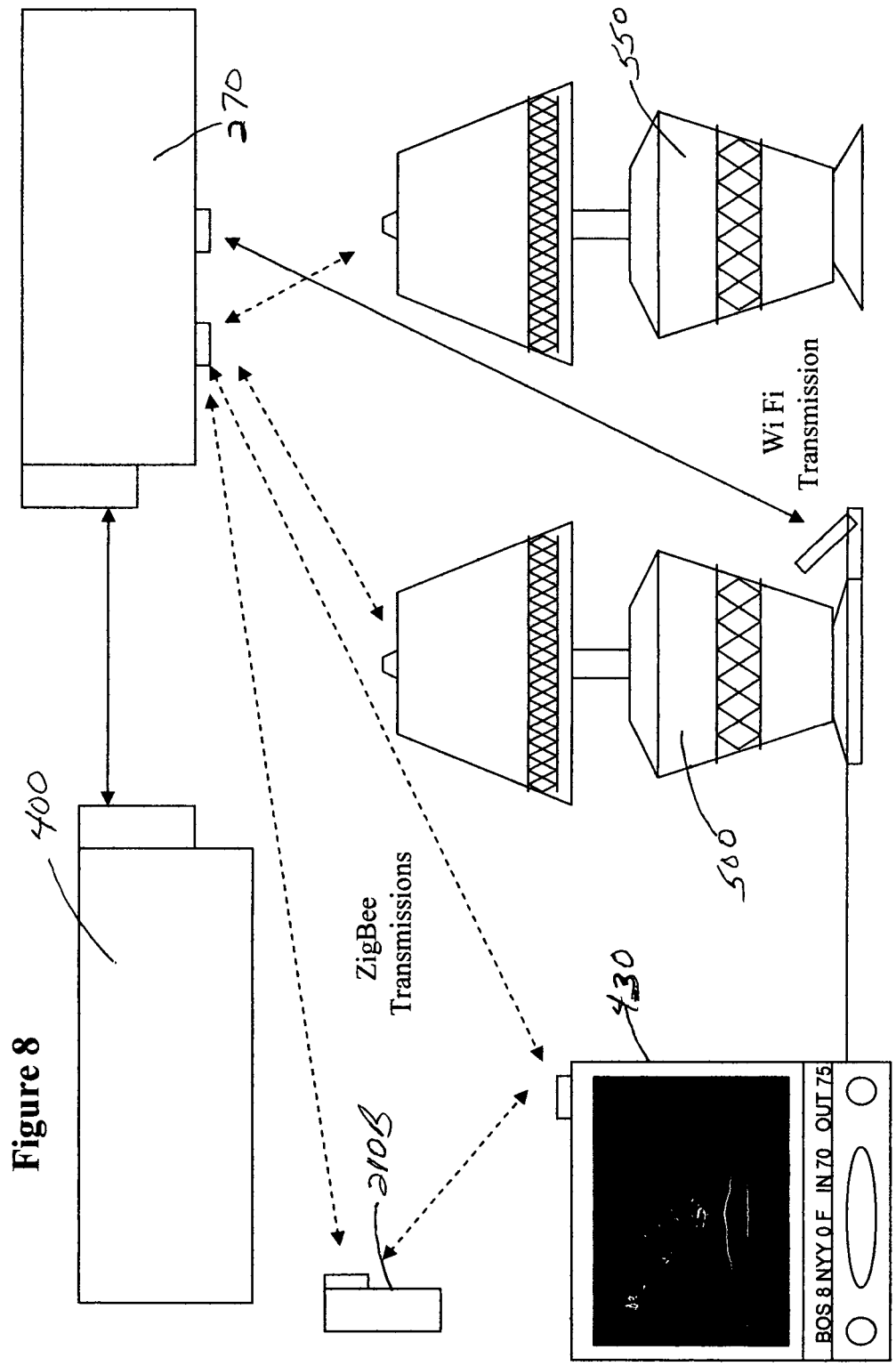
FIG. 8 is an illustration of present invention multi-utility devices (including a present invention light fixture and integrated personalized weather and information display and digital picture frame) and a sample information and device controller embodiment.

The controller 220 processing and memory means may comprise a variety of embodiments similar or identical to those means associated with controller 120, such as, but not limited to, a central processing unit (CPU), a microcontroller, a communications component such as, but not limited to, a multiplexer for receiving inputs from a variety of input means and outputting such input over a data bus to said information processor. Such information processing means may also comprise a processor and memory chip configuration. As noted and illustrated further in the narrative, such controller 220 processing and memory means may also be shared, offloaded or integrated with other devices, such as, for example, a personal computer, as illustrated in FIGS. 5 and 8. Such personal computer configuration may have a variety of embodiments, where one such embodiment may account for controller 220 as more of a communications device controller device, where the information controller functions may be shared with or ported on the personal computer along with other information processing applications. Said information processing applications or means may include, for example, application software for receiving, processing, presenting, displaying and/or communicating weather information in a variety of formats.

The memory means associated with controller 220 may also comprise a variety of embodiments, such as, but not limited to, random access memory (RAM), read only memory (ROM), a fixed storage component, such as, but not limited to, a hard drive, a removable storage component such as, but not limited to, CD, diskette, USB dongle, flash memory, etc.

The information and device controller 220 software may also have a variety of embodiments. In addition to supporting previously noted controller functions, it may also comprise programs to support browsing, interface and administration means, and operating system functions.

The controller 220 browser may support the access of, but not limited to, web-sourced content or other server-sourced content which, pending on the system configuration embodiment, may be personalized at (a) respective web site(s) and/or retrieved and personalized at the device level where such device may be, but not limited to, a controller 220 or personal computer or PDA or smartphone or cell phone in conjunction with a web server configuration adapted for the present invention systems.

Such browser may retrieve desired content through a number of means. One method may be by utilizing a bookmark of preset or pre-programmed URLs where such bookmark headers and associated URLs may be downloaded or programmed through a variety of programming or administration means, where such means will be described further in this narrative. One browser related application program embodiment may account for accessing a designated URL which may account for all personalized content associated with a certain personalized weather and information visual component such as a display 240 (FIGS. 1 through 5). Such content may be retrieved by the respective browser, downloaded to the controller 220, read and stored in controller 220 memory for the purpose of retrieval by another program or set of program codes associated with such content dissemination to said display 240.

Another means for supporting controller 220's access of said web-sourced content is through the use of extensible markup language (XML) or a derivative or relative language thereof that enables retrieval of specific content on a designated web site page or pages, where such content may also be retrieved and downloaded to the controller 220 for associated processing. In addition, pending on the application, a search engine program may also support the preceding retrieval and dissemination apparatus wherein said search function may be applied toward a designated web site page or pages or said output of said search function may be downloaded to said display 240 or other device displays.

The browsers that may be adapted with the present invention system may be, but are not limited to, Microsoft's Internet Explorer, AOL's Netscape or the Mozilla Foundation's Firefox. It is understood that as search, browser and associated technologies evolve, such technologies may be applied to the present invention system where they may provide a means for a server or controller or personal device or other device to obtain and utilize personalized content for further processing, dissemination and or communication (in a visual, audio, vibratory and or even olfactory context) to support user and a variety of other entities' applications associated with such content. For example, the use of present invention system content identifiers that support, but are not limited to, converting, generating, storing, communicating and presenting personalized content may comprise, but are not limited to, tag, search, and or download capabilities to support new utilities for the user.

An illustration of some of the uses, out of many, of said content identifiers may apply to a viewer of a food program television broadcast over a conventional television 600 (FIG. 10) as illustrated in six steps in FIG. 10. For example, said viewer may be interested in capturing all of the content of said episode (in a variety of forms), some of said content, or other content associated with said episode (Step 1 of FIG. 10). In the event that the viewer does not have time to view the entire episode, yet is interested in viewing said episode at a more convenient time, and has a preference of receiving recipes from said episode, the present invention system may accommodate the preceding interests through a variety of means. Some of said means include, but are not limited to, the user's use of his/her cell phone 630 (FIG. 10) and or other communications device (including communications devices adapted for the present invention system). Similar to the functional and component description of the use of a content identifier associated with radio program content noted in the summary section herein, said user may input a telephone number (Step 2 of FIG. 10) that may be associated with a present invention system server port 640 (FIG. 10) that supports a present invention system software program associated with, but not limited to, at least one of the following: said food program network; said television service provider; or said present invention personalized content and media system. In this application wherein said server software program supports the said food program network, upon the ANI screening and input match associated with the user's cell phone number and user profile, said server software may operate under a default variable program. Said default program may account for the main content identifier as consisting of four factors: the telephone number associated with the server port which indicates said content is associated with a food program episode; the time/date stamp associated with the receipt of said telephone call; the lack of any other content identifiers input by the user; and the user profile preferences, as illustrated in Steps 3 and 4 of FIG. 10.

It is to be appreciated that the present invention system may account for a variety of indicators and content identifiers for facilitating the generation of personalized content. With respect to the illustration described herein, said main content identifier may comprise a code or command function applicable to a food network program episode that may be airing at a current time and date and may not have any particular user-input content identifiers, such as, but not limited to, advertising, product, recipes, etc., other than the content parameters that may be pre-set in the user's profile that may be associated with said program content. Said present invention system may also support a content profile associated with said program sponsor or content provider wherein said content profile may be separate or associated with said user-profile or comprise a combination thereof, as illustrated in Step 5 and the interaction arrows between servers 650 and 660 of FIG. 10. In accounting for the preceding parameters, as described further in the narrative, said personalized content associated with said food program, may comprise URL links, content headers, podcast or other recorded media headers, advertising, search advertising and results associated with said food program's recipes based on a user profile preference, a variety of advertising media based on said food program sponsor, content, user profile preferences, and/or combinations thereof that may be presented on a present invention system web site page associated with said user. In addition said user profile preferences may also comprise a recipe download function, as illustrated in step 6 of FIG. 10, wherein said recipes associated with said show may be automatically downloaded to said present invention display 240 or integrated display and information and device controller 290 (FIGS. 10 and 11) or other designated networked display via router 670 (FIG. 10) that may reside in said user's kitchen or said user's networked portable device, or combinations thereof. The present invention system content identifiers and associated functions and media will be described in more detail further in the narrative.

It is to be appreciated that the illustrative present invention system capability of downloading recipes via said system's user profile preference functions to a present invention integrated display and information and device controller 290 may be further enhanced when said device 290 comprises present invention system software that supports cooking or grilling programs wherein said device may be wirelessly connected to a present invention system wireless cooking probe and system via, but not limited to a ZigBee protocol, wherein said devices comprise the associated chip set, antenna, electronics and other supporting components. The utilization of said display and controller 290 for both wide area network and general media personalized content conversion, and local area networked user-specified content is a sample of the variety of embodiments and uses for the present invention system.

Integrated display and information and device controller 290 and information and device controller 220 may comprise a variety of embodiments for administration and user interface means. For example, one such controller 220 embodiment may comprise the following administration means: 1) a local communication means by a user through a variety of devices, such as, but not limited to, a personal computer or PDA or wireless keyboard via, for example, but not limited to, a USB or Ethernet or Wi Fi or Bluetooth connection or through a variety of remote control units (including portable keyboards, such as, for example Think Outside's Bluetooth keyboard) via the preceding communications means or other previously noted wired or wireless (including ZigBee, pending on the amount of administration required); 2) a remote and/or wide area network communications means through either or both a remote server which may receive input from the user or a variety of sources with appropriate security and authentication logins, as will be described further in this narrative, or through other remote or wide area network devices, such as, but not limited to, a personal computer or PDA or smartphone or cell phone which may or may not be adapted with enhanced means adapted for the present invention systems; 3) through a timer program, as described further in the narrative, where such program may change a variety of parameters associated with such controller 220 and said parameters associated with some or all of its networked peripherals, including displayed content (such timer program may be administered through one of the three means stated in this paragraph and/or a voice or audible command interface means); or 4) through an administration keypad and/or display interface means which may reside on such controller 220.

The local administration communications means may be used for a variety of software settings, such as, but not limited to, one or more of the following (where such settings should be understood to be illustrative of the type of settings and functions associated with the present invention system): 1) selecting content categories, content category metrics, content URLs and subject headers, content update frequencies and display times, content alerts and alert parameters, content device dissemination, content device addresses, content device display settings, content device alert settings, other content identifiers, etc.; 2) networked device administration (this may account for a variety of options, as noted in previous patent filings by the inventor, for example, from changing a program output based on receiving a transmission input from a networked device to sending an administration command to a networked device to change a device address associated with a program and transmission generated from said networked device); 3) controller modes, such as, but not limited to, timer, medical, medication and health devices and regimen, environmental, security, safety, and entertainment (all of which may be comprehensive and in either standalone or combination form); 4) advertising and/or electronic coupon display and output (which may include electronic transfer to portable devices and/or print options); 5) calendar, such as, but not limited to, a group calendar function, which will be described further herein, calendar alert modes and parameters, calendar alert devices; and/or 6) message dissemination, which accounts for message type and dissemination.

Figure 6:
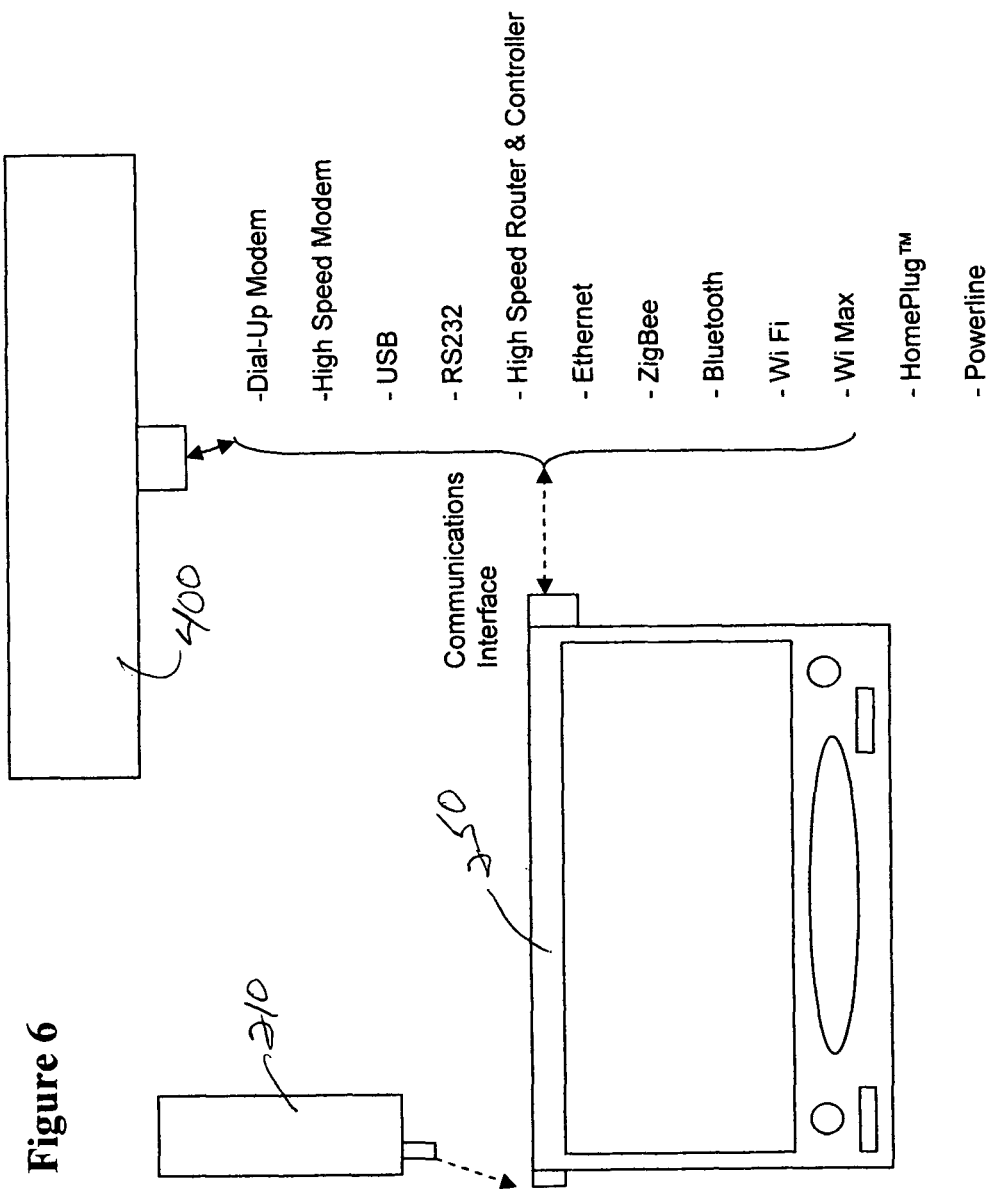
FIG. 6 is another illustration of the present invention personalized weather and information display with an integrated processing and communications means.

The remote administration means may be used for the variety of software settings noted in the preceding paragraph, which, again, may be comprised in the present invention system along with other software applications. Such remote administration may be administered through a remote server, such as, but not limited to a web server. As noted, web server administration may be performed by the end user or other entity associated with such user. There a variety of reasons for accounting for server based controller 220 administration which may range from component configurations to supporting an end user who may not be as adept or have much interest in such controller and/or device administration, to accounting for authorized heath services personnel to administer certain medical devices that may be associated with such controller 220 system (where such medical applications have been accounted for in previous filings). With respect to remote server administration based on component configurations, the information and device controller may be comprised in an embodiment such as or similar to what is illustrated in FIG. 6, where such controller 250 is integrated in a present invention personalized weather and information display and such display may be connected to a dial-up modem. Even though such display and controller device 250 may comprise a variety of administration interfaces and means, the user may desire to have such device 250 administration performed at a web server level (for example, the web server may have a more updated interface and feature format) and downloaded to such device 250 through a modem and modem interface. Such remote server administration may be performed through a variety of browser-enabled devices. One application for such remote administration of device 250 may take place where such device may reside within a second home. The present invention system may provide a lot of utilities and support for the user when such invention may reside in and/or be networked with a variety of devices and apparatuses associated with a second home. Such present invention home applications have been described in previous filings submitted by the inventor and some of which will be described herein.

As previously stated, another means for controller 220 remote administration may be through a variety of other remote and/or wide area network devices. One of the controller 220 embodiments for performing such administration means accounts for when such controller may be integrated or connected to a router, preferably a broadband Wi Fi router or a present invention Wi Fi ZigBee router which has been accounted for in a previous filing. In the preceding controller 220 and router configuration embodiment, said controller may be connected to the router through an Ethernet LAN port connection and such port connection may account for a unique IP address. Upon a remote user's desire to administer the controller 220 or controller 220 system, such user may type or bookmark the router IP address associated with the port that connects to said device 220 on a browser-enabled device. In addition, as previously noted in an illustration associated with the use of content identifiers and downloading content such as, but not limited to, a recipe associated with a food network television program, said recipe may be downloaded automatically to said controller 220, display 240, and/or an integrated display and controller 290 based on input originated from a basic cell phone. As noted in the preceding paragraph, the present invention system supports a variety of utilities and user benefits for remote and/or wide area network administration, as well as personalized content downloads.

An information and device controller 220 timer program may also be utilized for controller 220 as well as the present invention Personalized Weather and Information System 200 administration. Such timer program may be associated with a variety of software applications, such as, but not limited to, changing some or all of the display content associated with some or all Personalized Weather and Information Displays 240 that may be networked to the controller 220 at a designated period, such as, but not limited to, time, date, day, week, month, etc.

The administration means through a controller 220 keypad and/or display may be facilitated through a variety of administration menus. One such menu sequence is illustrated in FIG. 9 (9A through 9E) and described herein.

Figure 9A:
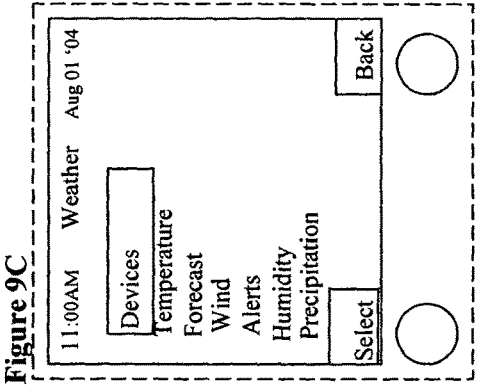
FIG. 9 is a sample present invention device display text sequence in an administration mode for a present invention information and device controller embodiment.

FIG. 9A illustrates a sample administration main menu display showing time, date, the words, "Content", "Devices", "Modes", "Coupons—Ads", and "Calendar" in the main portion of the display, and the words, "Select" and "Exit" on the lower left and lower right, respectively, portions of the display. Upon depressing a scrolling button on the controller 220 user interface, the words, such as, but not limited to, "Directory", "Games", and "Other" may also appear on the display.

Figure 9B:
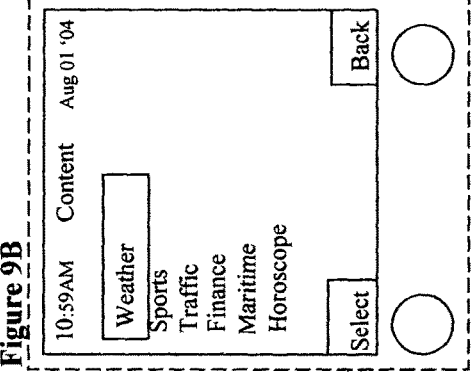

Upon depressing a button below the "Select" term when the cursor is over the word, "Content", user-requested (for example, at initial set-up where such topics may be fee based) content topics may appear on the display, such as, but not limited to, "Weather", "Sports", "Traffic", "Financial", and/or "Reservations" as depicted in FIG. 9B. After depressing the button below the "Select" term when the cursor is over the word, "Weather", the following words may appear on the display below such header, "Weather", "Devices", "Temperature", "Forecast", "Wind" and "Humidity", as illustrated in FIG. 9C. Additional headers, such as, "Precipitation" and "Alerts" may also appear, upon depressing a scrolling button.

Depressing the Select key associated with one or more of the preceding display headers, displays a another series of categories associated with such headers, as accounted for in the narrative paragraph associated with the local administration means description. One of the purposes for such headers is to account for content types and metrics to be accounted for on the system 200 respective devices.

Figure 9D:
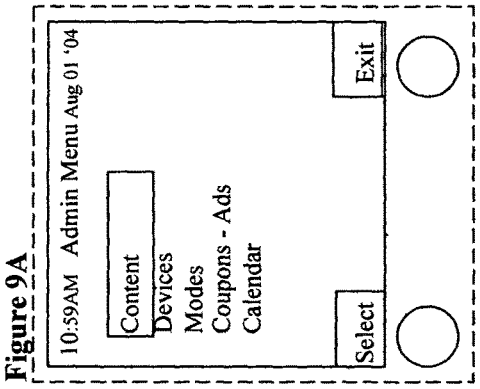
Figure 9C:
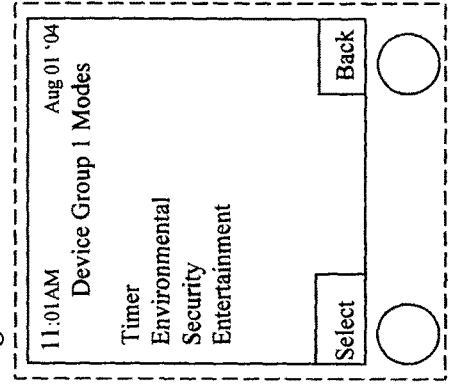

FIG. 9D illustrates the display readings upon depressing the button below the word, "Select" when the cursor is over the word, "Devices". The fields, "Weather Display FR", "Alarm Clock MBR", "Display Device Group 1", "Display Device Group 2", and "Audio Device Group 1" may appear on the display under the header, "Devices—Wthr". Scrolling may enable the user to see and administer other devices associated or intended to be associated with weather content.

Figure 9E:
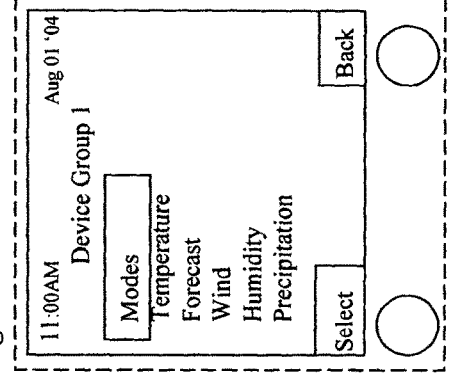

FIG. 9E depicts the display readings of "Device Group 1", "Modes", "Temperature", "Forecast", "Wind", "Humidity", and "Precipitation", which are activated after depressing the button below the word, "Select" which is associated with the cursor over the word, "Device Group 1" from the preceding screen (FIG. 9D).

Figure 9F:
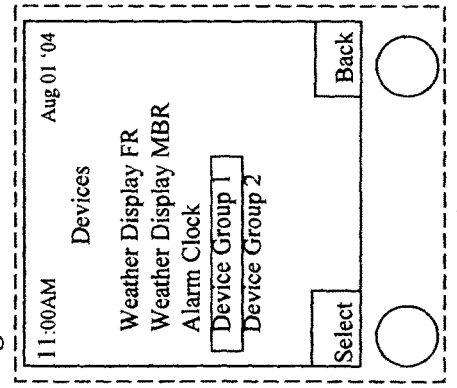

FIG. 9F depicts a display sequence associated with the present invention modes feature where a set of, for example, display devices that may share common features and display sequences which may be categorized as, "Device Group 1 Modes" may be associated with one or more mode feature functions. As illustrated in FIG. 9F, the mode features, "Timer", "Environmental", "Security", and "Entertainment" may be applicable to "Device Group 1 Modes" devices.

Figure 4:
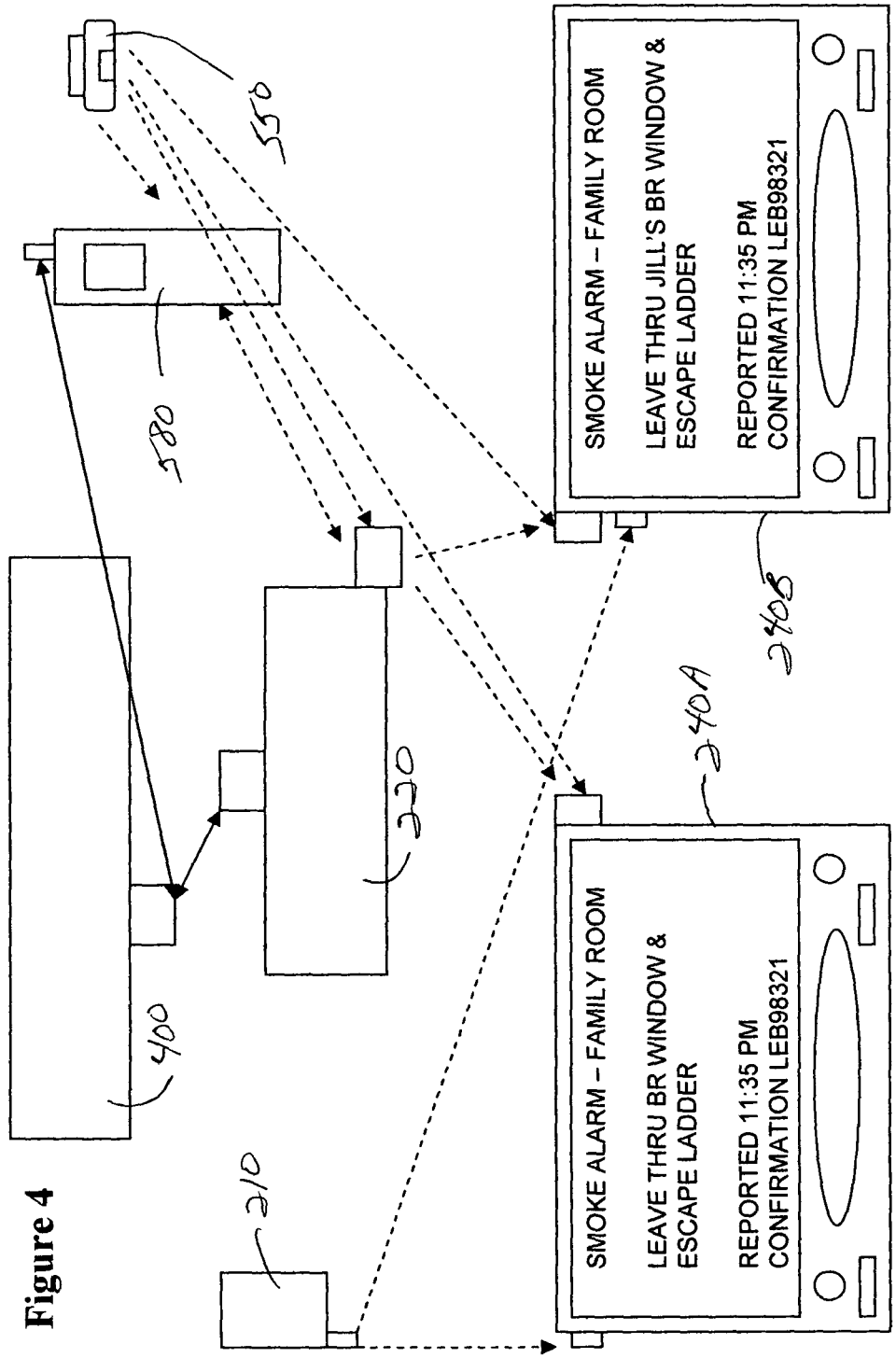
FIG. 4 is an illustration depicting a present invention system embodiment in an emergency mode condition with some of the present invention apparatuses interacting in said mode.

The timer mode function accounts for setting a start and stop period associated with displaying user-selected or personalized weather content (or other content, pending on the menu options). The present invention system's environmental mode feature accounts for displaying or communicating desired notification and instruction over pre-selected networked devices in the event of a triggered or test environmental condition, where such condition is illustrated in FIG. 4 and will be described further in the narrative. The security mode feature accounts for displaying or communicating desired notification and instruction over pre-selected networked devices in the event of a breached or test security system condition. The entertainment mode function accounts for features such as, but not limited to, activating messaging, intercom, special occasion alerts, announcements or messages, xxxx voice messages associated with digital pictures, electronic games, personalized content, as well as certain appliances such as, but not limited to, televisions and/or radios based on a variety of parameters, wherein said designated appliances may be turned on or activated to display or broadcast, for example, a game on a respective channel based on said parameters such as, for example a certain team having a tied score at a certain period of a game (the preceding will be described in more detail further in the narrative), whereas said features may or may not be desired to be activated on other appliances or devices.

The preceding FIG. 9 description is a sample of administration sequences associated with the controller 220 and associated system 200 peripherals. Similar sequences as illustrated in FIG. 9 may be operated through remote control units as well as wide area network communications devices and web servers. Other administration means may comprise PC software and/or web software where such means may comprise drop-down windows and/or more mouse (point and click or check box) driven options to facilitate timely and efficient function.

The operating system software associated with the information and device controller 220 embodiment may be a proprietary system or be adapted for a Linux or a Windows operating system, as well as other systems suitable to support a variety of languages, such as, but not limited to, Java.

The application software associated with the present invention information and device controller may comprise a variety of programs and be in a variety of embodiments.

In addition to the previously described web browser component and functionality, the other previously noted software applications may comprise one or more of the following basic functions: 1) a web-sourced data personalization conversion and/or communication function; 2) a broadcast data receiver function and broadcast-sourced data personalization conversion and/or communication function; 3) a networked device controller function for disseminating personalized content to one or a variety of peripheral apparatus(es); 4) a networked control and controller device function for controlling, activating, operating, and interacting with one or a variety of peripheral apparatus(es) under one or more program modes; 5) and a networked control and controller device function that performs the preceding operations under one or more of the following modes in separate or combination form—timer (with a variety of feature and setting parameters for a variety of appliances, apparatuses and systems); security; medication; medical device; biosensor; environmental (for example, but not limited to, smoke and/or carbon monoxide detector); entertainment; and safety.

The web-sourced data personalization conversion and/or communication application may account for a wide range of functions which may vary pending on the present invention controller and web site embodiments. For example, in an application where a web site may comprise content that is pre-selected and programmed to be personalized for a family, wherein said family has respective personalized content choices that may even vary based on time of day, wherein said users administered such content selection and criteria at the respective web site, the controller embodiment may comprise a program and browser that retrieves said content for each respective family member (or receives a download from said web site). Said present invention system controller and/or web server program may read and sort said content by family member name, content parameters, content identifiers, device dissemination or update transmission time and frequency, and then store the information in said controller and/or server memory. Said application program embodiment may then select such content based on family member name, and match said name against a device identifier that may display or communicate said content in priority of transmission time or trigger condition. In other web site embodiments, the content may not be as personalized, if at all, and, therefore, the information and device controller embodiment may comprise more personalization conversion functions. The present invention system may comprise an information and device controller embodiment that accommodates various levels of content and/or personalized sourced content. The concept of a "family" personalized content system is not limited by time, space or number. Hence, family members away at college, in the military or otherwise at a separate location from parent (s) may be included. A family in Florida may personally monitor a daughters weather conditions in a real time at a college in Michigan or in Paris.

It is to be appreciated that said web-sourced content may be carried over a variety of networks, including, but not limited to, a cellular network, paging network or Wi Max network, as well as other evolving technology means, wherein said means support personalized content subject matter, identifiers and information transmissions to respective compatible receivers or transceivers which may be connected to, integrated with, or separate from said controller and/or display devices.

The information and device controller software programs that support broadcast data receiver and content personalization functions may also be available in a variety of embodiments. Initially, said radio and/or television based data services may broadcast general content by content categories, such as, for example, but not limited to, weather, sports, stock quotes, financial indicators or indices, news headers/briefs, lottery results, and/or horoscopes. Said content may be broadcast over a variety of means, such as, as previously noted, FM, through for example, subcarrier frequencies, RDS transmission packets, digital satellite, HD radio, and/or in-band video modulation transmission signals. The personalization functions associated with broadcasted content may be performed at the information and device controller level, as well as web server level, as well as wide area network communications device level and/or combinations thereof.

The personalization conversion functions that said controller may perform with said broadcast content are similar to that which has been described with the web-sourced content and web-based personalization program. For example, the controller application program or a portion of said program may be administered in such a way as described with the FIG. 9 illustration and/or through like ways and means, such that specific content is retrieved from said broadcast transmission or transmissions (given that certain content may be transmitted over different receiver channels similar to the controller 120 channel description and application, such content may be received by the controller's program and communications embodiment which may switch and/or multiplex information from said channels) and, being pre-selected and programmed, is personalized by said controller 220 program for (a) user(s), where said user(s) has/have respective personalized content choices, along with formatting and dissemination preferences, wherein said dissemination preferences may include, but are not limited to, local area network communications links to respective networked devices, such as, for example, Bluetooth or ZigBee enabled portable devices and/or cell phones. Said program may operate in the same or similar manner as what has been previously described herein with respect to reading, sorting, storing, and processing said content.

The present invention information and device controller software programs that support the dissemination of personalized content may be in a variety of embodiments, such variety also is applicable to the peripheral apparatuses associated with such content. For example, such personalized content may be communicated to the following apparatuses that are adapted for the present invention: designated displays, digitized voice synthesis apparatuses, other digital to analog sound components, a variety of appliances, including desktop or nightstand clock radios, audio players, as well as, as previously noted herein, a variety of communications devices, as well as other forms of sensory communication means whether they are vibratory or olfactory in standalone or combination form(s).

Said software may support unique personalized content profiles for one or a number (and)/or variety of devices and displays in a living or work area. Said software and displays may be standalone, or integrated in a variety of instruments (including PDAs and cell phones).

The software that supports personalized content dissemination may comprise a variety of embodiments with executable programs for storing respective user and/or device content profiles, such as, but not limited to: content category and respective metrics (including, but not limited to, content identifiers and server addresses or server port telephone or text messaging addresses); display characters, formats and other content presentation accompaniments (which may range from text to symbols to graphics to visual and/or audible alerts or content presentation pictures and/or clips) with associated parameters, such as, but not limited to, device addresses, display screen sequences and/or fields (pending on the type of display embodiment), screen display times (if applicable), update frequencies, audio content menu (including, but not limited to, audio content program sequences which will be described further in the narrative) and content order sequences, etc. Such user and/or device content profiles may also comprise system mode settings where certain devices may receive mode condition related messages, such as, but not limited to, entertainment mode conditions associated with a baseball game score. Said mode settings will be described further in the narrative. It is understood that not all of the preceding may be associated with a present invention controller and/or web server embodiment and/or a combination thereof. Some embodiments may have all or more of the preceding, while others may have less in order to address a variety of user segment needs.

Given the breadth of dissemination related parameters, the present invention system may comprise a variety of peripheral devices adapted to said system. Such present invention system peripherals can depict information or information conditions in, for example, but not limited to, text (and)/or graphic (and)/or color (either in background, marker, orb, enclosure or projected embodiments) (and)/or animated (and)/or picture (and)/or symbol (and)/or video clip (and)/or a variety of audio (and)/or broadcast (and)/or video and/or audio streaming and/or mechanized form. With respect to the variety of audio form, such displays or visually displayed content peripherals may also account for an audible component that may be activated based on the controller content (and)/or display content (and)/or on-demand content or content identifier program. Said audible component may be pre-recorded voices or music or voice synthesis chips. Said audible component may also be in the embodiment of a content-to-voice conversion apparatus, such as, but not limited to, text recognition to voice conversion software with associated components and associated amplifier and speaker circuitry. Each display and/or audio apparatus with associated communications means may be considered as a networked device or connected to a networked device. Said present invention networked peripherals may also comprise or be comprised in a variety of components adapted for and/or enhanced to provide greater utilities to the user, said adapted peripherals may be video players (from televisions to monitors with DVD and/or other stored program players such as, but not limited to video i-Pods and like devices and/or adjuncts) audio entertainment devices (from a variety of music players from MP3 players to iPods to ipod-like devices or adjuncts adapted to the present invention to a variety of radios and/or radio alarm clocks to stereo amplifier adapters to speakers), as well as a variety of remote control apparatuses, including as previously noted herein and in prior patent applications submitted by the inventor, cell phones that may be adapted for or function as said remotes.

The present invention information and device controller and present invention web server may also have a number of embodiments that comprise application software and associated components for controlling, activating, operating, and interacting with a variety of peripheral apparatuses, including those noted in the preceding paragraphs, under one or more program modes. Such controller embodiments and software may also perform the following functions in the context of either or both a personalized content means (which is described herein) or a device command/control and/or interaction point means. Much of the device command/control and/or interaction point means has been accounted for in previous patent filing applications submitted by the inventor; however, some of such embodiments as well as other embodiments associated with content identifier functions will be described in this narrative and associated illustrations as exemplary present invention system innovations.

The prior present invention system filing applications that account for medical, environmental, security, entertainment, or living or work area enhancement system modes and associated components and devices may be supported and strongly complemented by the present invention information and device controller embodiments described herein. One skilled in the art may appreciate the present invention system described herein as another embodiment of such prior filings submitted by the inventor set forth in the first paragraph of this application.

An illustration of such prior filings that supports such present invention information and device controller and/or supporting web server as another exemplary embodiment is an environmental and timer mode configuration and application, which may be one of a variety of said present invention configurations and applications. In addition, the application software that supports on-demand command/control and interaction functions may also be considered as part of this embodiment configuration.

The FIG. 1 personalized weather and information system embodiment 200 comprises an outdoor temperature sensor 210 which may be in an embodiment comprising a temperature sensor, 433 MHz RF transmitter and circuitry, a low-end microcontroller or like processor, plastic casing, circuit board and associated electronics, a battery support fixture and associated terminations, and securing and/or fastening means to support the preceding components in an outdoor environment. Such sensor 210 may record the temperature reading and transmit said record to the display 240 as well as the information and device controller 220, where said display and controller comprise compatible RF receivers and associated components for receiving and processing said temperature reading.

Said outside temperature reading, along with a variety of other types and forms of content, may be communicated and/or displayed, as previously noted, through a variety of means. The device controller 220 may comprise application software programs to support, but not limited to solely supporting, the following: display of information through a controller 220 server site portal frame or frames that may be accessed through a browser utilizing the controller 220 respective URL address which, again may be connected to and assigned through a router channel; communication of said information to a remote web site server for the processing and, at minimum, display of said information at such web server; and the processing and, at minimum, storage and time stamp of said temperature information within the controller 220 or through a storage means connected to said controller for the purpose of the recording and calling up of said information from a remote device or home networked device, such as the personal communicator 300 (FIG. 1). In addition, said controller 220 may communicate said reading to a variety of home-networked apparatuses adapted for the present invention system, as previously noted herein.

The display or posting of said content within a portal and channel connection to controller 220 may serve a variety of utilities for the purpose of allowing a user or user's relations to access said sensor content, where said user or relations may be within or away from said dwelling. It is to be understood that said sensor content may, again, be a part of a variety of content that said user(s) may access. The means for having said content processed and displayed at a remote site also may facilitate a variety of utilities for a user or user's relations in a similar manner to what is described in the preceding sentence. For example, said content may be processed by a program application within controller 220, within a processor associated with display 240, a LAN server associated with controller 220 or said content, or a remote server, where said program may execute a match of said temperature recording against a pre-set temperature range, where certain functions may be performed based on said reading being within or outside of such range. An outside of range function example may be to activate a chime alert on a remote control unit and/or personal communicator 300 and/or television and display such temperature reading on said device(s). Another example of a program associated with an out of range temperature reading may be a remote server program that activates the generation and transmission of a message to a designated address list through an instant messaging network gateway and associated service, upon the receipt of a communication generated by a program that was triggered by such out of range condition.

It is to be appreciated that the preceding example of a present invention reporting function associated with an out of range temperature recording is an embodiment of a more encompassing reporting capability, wherein said capability may reside within the controller 220 and/or web server 400 and/or display 240 and/or audio component 260 (FIG. 1) and/or other present invention innovations. The said controller 220 reporting function may be associated with other device 220 functions for receiving (and)/or polling data (and)/or information from (and)/or interacting with designated networked (wired (and)/or wireless) devices (and)/or apparatuses (and)/or sensors, such as 210, and, again, reporting (and)/or disseminating such data or information in a variety of routine and/or exception parameters and communications means, which include those described herein. Said reporting function may also be associated with the variety of controller 220 modes described herein, such as residential or commercial environmental, security, medical and/or safety system modes.

An illustrative present invention program application associated with said controller 220 processing and storing said temperature content for the purpose of communicating such or other personalized information in an on-demand function is depicted in FIG. 1. In order to present an example of the scope of on-demand personalized information that may be associated with the present invention system, FIG. 1 depicts a personal communicator 300 (which may be in the embodiment of, for example, a remote control unit and/or cell phone) executing a wireless transmission that utilizes a ZigBee protocol (even though, as previously noted, other wireless protocols may be associated with the present invention system) wherein said transmission enables the generation of on-demand audible traffic content. Said transmission may comprise a command set of instruction to the information and device controller 220 for the retrieval and transmission of certain traffic information to a receiver associated with a personalized audio content component 260 for the purpose of communicating said traffic information in audio form over said component 260. Said component 260 may be in a variety of embodiments, such as, for example, the type depicted in FIG. 1, in the form of a recessed speaker. As will be described further in the narrative, said traffic information may be selected and retrieved from said controller 220 through the transmission of a coded instruction set that may account for a respective information sequence content header, such as, for example, a traffic audio command to be played at the device network address associated with audio component 260 where said information may be associated with, for example, a second menu entry associated with said traffic content, where said menu entry may be associated with a user's primary commute route. Said primary commute route is quoted in the FIG. 1 illustration as "Route 78 East . . . ".

Figure 3:
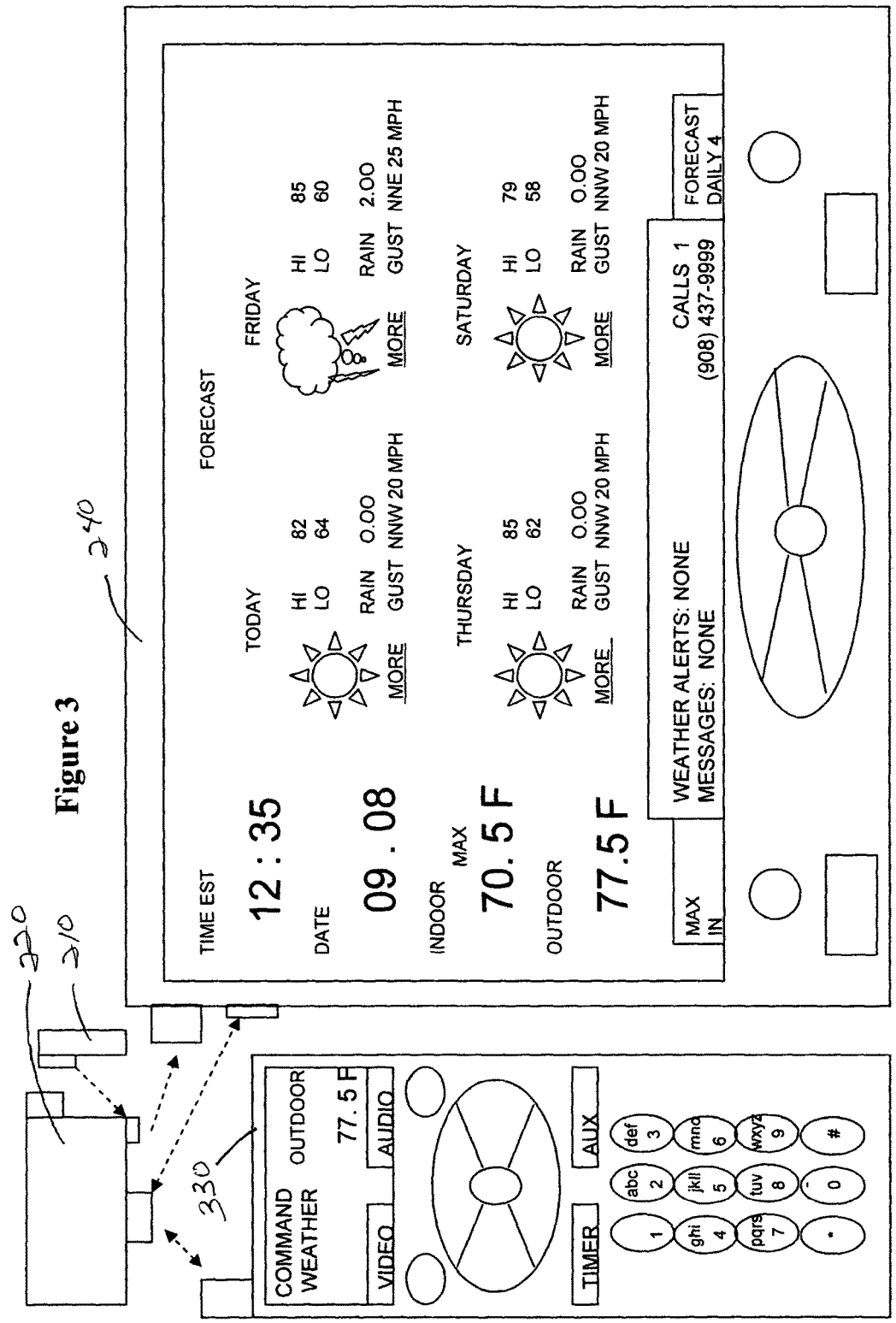
FIG. 3 is a front view of a sample present invention personalized weather and information display configuration that includes a present invention sample remote control embodiment.

Another example of on-demand command and information access through one of the present invention innovations is illustrated in FIG. 3, where a remote control unit 330, which comprises a two-way coded wireless communications capability, such as, but not limited to, ZigBee, communicates to device controller 220, where said communication comprises the receipt of an outside temperature reading, where said reading is recorded and transmitted from outdoor sensor 210 to controller 220 for the purpose of, among a variety of other functions, processing, recording and storing said content for on-demand retrieval and communication.

The variety of present invention information and device controller embodiments associated with on-demand command and/or information access is based on prior patent filing applications submitted by the inventor, wherein said filings account for said controller as a device operation and interaction gateway for a networked dwelling in an on-demand and/or timer mode, as well as, but not necessarily, other modes. Said controller, as noted in the previous filings, supports significant utility and economy by offering functionalities that, heretofore, would have been available in standalone and duplicative forms.

A controller embodiment that has been submitted in previous filings that, again provides significant utility to a variety of users and associated entities is a timer embodiment, particularly, but not necessarily when said embodiment is integrated or connected to a router, such as a Wi Fi router as noted herein. Said present invention timer embodiment in router or standalone form, when coupled with functionality and means for supporting the dissemination of personalized content as described herein, delivers significant utility and economic value to the user that is unavailable in any other timer apparatus or system. Said timer embodiment may be utilized in conjunction with a variety of peripherals or peripheral systems adapted to said present invention, such as, but not limited to, ZigBee (or, preferably, two-way coded wireless or wired communications means) equipped light switches, lighting (indoor and outdoor—including the various present invention lighting embodiments described herein and in other prior filings), previously filed present invention electrical embodiments, networked appliances (a variety, such as, but not limited to, coffee makers, various ovens, etc.), environmental control systems, heating and cooling system controllers or present invention system peripheral thermostat switches or mountings (such as, but not limited to, central air and heating system controllers, thermostat mounting switches or thermostats, including mountings and switches that network existing programmable thermostats, adapted for said present invention system with said wireless communications means and, pending on the configuration, associated processor, software, memory and other applicable components), and other networked (preferably, ZigBee—equipped) apparatuses and systems, including, but not limited to, irrigation systems. Such timer embodiment may comprise a program that registers remote device receipt acknowledgement of timer program-initiated ZigBee transmissions as well as errors associated with such transmissions or may generate and transmit such record in a report to another device or server site, such as a web server 400, through, for example, said router channel over a Wi Fi or broadband interface connection.

The present invention timer innovation may comprise programs that have been described in the aforementioned previous filing applications by the inventor, such as, but not limited to, present invention device or device group or feature or feature group settings (such feature group settings may comprise, for example, but is not limited to, a random feature or a seasonal setting feature). For example, an enhanced version of a random setting function comprised in this timer embodiment may comprise programming such setting for a designated group of devices at (a) designated day(s) or date(s) or week range. Such group of devices may utilize, but not necessarily, such random setting function while another group may maintain a consistent on and off setting. Such devices may be grouped by location(s) and/or types. Such device groups may be comprised in a larger group. For example a group of such groups may be associated with a seasonal setting grouping. The seasonal feature accounts for setting time modes associated with seasonal daylight variances. Such groups may comprise outlets such as outdoor power receptacles for Christmas decorations, or other permanent electrically powered embodiments such as outdoor lighting fixtures, front door lights or sprinkler systems, where such fixtures and systems electrical circuit switches are adapted with a wireless coded communications capability (such as ZigBee) and electrical relay and circuit switch means. The seasonal feature may also apply to all system devices or apparatuses where such components may be categorized having such feature group setting. The present invention seasonal feature innovation is another embodiment of the timer mode function where such mode accounts for a program that may utilize a day or date calendar setting with a time mode equation where such setting may comprise a unit counter such as a minute counter where, for example, such activation start time equates to the preceding day time setting plus one and a half minutes and such stop time may have a same program setting. Additionally, such mode setting may also be in a variety of embodiments where such setting may comprise a week, month, (and)/or calendar year setting. Finally, such mode feature may also be comprised in an embodiment where such timer may comprise a program that generates a series of communications (and)/or commands associated with the receipt of a mode command such as, but not limited to, an environmental mode command, where such communications and/or resulting outputs are depicted in FIG. 4 and described further in the narrative.

The preceding example of present invention timer programs and settings provide greater utility than other timer devices and systems which are often non-networked stand-alone units. This functionality, coupled with the appropriate network configuration or protocol or components or combination of the preceding, provides the means to provide other present invention embodiments, such as robotic indoor and outdoor appliances with integrated wireless communications means that may be adapted to work with such present invention embodiment(s). For example, a robotic or home-bot vacuum cleaner may comprise a wireless communications chip set, such as, but not limited to, ZigBee, where such vacuum may be activated by said associated timer mode program to run on a Saturday afternoon. Additionally, a robotic lawn mower with a wireless communications means may be activated to run at the same time. Said outdoor device may utilize a ZigBee, UWB or Wi Fi protocol pending on the size of the yard and networking means associated with such outdoor and home network. Said wirelessly equipped outdoor device may comprise diagnostics (and)/or sensors that may be associated with a program that, upon receiving or processing a certain set of conditions, may generate and transmit a wireless communication to a present invention router and networked timer and controller embodiment. The preceding may also be integrated with a present invention remote control device. Other out-of home systems such as a remote car starter, car diagnostic system, web-enhanced irrigation system or the present invention system 100 may also be adapted with the present invention system 200 and/or information and device controller. For example, device controller 220 may comprise a timer program that is associated with downloading personalized content that may be accessed through the controller 220 browser application program, router and said broadband connection, and then downloaded and communicated through Wi Fi interfaces to said present invention information and device controller 120.

Another advantage of this present invention embodiment over any timer device or system, which has been previously noted herein, is the administration and access means. Given that said timer function or component is integrated within the router or may be connected to a router port, said administration means may have a designated IP address, and, thus accessed with a browser-based device and/or program processor such as, but not limited to, a variety of PCs, PDAs, smartphones and cell phones with wide area network and/or local area network (such as Wi Fi) capabilities, servers, and present invention personal communicator embodiments (such as, but not limited to, cell phones, instant messaging devices and/or web server program user profiles and/or combinations thereof), as well as home entertainment units, such as a variety of monitors that may interface to some of the preceding along with wireless or projected keyboards. The present invention system may also comprise a user friendly software interface for timer system administration utilizing click through GUI means. As previously noted, said administration may also be performed through the LAN port of the router via an Ethernet cable that may be directly connected to a compatibly equipped device or device interface wherein said device may comprise a browser, such as, for example, a personal computer.

Given the preceding configuration, said present invention system administration may also be performed away from home with appropriate log-in and/or password means. This present invention embodiment supports administering a broad range of applications, from activating a generator to turning on a Jacuzzi or hot tub or sauna, to activating or adjusting networked thermostats. Said remote administration capability, again, also provides the means to receive help from a family member or third party to support the operation of said system and also support the focus of said present invention system to provide the means and functionality for widespread acceptance for a variety of users.

The ability for said timer function to interact with a myriad of devices may be enabled through a standard, such as, but not limited to, ZigBee or Zensys. As said standard(s) and other standards evolve to account for more device and device interaction functionality, as well as additional new devices and associated functionality, said timer and router and/or device controller may be comprised in an embodiment that supports modular interchangeable circuitry and software patch or update downloads to accommodate new functionality. The router or access point integration with said timer provides for this ease of administration, access and support advantage.

The functions described herein may also be enhanced through other functions such as receiving input transmissions comprising a user profile and/or content identifier code and the transmitting and/or receiving device or server address or set of addresses associated with said profile and/or content identifier code transmission along with, but not necessarily, specific commands. Said information may be received by the ZigBee, Zensys, Bluetooth, other local area network and/or wide area network receiver, processed and forwarded to the controller or web server processor and program for generating table programs for matching said code(s) and device addresses where said matching generates an execution or series of executions or transmissions pertaining to said information or content. Said transmissions may range from, but not limited to, activating certain lights or certain light settings, to activating drapery settings, to turning on certain entertainment components at specific settings and/or channels, to turning on car systems at driver and passenger defined settings, to transmitting personalized content to certain devices, server programs, web sites, and/or email listings based on said user profile and/or content identifier code(s) and associated matching personalized content profiles or user preferences.

Another enhanced embodiment of the present invention system comprises activating (and)/or monitoring certain devices (and)/or systems while away from home. For example, a heating and cooling system or zone(s), appliance or lights may be activated while a user may be traveling en route or at the office by enabling said functionality through a browser-equipped and/or wide area networked communications device. Continuing with this example illustration, said device may comprise a URL bookmark for a present invention device activation site page associated with said controller embodiment. Said site page may comprise at least one or more programmable button field GUI symbol(s), wherein said field may represent, for example, a device group and another button may represent a command, such as, "ACTIVATE". Said site page may also display, but not necessarily, real time sensor updates such as, for example, indoor and/or outdoor temperature readings. Said readings may be generated from present invention weather instruments that may comprise a processor, program, memory, communications means, such as but not limited to, ZigBee, and associated electronics components. Said weather instruments may be in (and)/or integrated or interact with a variety of embodiments, such as the timer and controller embodiment described herein (and)/or the personal communicator 300 or 330. Said instruments may comprise a programmable processor and program for generating at least one ZigBee transmission to at least one present invention controller when a reading or set of readings are outside of a certain range. Said controller or server may activate a program to transmit a temperature reading and reporting command on an hourly basis during a rush hour period, wherein said command may request the weather instrument to record and transmit a reading to the present invention device controller and/or integrated display and controller device. As indicative of the preceding, the many embodiments of the present invention system support a variety of robust applications.

Said networked controller and timer (and)/or networked timer apparatuses may be adapted to utilize other communications protocols, such as, but not limited to, digital cellular, Bluetooth, UWB, Wi Max, HomePlug™, (and)/or other Ethernet compatible networking means. Additionally, said device may also comprise a dial-up modem capability. Said embodiments may also be adapted with other unique capabilities to interact with automobile communications systems that may range from car phones, to car console systems, to hybrid communications and diagnostic systems integrations with satellite systems as described herein. The preceding may also be adapted to be in other embodiments, as previously noted, such as servers, personal computers and other appliances, such as, but not limited to, televisions and radios. It is preferred that said innovations be utilized in or with a Wi Fi router (and)/or access point and ZigBee full function router/controller embodiment behind a firewall configuration to optimally deliver said robust utilities and applications at a low incremental cost. Additionally, said standalone embodiment, when connected to a router port may also deliver significant value for the user.

It is to be appreciated by the narrative and illustrations described herein that said timer and on-demand command and control device access may be available in both a variety of embodiments and modes. Another unique present invention embodiment that supports economy and utility of the present invention on-demand controller functions is the operation of the present invention display and audio components under environmental, security and safety modes. For example, as illustrated in FIG. 4, a present invention smoke detector and alarm 550, which comprises a processor, memory, program, interface means and circuitry assembly that supports the transmission of coded messages, wherein said transmissions may be wireless (such as, preferably, but not necessarily, ZigBee) and/or wired and may comprise content such as or associated with, but not limited to, the network address of said detector, the location of said detector, and the network addresses of devices designated as the recipients of said transmission, may become activated upon the detection of smoke. Said sensor activation may emit an alarm and the preceding type of transmissions. One transmission which may comprise the preceding content may be directed to a present invention cell phone 580 wherein said phone may comprise a ZigBee chip set, a directory and a messaging component. Said phone 580, upon receiving the ZigBee transmission may process it wherein said processing may generate a program that activates the retrieval of a pre-formatted text message wherein said message may account for one or more of the following: the home address, time stamp of said ZigBee transmission receipt, location of said triggered sensor, the number of occupants in the home, and pending on whether there may be a security service that may be associated with said dwelling, a content identifier code associated with other characteristics relevant to the dwelling and/or members associated with said dwelling. Alternately or in complement with a transmission to phone 580, said smoke detector may transmit a message to controller 220. Upon the retrieval and formatting of said message, a controller 220 directory program may be activated wherein certain directory entries such as fire department and alternate family, relative or friend contacts are accessed and tagged as recipients for a text or instant messaging message. Said program may then activate the transmission of said message to the preceding recipients as well as a service server such as web server 400, which may receive and confirm receipt of said message. Said server 400 receipt confirmation may be transmitted to said cell phone 580 as well as information and device controller 220. Smoke detector 550 may also transmit wireless coded messages to both controller 220 as well as displays 240A and 240B. The processing of said transmissions by the preceding components may result in the outputs depicted by the text on said displays 240A and 240B, as well as audible messages associated with said text. The display readouts comprise like text messages with the exception of the exit instruction associated with each display. Said device specific instruction is another example of the present invention embodiment of providing personalized content. Said personalized content may be generated from a program either in controller 220 or the respective displays, wherein upon the receipt of said transmission from detector 550, wherein said transmission may comprise the network device address and/or location of said detector (e.g., family room), said message is processed where the exit message accounts for the location of said detector in relation to said display.

It is to be appreciated that the preceding alert and personalized content message and environmental mode application may also have similar applications to other modes such as security and medical or health, as well as entertainment modes. For example, in the event that an alarmed window becomes open or a security sensor is activated, said security breach may cause the trigger of a variety of outputs which may include the display or audible enunciation of text that may be associated with said breach.

The present invention system generated on-demand embodiments and associated functions may apply to a variety of other features, such as, for example a calendar embodiment. Said calendar embodiment may function as a group calendar, either on, but not limited to, an information and device controller 220, display 240, integrated display and controller 290, server, web server 400 and other processor and memory based and display (as well as audio) apparatus with sufficient capacity and communications capabilities. In addition to performing a broad capability of scheduling and alert functions, the present invention calendar may support a community, such as, for example, a family, wherein family members may submit various types of appointments to the one calendar application and said application processes said inputs in a number of requested sequences. One sequence may be children submitting calendar events with ride requests wherein said ride requests may only be performed by a parent. Said scheduled event may then be communicated to said parent through, for example, the controller 220 communications means, such as, for example, a text message. Said calendar may be accessed remotely to facilitate scheduling and minimize scheduling conflict. The calendar application may utilize other forms of content as input. For example, one calendar application embodiment may support a calendar submission wherein said input accounts for the appointment as an outdoor event and said submission may request periodic weather update inputs wherein said updates may be run under a program that may alert the scheduled participants if said weather update accounts for various types of inclement weather or out of range temperature settings. Said calendar and weather application may operate in a similar manner to the controller 120 and GPS system 170 relative to content input updates, such as traffic, associated with a program application, such as GPS.

The present invention calendar system may also support authorized third parties, such as, but not limited to, a doctor's office that supports an elderly patient, to utilize said system. For example, a doctor's administrator may submit a schedule request to said calendar, wherein said calendar may have a request page URL either or both on a web site and/or controller 220 or other networked device, wherein said request is processed in association with other calendar content and the output of said request and/or request interaction is a confirmation for said doctor's administrator. Said calendar may communicate a schedule conflict to said administrator, should such condition occur. Said calendar program may also comprise a variety of alert and/or reminder notification functions for said patient or said patient's relative, as desired, wherein said notification may be programmed by the patient or a patient's relation either on site or remotely. The utility associated with the preceding, coupled with other related previous patent applications submitted by the inventor, coupled with the present invention system described herein, may serve as a great aid for enhancing one's lifestyle, as well as, for example, those who desire to help an elder relative's lifestyle yet who are not in close proximity to said relation.

It is to be appreciated that the embodiments described herein are some of many that are exemplary of the present invention system. Said system capabilities and utilities may also be understood further in the following narrative sections.

Peripheral Apparatuses and Controller Integrations:

As previously noted, the present invention system may interact with a variety of peripheral apparatuses adapted for said system. Some of which may comprise or be present invention embodiments in standalone form and some may be also appreciated as embodiments integrated as part of the overall present invention system.

Said peripherals may provide output means for the personalized content described herein by receiving input from, for example an information and device controller 220. Said peripheral input may be received from a wireless or wired communications transmission or a wired connection from said controller 220. Said peripheral content input may also be generated from other sources either with or without input from controller 220. It is preferable, but not necessary, that said peripheral apparatus receive input from other sources in conjunction with said controller 220 to provide the most utility to the respective present invention user.

An exemplary embodiment of maximizing the utility of content sources for a peripheral device is, as previously noted, a present invention hybrid-sourced personalized weather and information display or personalized weather station (PWS) embodiment 240. Such embodiment 240 may account for at least one or more weather metrics associated with one's immediate surrounding, such as, but not limited to, an indoor and outdoor temperature and/or humidity reading sourced from sensors within or around a dwelling area, where such sensors may transmit said readings either or both to said display 240 as well as said controller 220. It (240) may also account for other weather metrics and forecasting information from other sources, such as, but not limited to, internet-based content, where said content may, for example, but not limited to such example, be transmitted from controller 220 (said controller 220 may access, process and disseminate said content in a manner and with the means as previously described herein). Said PWS may account for, for example, basic residential localized weather information, while also accounting for comprehensive localized weather (such as, as previously noted herein, from a more comprehensive high school weather system which may be located four miles from the user's residence) and forecast information at a price performance capability that is significantly greater than purchasing a comprehensive Personal Weather Station for one's household. Where the difference may be in the hundreds or thousands of dollars in association with a difference of a few miles, this hybrid-sourced PWS provides greater economy and utility. In addition, as also previously stated, such display 240 may also show other personalized content, such as, for example tide information, other related maritime information, as well as fishing reports. Other personalized content examples will be described further in the narrative.

Figure 2:
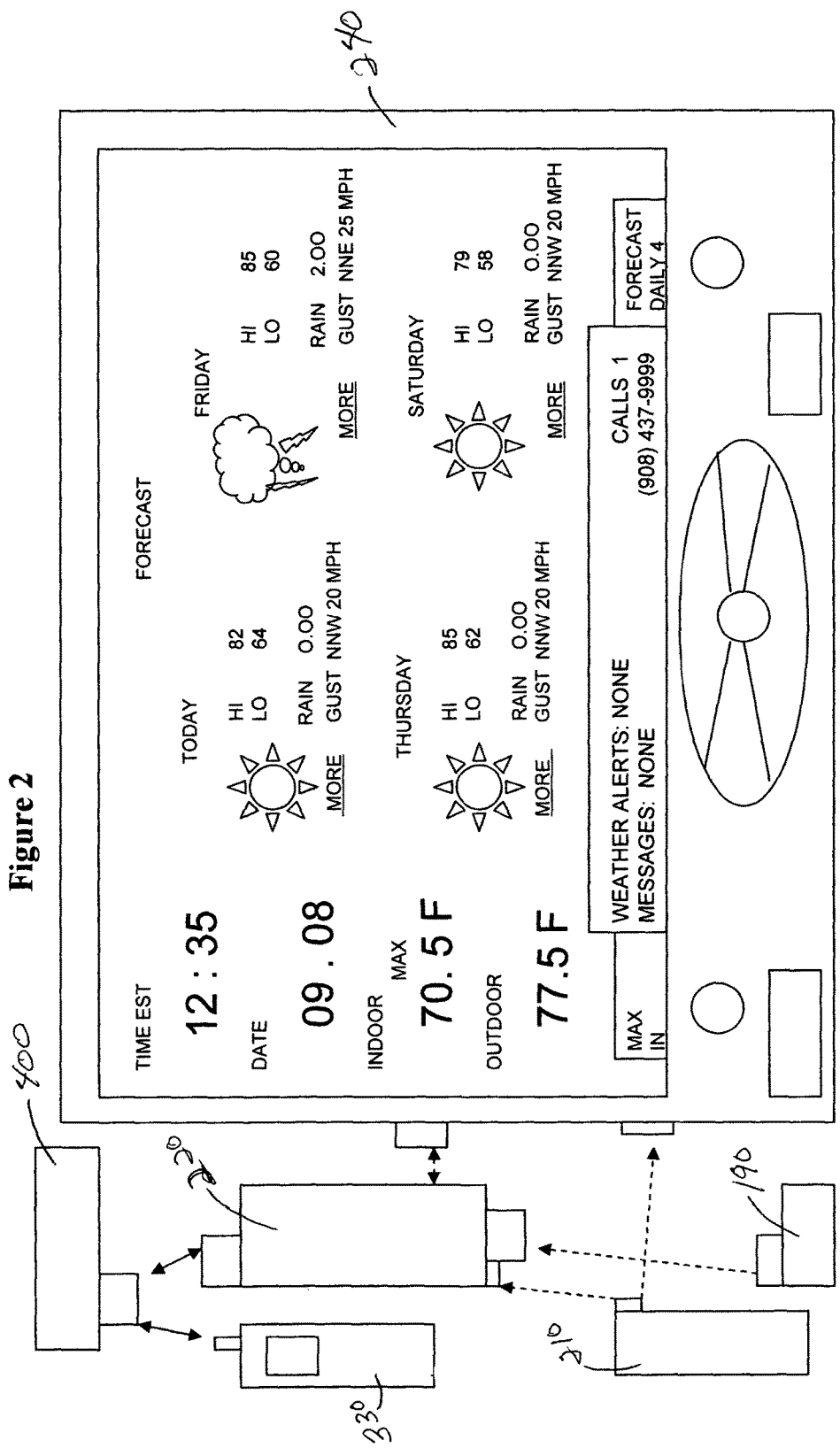
FIG. 2 is a front view of a sample present invention personalized weather and information display configuration that includes other present invention interactive or networked devices.

Said display 240 may also comprise the means to display a variety of screens, screen sequences or frames to support the variety and quantity of personalized content that may be adapted for the present invention system. Said screen sequences may be scrolled through a variety of embodiments, such as, for example, through a means on the display, as illustrated in FIGS. 2 and 3, or through an on-demand remote control or wide area communications interface means, voice or audible recognition commands, timer, environmental, security, entertainment, medical or health mode programs, or other mode programs that may support content, alert and notification functions, as described herein.

Said display and like apparatuses described herein may comprise the following: a processor, memory, communications means, input means (as previously noted), and output means, an interface means, software, as well as additional components which will be described herein, pending on the respective embodiments and system configurations.

The output means may comprise a variety of embodiments to support displayed and audible information formats and projection means—from fixed pixel liquid crystal displays (LCDs) to display frames to bit mapped to light emitting diode (LED) to organic light emitting diode (OLED—either small molecule or polymer based embodiments). As more OLED technologies evolve, the low power display means associated with OLED technology, coupled with low powered communications means associated with ZigBee technology may support a variety of low power present invention portable standalone and/or integrated networked displays in a variety of embodiments. It is to be appreciated that said low power display embodiments may also be currently available with the present invention system, by utilizing the preceding display components along with a ZigBee communications apparatus and associated battery powered means. In addition, pending on user preferences, said display may also account for full color high definition resolution to account for text as well as a range of high resolution applications, such as, but not limited to, from digital pictures to video frames to streaming and/or broadcast video.

In addition, said display may also comprise the means to project said personalized content onto a, preferably, planar surface. For example, utilizing the controller 220 calendar application embodiment, upon receiving a transmission from controller 220 wherein said transmission is associated with a 220 calendar program to generate and disseminate a certain message at a designated date, start time, interval and stop time, wherein said transmission may comprise personalized content and associated command/instruction set, said display may project a birthday greeting, which may also be supported with a variety of visual and/or audible embodiments, on a designated planar surface. Even though said display may comprise sufficient memory and interface means to support the preceding application in standalone form, the present invention means to operate said application through a controller 220 or integrated display and controller 290 in conjunction with said display and/or other apparatuses facilitates economy and time for the end user by accounting for said application and/or like applications in a centralized fashion.

Said display and/or peripheral apparatus embodiment memory configurations may comprise a variety of memory embodiments, such as, but not limited to, random access memory (RAM) chips, read only memory (ROM) chips, a fixed storage component, such as, but not limited to, a hard drive, a removable storage component such as, but not limited to, CD, diskette, USB dongle, flash memory, etc. In addition, said display may also utilize the controller 220 or web server 400 memory means through the appropriate configuration to support sufficient memory requirements and access.

Figure 11:
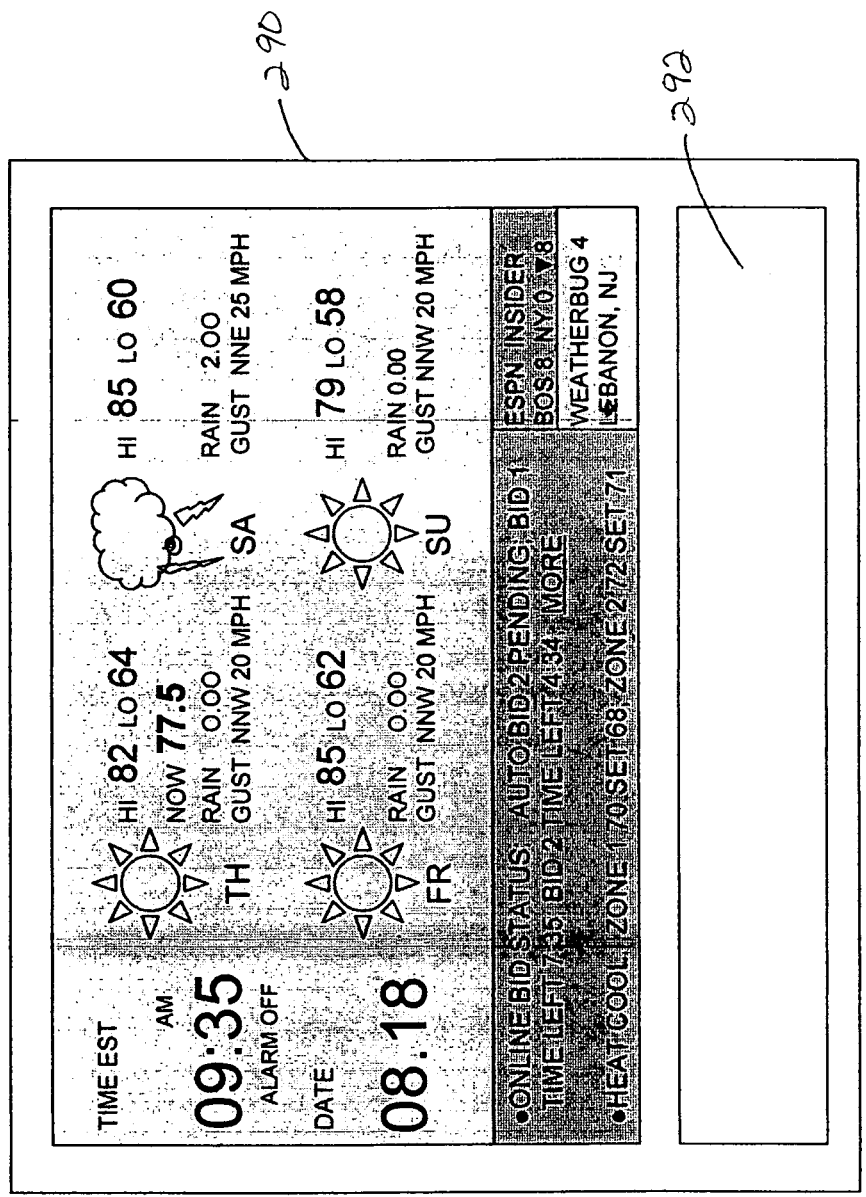
FIG. 11 is an illustration of the present invention personalized weather and information integrated display and information and device controller with an integrated processing and communications means.

The display may be powered through battery and/or other electrical means, pending on capabilities and the associated configuration. As previously noted, said display may also be comprised in a variety of embodiments, such as, but not limited to, an integrated display and controller 290 (FIG. 11).

In addition to interaction with a controller 220, said display 240 may also be connected to a personal computer via a USB, wireless (such as, but not limited to, Bluetooth, Wi Fi, ZigBee, etc.) or infrared connection wherein said personal computer may comprise a program that communicates with a remote server, such as a web site URL, and receives and/or processes personalized information designated for said display and communicates with said display via the noted means to output the associated personalized content. FIG. 5 depicts an illustrative configuration wherein said displays are networked to said personal computer.

Said display may also interact with a variety of other apparatuses adapted for the present invention. For example, FIG. 2 depicts a personalized weather and information display interacting with a controller 220 and a networked answering apparatus 190 with a caller identification (ID) unit and ZigBee wireless communications means. Said voice message apparatus 190 may comprise a processor, memory and a program that may communicate the most recent originating number that called in and whether the party associated with the said number left a message. Said matching of said number with a message status may be accomplished through a number of means. One of said means may be a time stamp range match software program that may be associated with the time in which an incoming call was registered and the time in which a message was left. Said caller ID and message status communication may be transmitted to controller 220 (pending on the embodiment configuration, it may also be transmitted to display 240 and/or display and controller 290), wherein said controller may receive and process said communication and transmit a data packet to display 240 comprising the personalized content associated with the apparatus 190 communication. Said data packet may also account for instruction set information associated with the placement or formatting of said content and may include whether said content would be projected on a, preferably, planar surface.

Said voice message apparatus 190 may also perform with other two way coded communications compatible devices to provide greater utility to the user in comparison to other answering or voice messaging apparatuses. For example, said apparatus 190 may interact with a ZigBee equipped remote control or cell phone device adapted for the present invention system wherein said remote or device may control the operation of said apparatus. One example of said on-demand control may be associated with the activation of said system's message greeting and recording means and function. Said device interaction provides significant utility to the user or user's family when said user's telephone may ring during an undesired time, such as for example, during the dinner hour. In this example, said user may access said remote or cell phone wherein said device may have a preprogrammed button, touch screen button or menu function that, upon its depression, activates a coded transmission to said apparatus 190 to activate said greeting and recording function. In addition, given the remote functions as a two way communications device, said remote or cell phone device may comprise an embodiment that enables said device to receive, process and display caller ID and message information in a similar or same manner to the previous description associated with the FIG. 2 illustration accounting for the interaction with said apparatus 190, controller 220 and display 240.

Another embodiment or configuration that may be comprised in the preceding voice message apparatus 190 embodiment is a telephone and speakerphone apparatus that utilizes a ZigBee (or comparable) chip set and associated software program. Said telephone and speakerphone apparatus may receive and process ZigBee transmissions wherein said communication may comprise a telephone number or directory name and command or instruction means that activates a program in said apparatus to go off-hook, turn on said speakerphone and dial said transmitted number or the number associated with said transmitted directory name. Coupled with ZigBee equipped devices, such as the remote control unit/personal communicator 330 (FIG. 3), the present invention telephone and speakerphone apparatus expands the capability or universality of remote control units and provides economy and convenience for a variety of end users.

Yet another embodiment or configuration that may be comprised with the voice message apparatus 190 is a cordless telephone base and cordless headphone that may utilize ZigBee and/or other coded wireless operations means. In utilizing a remote/communicator 330 as an illustrative transmitting means, said cordless telephone base apparatus may receive and process ZigBee transmissions wherein said communication may comprise a telephone number or directory name and command or instruction means that activates a program in said base apparatus to: go off-hook, transmit a communication (preferably, ZigBee) to said cordless headphone to go off-hook (said transmission may also be generated from device 330), and dial said transmitted number or the number associated with said transmitted directory name. It is to be appreciated that the preceding communications application may also be the basis for answering telephone calls, wherein upon the user hearing a telephone ring, the user may answer the phone call through the remote/communicator 330 in a variety of means. For example said cordless phone may generate a communication to the device 330 which may comprise the incoming call telephone number and generate a program in said remote to display said number and a command on the lower left portion of said display to answer the phone, with the display of, "Phone 1" and a command on the lower right portion of said display to activate the answering machine, with the display of, "Record". The depression of the button below the lower left portion of the display may send (a) ZigBee transmission(s) to activate the cordless base and speakerphone or headset to go off-hook to answer said call.

The controller 220 may also comprise (an) embodiments of functions to provide a variety of utilities to the answering apparatus 190 embodiment(s). For example, with reference to the previous illustration associated with said apparatus 190 capturing caller ID information, apparatus 190 may transmit said information to controller 220. Controller 220 may also process said information wherein said processing may generate a counter program that tabulates the number of messages left on said apparatus and posts said message quantities, associated caller ID numbers and/or other caller ID numbers on said controller's URL page or a remote server's (400) web page, where said page may be a summary page of said user's networked home activity or system status. Said controller 220 may also generate a program where upon the receipt of a transmission from answering apparatus 190, a screening function may be generated to compare a caller ID number (which may be accounted for in the data packet portion of the transmission) against a table of certain numbers. If such caller ID number matches a table number entry, said 220 program may activate and transmit a notification message to a respective user regarding the receipt of such number and whether such caller left a message. Said notification message may be in a variety of embodiments and means, such as, but not limited to, a text message that may be transmitted through a cellular interface associated with controller 220, wherein said cellular interface may be integrated with controller 220, or said interface may be accessed through controller 220 through ZigBee interfaces at controller 220 and a cell phone device wherein said phone may process said ZigBee transmission and generate a program accounting for said text message and its transmission, or accessed through controller 220 through a remote web site with a cellular messaging interface to an instant messaging service.

Another embodiment of a notification means associated with said controller 220 program may be utilized in conjunction with said apparatus 190. Said controller 220 may transmit a ZigBee message which, like the transmitted message associated with remote/communicator 330, may comprise a number to dial, as well as the caller ID number and whether the caller left a message. Said apparatus 190 embodiment may receive and process said transmission and generate a program that enables a dialer function and the play of a pre-recorded message sequence associated with said message program. For example, said answering apparatus 190 may dial a user's cell phone (based on said 190 program activation), and play a pre-recorded message upon the recognition that said cell phone goes off-hook by either the user or a voice greeting and recording associated with said user's cell phone service. Said pre-recorded message may be one of many types of pre-recorded messages. The pre-recorded message associated with the caller ID generated program may account for announcing, "This is a caller ID notification call for the Scannells, please press 1 to get the caller ID number, 2 to get the message, 3 to get other messages, 4 to access the main menu or the pound sign to disconnect".

The controller 220 may utilize the apparatus 190 call-out embodiment program and means that may support a variety of pre-recorded messages to perform other utilities to support the economy, versatility and widespread acceptance of the present invention system. For example, the various mode programs and associated functions of the present invention information and device controller may be associated with the apparatus 190 and its pertinent pre-recorded messages. One such pre-recorded message may be associated with an out of range indoor temperature sensor reading where said reading may have been received and processed by controller 220 and said processing may have generated a transmission to voice messaging apparatus 190. Said transmission may have accounted for an environmental mode code, temperature reading and location of said reading sensor. Said transmission may be received and processed by the apparatus 190 program wherein said program may generate, for example, a menu search and table match with said environmental code, its associated pre-recorded message and a directory entry that accounts for the contact number associated with the recipient of said pre-recorded message. Said program may then generate the call-out function and play of the following sample message, upon recognition of the receiving end off-hook condition, "This is an indoor temperature condition call for the Scannells, please press 1 to get temperature information . . . or 4 to access the main menu.

It is to be appreciated that the preceding call-out apparatus and program embodiments may share components and functions with the controller 220 or be comprised in its entirety in other embodiments of the present invention information and device controller, as well as a web server 400. For example, another controller embodiment may comprise a telephone network interface and receive touch tone keypad input as a means to command and/or administer said controller functions. With respect to said example embodiment, said pre-recorded message may also comprise a prompt to access a system administration menu to activate other system peripherals such as a thermostat system interface for adjusting said system settings. Said prompt excerpt such as, for example, " . . . press the desired temperature setting number, such as 68 for 68 degrees . . . ", may be accounted for in said touch tone interface system. Upon the receipt of input, the controller program may create and generate a transmission message accounting for the networked thermostat control device address and the associated control command and information. Said controller may also account for an output wherein upon the receipt of an out of range temperature or humidity reading in a certain room, a series of transmissions that may comprise a thermostat setting activation or networked humidifier activation wherein said networked humidifier may comprises the communications (such, as a ZigBee chip set) and interface processor adapted for the present invention system. Said controller may also comprise a program to generate and transmit a thermostat and/or humidifier diagnostics activation and a call-out capability, as previously described, after a designated period of time if the associated indoor temperature and/or room humidity reading does not fall within said system's pre-set range(s).

It is to be appreciated that the preceding controller and apparatus programs, functions and configurations may be accounted for in a variety of embodiments, as illustrated in some of the said embodiments described herein.

Another variety of present invention system peripheral apparatuses for communicating and presenting personalized content is decorative fixtures and/or figurines. Said fixtures and/or figurines may comprise the previously described means to receive and process coded transmissions from a variety of devices such as, but not limited to, a controller 220. Said fixtures may range from figurines that may depict, but not limited to, cartoon, movie, or television characters to decorative lighting fixtures. For example, a cartoon character figure may comprise a mechanical embodiment to depict a condition associated with personalized information content wherein said embodiment may be a mechanically operated arm and hand wherein said arm and hand may be rotated to communicate a hand in a thumbs-up or thumbs-down position. Said rotation may be generated by a software program wherein said program may reside on a chip wherein said chip may comprise interfaces or leads wherein one of said interfaces may be activated or electronically charged based on whether content or a content metric that may be read and processed by said software program is within or outside of a certain pre-determined metric range or description (for example, a forecast that may account for sunshine, clear skies, partial clouds, or snow may generate a thumbs-up position, while any other reading may generate a thumbs-down position). In addition, upon the activation of said program to audibly communicate information, said communication may be preceded with a pre-recorded familiar voice-over quote associated with said character figure. For example, a forecast of sunshine may be preceded and/or concluded with an exclamation of, "Woo Hoo!", while a forecast of rain may be preceded and/or concluded with an exclamation of, "Doh!". Said character may also comprise or be associated with a display or projection apparatus, such as a LED-equipped component wherein said component may comprise or be connected to a processor, program and memory that supports the emission of a certain color to indicate a certain type of criteria associated with personalized content that the associated processor and program may have received and processed.

The present invention peripheral apparatuses may also comprise an integrated information and device controller. For example, FIGS. 6 depicts a personalized weather and information display that comprises said controller. FIG. 6 also depicts a configuration wherein said device may comprise a communications interface that may comprise one or more of the following, but not limited to the following, protocols for interfacing to a wide area network interface device: USB, RS232, RJ11, RJ45, Ethernet, Wi Fi, Wi Max, Bluetooth, HomePlug™, powerline, etc. As noted herein, the present invention system may be compatible with or comprise a variety of wide area network interface devices, such as, but not limited to, from dial-up modems to high-speed modems to satellite radio receivers. Said network interface device may interact with server 400 and/or other wide area network devices and systems.

Figure 12:
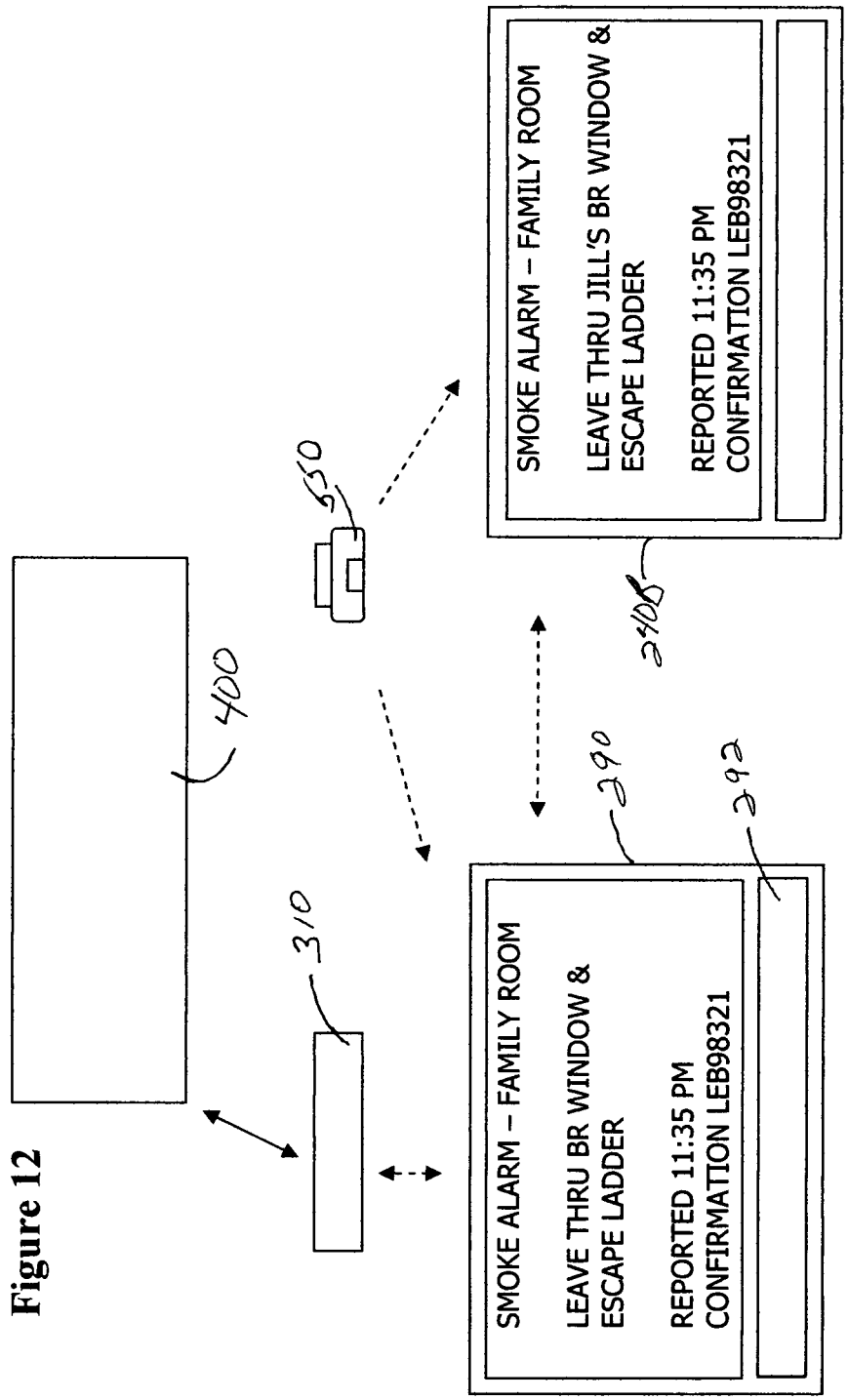
FIG. 12 is a present invention system embodiment of the integrated display and information and device controller in an emergency mode condition with some of the present invention apparatuses interacting in said mode.

It is to be appreciated that the present invention apparatuses may function as both information and device controllers and peripherals pending on the application associated with said apparatus. For example, FIG. 11 depict an integrated display and information and device controller 290 with varying networked content and a flush front-facing drop down administration panel 292 in a closed position. Said device 290 may comprise both a web browser or web server access or download means and a local area network means. Said device 290 may function as a mesh network controller for devices that may network with it over, for example, a ZigBee-based mesh network. Said device may also function as a peripheral extension of a networked smoke alarm as depicted in FIG. 12, while also functioning as an intelligent wide area network information switch (behind said Wi Fi router 310).

As previously noted, it is preferable that the present invention system comprises an information and device controller that may be networked with a variety of peripheral and/or control apparatuses to support a variety of features and modes and widespread acceptance.

Said controller may comprise programs that may be triggered by a variety of commands or program or content identifiers or initializers—wherein said programs, as previously noted herein, may be initialized by time of day, alerts, alarms, modes, content identifiers, interval as well as on demand functions from a variety of control apparatuses, such as, but not limited to, personal communicators, remote control units, cell phones, PDAs, PCs, key chains, watches, pendants, etc. For example, a time of day initializer may be applicable to a display in a bathroom which may show weather (indoor, outdoor temps from home sensors, forecast from internet) and specific traffic information associated with one's commute, which, again, may be sourced from the internet, during a morning time period and display weather and certain sports scores or stock information or news headlines or digital pictures during other periods of the day. In addition, said display and/or all displays networked to said controller may flash text associated with an alarm or trigger condition. A variety of alarms or triggers may be associated with the present invention system, for example, those which may be generated from appliances or security or smoke detectors, or doctor appointment reminders, caller ID information associated with a certain incoming call, present invention web server data feed screening functions such as, but not limited to, certain team and game scores or even online auction price information, as well as user-invoked, device-invoked and/or system-invoked trigger conditions based on personalizing a variety of media, as described herein.

Another illustration of the variety of embodiments of said controller and peripheral apparatuses is depicted in FIG. 8. FIG. 8 illustrates an information and device controller embodiment that is integrated with a personal computer 270 wherein said embodiment and computer is connected to a Wi Fi router. Said controller embodiment may share certain functions with the personal computer 270, wherein, for example, computer 270 may support application and administration software. Said software may control timer software to operate a variety of appliances and/or fixtures such as the depicted lighting fixtures. In addition said computer 270 may also support the processing of personalized content and download said content to the information and device controller wherein said controller may disseminate the designated personalized content to the associated device. Said computer 270 may also comprise software that screens incoming email based on user defined parameters wherein, upon a match of certain parameters, such email and attachments may be forwarded to other devices, including LAN devices that may be connected to a router. As illustrated in FIG. 8, a digital picture frame and personalized weather display 430 is depicted as a multi-network device wherein said device 430 comprises a wired connection to a lighting fixture 500 wherein said fixture 500 may function as a communications hub and may comprise the associated communications equipment such as a retractable high gain Wi Fi antenna which may be utilized to support high speed transmissions such as the downloading of digital pictures to said device 430.

Said lighting fixture may also comprise a ZigBee chip set to support mesh network communications as well as lighting (and)/or non-lighting operations that may be associated with said fixture.

As previously noted, the purpose for accounting for the FIG. 8 illustration in this patent filing is to exemplify yet another embodiment and configuration that may be supported through the present invention information and device controller and its variety of associated peripheral apparatuses such as the integrated digital picture frame and personalized weather and information display 430. Said display 430 may also comprise a Wi Fi card or communications means as an integrated component which may be utilized with other communications input and output components, such as, but not limited to a ZigBee chip set.

Another type of peripheral apparatus that strongly complements the utility of the present invention information and device controller, while also supporting the possibility of widespread acceptance of said system, is present invention system audio-enabled personalized content devices. Said present invention audio-enabled devices or components may interact with or be integrated with said controller software and communications components, remote control units adapted for the present invention system, as well as other device interface embodiments which may include voice or audio recognition components. Said embodiments may comprise, but not necessarily, a scroll capability, wherein for example, said remote control unit may send a coded wireless signal, such as, but not limited to, ZigBee, to either the present invention device controller or invention audio component wherein said controller/component comprises a communications means adapted to receive and process said signal wherein said signal may comprise at least a command and/or instruction set to play personalized content in audio form. Said signal and/or transmission may also comprise a user profile identification code to facilitate the operation of desired personalized content.

One example of a controller to audio apparatus personalized content application may be associated with, but not limited to, traffic information. In support of said application, said controller may comprise software and memory capable of receiving, storing, retrieving, disseminating, and/or transmitting digitized voice packets. Said packets may be associated with another present invention system embodiment and method which may comprise a remote server 400 wherein said server may be associated with or receive feeds, such as, but not limited to, RSS feeds, from a metropolitan traffic report service and system, such as the system 100 previously described herein. Said system may comprise the means to record, digitize, and categorize traffic reports. Said system, for example, may be part of a metro-radio traffic report service that provides traffic reports over a certain interval. The traffic reports that may be associated with distribution through, for example, internet service providers may be categorized by a variety of means such as, for example road routes or graphic map regions. A user associated with this present invention system may set up his/her personalized content system by having the option of selecting all or some traffic route categories at a web site in a hierarchical form and identify a destination and/or account profile associated with receiving said route profile information. Said information may pertain to, for example, the user's rush hour route or alternative route, as well as traffic backup or congestion thresholds and alerts. Said account profile may comprise said content in text, graphic and/or audio form(s), as well as permit additional inputs such as a variety of advertising or preference advertising information as well as certain mash-up inputs associated with or in a designated proximity of said user's commute and/or destination.

Figure 7:
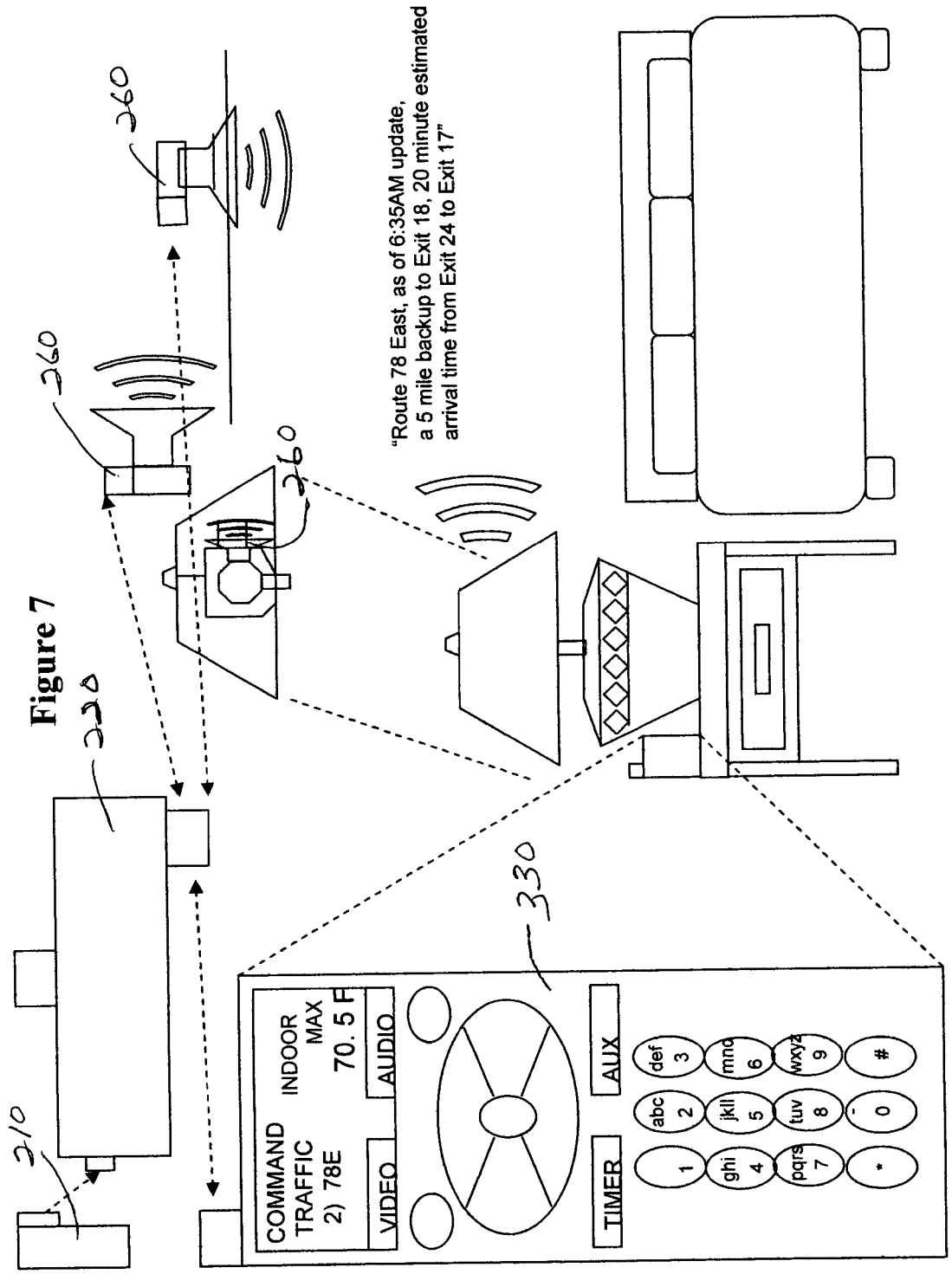
FIG. 7 is an illustration of sample present invention apparatuses that support the present invention personalized weather and information embodiment in audio mode.

The present invention controller may access or receive said traffic content in audio, text and/or graphic form(s) and, as previously noted, perform a variety of functions associated with said content and the present invention apparatuses as well as conventional networked communications devices. For example, a present invention remote control unit and controller, and a controller program associated with said remote control unit initiated activation, may generate the activation of transmitting packets of instruction and information content to an audio component that comprises a compatible communications receiver, processor, memory, and interface circuit or connection to an audio input, amplifier and speaker apparatus to enable the reporting of said traffic information. Said audio apparatus may be in a variety of embodiments, such as, but not limited to, from a home stereo and wired speaker or intercom system to a table top radio to a recessed speaker and communications processing apparatus such as the audio component 260 which is illustrated in FIGS. 1 and 7. In addition said audio component may be integrated with an audio apparatus of a television where upon activation of said audio component an audible personalized content message may override said television's audio circuit connection and interrupt the audio portion of the television transmission. In addition, a text message or other data exhibit may also be displayed on said television wherein said television comprises the associated processor and adapted video input and communications means to support the broadcast and display of said personalized content.

With respect to the remote control unit and audio-enabled device illustration, upon activating the audio component, the user may hear the audio portion in a variety of ways, one format may be to activate an audio information mode button and hear category numbers and content headers (another form of the present invention system content identifier), or press a favorite button or favorite touch screen field that accounts for transmitting the communications sequences associated with a route during a certain day or hour range setting (among a variety of settings, note setting could be defaulted to all day), or pressing two buttons, one associated with the audio information mode and the other associated with the category number. Such button depression or depressions may enable the following example announcement to take place, "Item 2, Route 78 East, as of 6:35 AM update, a 5 mile backup to Exit 18, 20 minute estimated arrival time from Exit 24 to Exit 17", as illustrated in FIGS. 1 and 7. Said remote control unit 300 (FIG. 1), personal communicator, or present invention software menu function that may reside in a cell phone, instant messaging device or other communications device adapted for the present invention system may comprise a repeat command among other commands associated with said function(s). Said device(s) may also comprise an integrated audio-enabled device with a processor, associated circuitry, amplifier and speaker means to enable the play of said content through said control unit or personal communicator device or device adjuncts, such as but not limited to headphones.

In yet another embodiment of the present invention system personalized content audio devices, FIG. 13 depicts an alarm clock radio 450, wherein radio 450's alarm setting may comprise an option to announce user-designated information of interest to said user upon the activation of said alarm. The sources of information may come from wide area networked means, such as, but not limited to, web servers and local area networked means, such as, but not limited to, networked sensors. A sample radio 450 configuration embodiment may comprise, but not be limited to comprising, the following components: software, including a web browser; a centralized processor; AM and FM radio receiver components; adjunct interfaces (such as, but not limited to, the interface supporting the ipod depicted in FIG. 13); radio setting interfaces and the associated supporting components; a high speed network interface, such as, but not limited to, a Wi Fi chip set, antenna and associated electronics; an additional local area networked interface, such as, but not limited to, a ZigBee chip set, antenna and associated electronics; a digital to audio chip set and associated electronics to support enunciating text information; memory; firmware; at least one administration interface, such as, but not limited to, an IP port for remote administration, a USB port and socket for administration and other adjuncts, and at least one input button for setting at least some radio 450 options; a remote control unit, such as, but not limited to, a ZigBee remote or FCC Part 15 infrared unit and associated radio interface; audible components such as an amplifier, speakers and associated electronics; at least one circuit board and associated mounting; a display; a housing assembly comprised of durable plastic material; and securing means, such as, but not limited to, screws, glue and other fastening means.

The present invention alarm clock radio may be available in a variety of embodiments and comprises innovations that may be in a variety of radio appliances. It is to be appreciated that the term, "radio appliance" as set forth herein means, but is not limited to, a radio (in a variety of embodiments), a radio component, an entertainment system audio component, a portable device audio component, and an Internet radio component or device. It is to be further appreciated that the present invention alarm clock radio 450 innovations described herein may also be comprised in a variety of radio appliances adapted for the present invention system. The integrated software and hardware configuration of radio 450, coupled with its unique functions that are supported by said configuration and its software present a variety of utilities, from convenience to safety. For example, the alarm clock radio 450 software program operates at least under a pre-set cycle to activate said web browser and a supporting program to access at least one designated web site URL and retrieve data from pre-selected content categories associated with said URL. The URL may be associated with the present invention server 400, wherein it may be associated with a personalized content web site frame or file program associated soley with a user's pre-selected content categoriers. Upon the retrieval of said personalized content, the radio 450 may perform at least one of the following: display said retrieved data in a predetermined order; store said data for presentation initiated by at least one of the following activations: alarm initiated, user initiated, remote control initiated, remote data communication initiated and combinations thereof, wherein said presentation may be at least one of the following: an audible announcement, a visual communication, a wirelessly transmitted communication, a wired communication, and combinations thereof. The convenience of listening to user-designated personalized content upon the activation of said present invention 450 alarm brings additional utility to said user wherein said user does not have to access a variety of devices and wait for the announcement or presentation of said content.

Another utility of the present invention alarm clock radio 450 that may be in a variety of other present invention embodiments is the means to support the automatic and pre-set switching of present invention application, media, and program modes based on at least one of the activation and completion of a personalized content presentation and announcement, a set time interval, a set start and stop time, a set start and stop time sequence, and combinations thereof. Said application mode may be selected from the group consisting of, but not limited to, entertainment, emergency, security, home controls, and medical/health applications, wherein said applications have been accounted for in previous utility filing applications filed by the inventor, as noted herein. The entertainment mode may comprise at least said radio and radio adjunct media. Said media mode is at least selected from the group consisting of, but not limited to, at least one wireless communication, FM band reception, AM band reception, a personalized content setting, and at least one adjunct component. Said program mode may be selected from the group consisting of, but not limited to, a personalized content announcement, a personalized content display, a radio channel setting, a streaming audio setting, and an adjunct component output. An example of the use of said present invention application, media and program modes, as integrated in alarm clock radio 450, is the setting of a personalized content setting and announcement upon the activation of said radio 450 alarm and the pre-set switch of said radio to an FM band channel or station, upon the completion of said personalized content announcement. In yet another example of said radio 450 functionality, an automatic switch of a personalized content announcement may be enabled upon the receipt of an emergency message, such as, but not limited to, the receipt of an out-of-range health reading, wherein said receipt is received from a wireless transmission from a medical device sensor and communications component that comprises a program to transmit said message to a list of devices and servers, including said alarm clock radio 450, upon the detection of said out-of-range reading. Radio 450 may retrieve and present varying information based on the time of day and user setting to support a variety of personalized content users. In addition, in providing utilities to accommodate a variety of users, said radio 450 may be administered remotely via a variety of devices from a browser-based device for web server administration to a cellular phone via the present invention server system. In yet another example of the present invention system's breadth of application modes, a user may utilize radio 450 as a home controls hub, such as, for example, saving a user's energy consumption by providing the means to administer, access and control present invention networked thermostats and networked programmable thermostat mountings via the radio 450's software application program and local area networked communications means, such as ZigBee and Wi Fi, web access and IP network addressable configuration.

It is to be appreciated that the preceding audio-enabled personalized content and information and device controller illustrations are yet another example of the economy and versatility of the present invention system. As previously noted, the variety of content, associated formats and delivery may be processed through a variety of means and applications to support economy of creation (for example, one service or aggregator may be the content source), generation (for example, said content may be generated in respective formats through one service provider or user-invoked via content identifier functions) and distribution (for example, said traffic content may be transmitted through one entity of radio broadcasters) while also supporting versatility of use, as described in association with, but not limited to, the networked personalized vehicle information system 100, the networked personalized information system 200 and other present invention embodiments.

Personalized Content and Desktop, Portable Device and Server Application Software:

The information, content and/or media that may be associated with and/or personalized through the present invention system may be, but is not limited to the following:

- maritime information (for example, but not limited to, tide, winds, water and air temperatures, moon)
- ski conditions (certain mountain(s))
- pollen information
- reservation information (travel related, restaurant, theater, concert, golf tee time, etc.)
- sports scores & news
- racing results and conditions
- financial information (from indices to stocks to funds to portfolios)
- fishing reports
- hunting reports
- horoscopes
- alarm/notification based messaging and/or instruction (such messaging may be associated with the following sources: appliances; sensors; environmental, security, medical, or health apparatuses or systems, Homeland Security status indicators or bulletins)
- selective email
- digital pictures
- video frames (including movies in subsequent invention product releases)
- traffic reports
- weather (including, but not necessarily, multi-location weather information)
- alumni news and activities
- professional organizer
- airport conditions
- flight information (reserved/proposed)
- calendar (committed)
- options calendar
- address book
- address book name and association alerts friends and family data
- advertising information (such as, but not limited to, user-defined selective store, product, sale announcements, or electronic coupon announcements and files)

As previously noted, said content may also comprise or be associated with brand or insignia graphics, video and audio, as appropriate. In addition, the peripheral apparatuses that support the display, play and presentation of said content may also be available in a variety of designs or embodiments that complement said user's content preferences. For example, a weather display may be framed or be set within a pedestal or assembly that comprises the colors, insignias, brands and/or markings associated with, but not limited to, a professional sports team, alma mater, or sports league or association (such as, but not limited to NASCAR®. Said pedestal or display assembly enclosure may be detachable from said display to be replaced with other present invention pedestals or enclosures wherein said pedestals/enclosures may depict other designs, insignias, brands and/or markings, as well as other information and/or entertainment technology components, such as, for example, a docking station for other peripherals which may range from a modular digital picture flame to a cordless phone base to a coupon printer.

It is to be appreciated that the personalized content and associated advertising dissemination described herein is not limited to peripheral devices. Said present invention personalized content and/or associated advertising means and methods may also be applicable to desktop software, wherein said information and content may be downloaded to a browser equipped device and displayed on said device as part of a desktop icon and/or program. For example, should a user subscribe to a desktop weather application service, said desktop software associated with said service may also comprise a tab and associated display frame or graphic or window that may comprise said user's personalized content, such as, but not limited to, ski conditions. Said desktop software may also display associated advertising relevant to said user's personalized content. Said preceding software, electronic coupon and other advertising applications described herein may also be formatted for a browser and application software equipped cell phone, smartphone, PDA, as well as instant messaging and other messaging devices, etc. The preceding components may also be associated with a present invention personalized web site or web locker to facilitate additional personalized content utilities associated with the present invention content identifiers and associated applications.

Advertising and Pricing Means and Methods:

Another utility associated with the present invention system is the variety of advertising and media methods and means that may interact with, be adapted for, be comprised in and/or complement said system. In addition, marketing-based services and/or other information, news, and entertainment media and media services may also be adapted for the present invention system.

As noted in the filing narrative, there are a variety of advertising and marketing mediums that may be adapted for the present invention system. For example, as an exemplary illustration of the variety of advertising embodiments and methods adapted for the present invention system, a user, who may access his/her respective web server 400 personalized content profile page to set up said profile for the download of ski conditions associated with a certain mountain or group of mountains, may interact with a variety of advertising and marketing mediums in making said selection and in receiving personalized content associated with said selection. Said user, upon selecting and submitting ski conditions for, but not necessarily (it is to be appreciated that the first user submission may be ski conditions without any other parameter), a particular region as a personalized content choice, may activate a program associated with said server 400 that displays a variety of skiing-relevant advertisements and associated hyperlinks. Said program may also display said regional mountains in association with the advertising content. The personalized content page that displays said regional mountains may also display a variety of associated regional advertising. The user may then have a choice with respect to obtaining ski conditions in association with certain mountains, and, upon said associated submission, may see advertisements and/or even a marketing questionnaire associated with skiing or other topics associated with said respective mountains, mountain region, or other mountain regions.

In continuing with the preceding advertising and marketing methods and system illustration in which said methods and system are exemplary embodiments of the present invention system, the user, upon receiving personalized content at or through the present invention information and device controller, associated peripheral apparatuses or components, or desktop application software embodiments, may also receive associated advertising and content in and through a variety of media, which will be described in further detail in the next section, herein. For example, said downloaded and/or tagged personalized content may also be accompanied with targeted advertising content associated with said personalized content downloaded to, but not limited to the present invention information and device controller, other browser enabled or networked device. With respect to the present invention controller or web server embodiment or combination thereof receiving either both forms of personalized or the targeted advertising content, said controller or web server may process said advertising content, such as, but not limited to electronic coupon content, and it may sort and store the forms of content in a variety of formats. Said advertising and personalized content may be stored for a designated period of time, deleted after said period, screened for certain content profile parameters or identifiers and/or, pending on a profile match or command, stored for dissemination to selective peripheral devices at a designated date and/or time or automatically based on said system's users' personalized content profiles. Said message dissemination may be in a variety of forms, such as, but not limited to, from a message alert related to the receipt of said content, wherein said content may be stored on said controller or a remote web site, to the transmission of electronic coupons to respective peripheral devices, to the transmission of recipes to a networked display and controller wherein said recipes may have been associated with a food program episode.

Another software application embodiment for the present invention personal communicator 300 or cell phone/PDA unit that may be adapted for the present invention system is an electronic coupon and secondary wireless communications component wherein said electronic coupon may be transmitted from said controller or media appliance to said portable device, such as cell phone 580 (FIG. 4), through a compatible ZigBee or Bluetooth communications means. Said device 580, along with a variety of associated transaction and supply chain parties, may process and utilize said electronic coupon application(s) in a variety of means.

Should the user desire and authorize, said electronic coupon may be appended by the present invention web server 400 program or information and device controller or peripheral device with user-specific information, such as a user code number. Said user code number may be utilized as a consumer profile number and upon the exchange of said coupon and/or other electronic currency and the associated user code through an electronic transaction, said user code may be processed and accessed by a marketing service, company/store entity or third party entity wherein said service or company/third party entity has authorizations or permissions, through the respective service provider responsible for issuing said coupon, to retrieve certain consumer profile information, such as, but not limited to, the user's email address and associated coupon related or other purchases. Said email and purchase information may be processed through a marketing database program which may generate a direct mail or email coupon and informational offer to incent the purchase of the same and/or other products.

The preceding example along with other present invention components described herein may account(s) for (a) marketing database(s) which, with appropriate user consent and in accordance with federal and state guidelines, may be utilized for capturing market intelligence and applying said intelligence to focused offerings to said user(s).

Content Identifiers:

In yet another present invention embodiment that supports the dissemination and use of advertising content, such as, but not limited to, electronic coupons, said coupon content, along with or like personalized content or content identifiers described herein, may be transmitted over television and/or radio broadcast signals or over, but not limited to, broadband data frames or packets such as Internet protocol television transmissions. Said signals may be received by said present invention information and device controller or a multiplexer component that may be integrated or associated with said controller or present invention peripheral apparatus, as described herein. One of the compelling utilities associated with said embodiment is the method or means in which said advertising content or coupon may be transmitted and processed by said present invention system in conjunction with the transmission of said video or audio portion or embodiment of said advertising content, personalized content or content identifiers. For example, a televised 30 second advertisement for toothpaste may be accompanied with or include a transmission packet with electronic coupon data frame(s) for said toothpaste. Said frames may be received by said multiplexer or controller and processed in a manner similar to or the same as described in this paragraph narrative.

In yet another example, a radio media application may contain an advertisement that may be accompanied with the present invention system content identifiers which may be in a variety of embodiments, such as, but not limited to, a telephone number associated with a radio station or a radio program and a character string associated with an advertisement which may be, but not limited to, transmitted via a RDS transmission and displayed on a motor vehicle console, as well as promoted by a radio announcer. Said content identifiers may also be in the embodiment of a character string for an ad slogan or a company brand, in part or in whole. For example, an illustrative means for engaging a media audience while providing a convenient means for said media user to partake in said program promotion, such as, for entering a contest associated with a soft drink brand, may be sending the following text, "DEW@NSIG.COM". Said text string may be transmitted to a server port and program associated with the present invention system wherein, upon the receipt of said transmission, a program may capture the identifiers associated with the device and/or name associated with the sending user's text address. Said program may utilize said identifiers as the present invention system content identifiers for the use of a user profile table lookup or the generation of a new user profile associated with said identifiers. Upon the match of a profile lookup or creation of a new user profile, said program may tag either of said profile with a unique identifier and utilize said identifier as a contest entry confirmation, and message said user with a contest entry acknowledgement. Said acknowledgement may include an instruction to go to said web site, NSIG.COM, to access said user's contest entry identifier, post, tag and store said entry identifier on said present invention system site and engage other content and media that is of interest to said user on said site. There are a variety of other present invention content identifiers and other present invention embodiments that provide the means to conveniently facilitate the preceding transaction, other similar transactions, as well as a variety of other transactions. A more detailed description and application of the present invention system content identifiers is addressed herein.

The present invention system content identifiers may be in a variety of embodiments and apply to a variety of uses, such as, but not limited to, from tagging to search to mash-ups to a variety of other means for personalizing and/or managing content from a variety of media and other sources.

The embodiments described herein have been addressed in the preceding narrative of this patent application. This section will describe said embodiments in the context of supporting the following:
1) personalized content alerts, notifications, and device activations;
2) generating and utilizing personalized content from media sources, objects, and temporal, location, situational and search parameters;
3) personalized content management and applications;
4) networked device personalized content functions and adaptations; and
5) networked appliances for facilitating the use of personalized content. It is to be appreciated that the subject matter disclosed herein is illustrative of the many other embodiments associated with the present invention system.

The variety and use of said content identifiers, wherein said identifiers may apply to, but are not limited to, television and print media, as well as objects and temporal, location, and search parameters (including, but not limited to, for example, traffic conditions, game score conditions which may be associated with a certain team at a certain point in a game, online gaming, as well as advertising criteria, for example, a commercial for a mortgage company), will be described in further detail herein.

The present invention services which may, but not necessarily, include third party services, may also include one or more of the following mediums: a variety of advertising, marketing services, media (including, but not limited to, broadcast, cable, satellite, IP, and/or broadband television and/or radio media, print, movie, music, event, show, concert, and celebrity media, as well as a variety of recorded media), media services and locations (including, but not limited to, gaming, resort and theme park) to support such personalized content, integrated dissemination, economy and widespread use. The present invention means for supporting the generation and use of such personalized content associated with said preceding mediums is content identifiers. Said content identifiers, as previously noted, and described herein, may also apply to a variety of parameters to facilitate the personalization of content. Other utilities associated with the present invention system are a variety of pricing methods and measurable interactions and/or transactions to support widespread support and acceptance. Other present invention system methods described herein support efficient and compelling means for receiving, accessing and/or inputting content for dissemination, as well as for receiving, processing and outputting certain personalized and logistical content.

1) Personalized Content Alerts, Notifications and Device Activation Content Identifiers:
The present invention system display and controller 290 and web server 400 may serve as exemplary embodiments (out of a variety of embodiments) for supporting the functions of said content identifiers for personalized content alerts, notifications and device activations. Said server 400 and controller 290 may store source link information for a news packet or headline wherein said packet/headline may appear, for example, on, but not limited to, the display of controller 290. Said source link may function as a present invention content identifier and be in a variety of embodiments, such as, from a URL that displays an article associated with a headline to a television or radio (media appliance) broadcast channel that is covering a certain game, wherein said score or event headline associated with said game is, again, displayed on or audibly announced over said present invention networked display device or even the respective media appliance adapted for this invention or other media appliances (such as, but not limited to, a conventional television or radio capable of receiving remote control inputs).

Said content identifier source link information, which may be stored on said present invention integrated display and controller 290, may have a corresponding set of programs in the memory of said controller 290, web server 400 or other networked or adjunct storage means (for example, said adjunct storage means may be a USB storage dongle connected to a USB port of said controller 290. Said programs may comprise instruction sets to perform certain operations to allow the user to access, view and/or hear said source content over the desired media appliance(s).

An example of said programs may be associated with accessing media content associated with a sports score. Said sports score may be, but not necessarily, in the form of personalized content, and may flash on said display 290. Upon the user's enunciation of a voice command or depression of a button, wherein said button may be on a display or a remote control unit or portable device/cell phone adapted or integrated with said display 290 or web server 400 via a local area and/or wide area communications link, said voice command or button activation may generate a cursor movement over the sports score or headline information or repeat the score information (if the information is in audible form). Said voice and/or button and cursor activations may also activate a program in said display and controller 290 to retrieve said content identifier source link information and user and/or media appliance(s) profile(s) associated with said sports score. Said retrieval action may consist of a variety of functions, for example, from a communication activation to server 400 to a retrieval from said controller 290 memory and/or combination thereof. Said content identifier and profile information program may also include communications functions that comprise activating the media appliance and respective broadcast channel (and, but not necessarily, other media appliance and/or other networked appliance/peripheral settings). Said user may also activate an input sequence or command indicating a user media appliance preference(s) for accessing said broadcast.

One preference may be to watch said game on television. To support such preference, said sports score link content identifier information may comprise the television channel airing the game broadcast or web sever address (which may or may not be associated with web server 400) for retrieving said television channel and associated content. The present invention controller 290 and/or web server 400 may also account for a program associated with controlling the user's television, wherein for example, the one-button activation associated with placing a cursor or other content identifier command on the specific headline or sport information to be retrieved activates the commands, programs and communications described herein (among other functions) to have the television turned on to the channel, turned on and switched to the channel, or switched to the channel that is associated with the game broadcast (the television/channel activations may vary pending on the on and off state of the television wherein the assessment of said state may be performed via a variety of present invention components/devices accounted for in this filing application herein and previous filing applications submitted by the inventor, wherein said present invention system may utilize two-way as well as one-way communications, such as, but not limited to ZigBee and infra-red components and combinations thereof). Other command functions may also comprise the desired volume and speaker options, etc.

As noted, the media appliance may be in a variety of embodiments, such as, but not limited to, a radio, satellite radio, and even a home control server that may comprise intelligent home safety and security information with adjuncts adapted for the present invention system as well as the preceding embodiments adapted for the present invention system.

As previously noted herein and in previous filing applications submitted by the inventor, as set forth in the first paragraph above, the present invention system may also comprise personalized settings, thresholds, and/or a hierarchy associated with communicating said information from said web server 400 to said present invention devices or devices adapted for said system. For example, a situational content identifier associated with a score may be announced and/or displayed (even with accompanying alerts) if a certain team has a tie score in the eighth inning.

In this example, a present invention web server 400 program personalized for a system user may read a RSS feed and search for said team and tie criteria. Upon the match of said criteria, the server program may retrieve a display/audio/controller profile associated with communicating said score and source link information and execute said communication. Said communication may be pushed to the designated DNS associated with said, for example, but not limited to, said broadband and device connection. Said device connection may be designated off of a router, preferably a Wi Fi router, channel. Said device connection and server-originated activation may result in the communication of said media appliance/source content identifier link information and sports score information. Finally, said receipt of the link and score information may initiate a program on said display/switch/controller to display, announce and store the relevant sports score and content identifier linkage information, wherein, again, said linkage information may comprise media appliance channel and settings associated with broadcasting said game.

In continuing this illustration, an example of the use of said announced/displayed content may be to access more information about the tied game which may be accomplished through a variety of means. Upon a command activation which may be initiated from a button depression on either a remote control unit (among other devices, as noted herein), or on said display and controller 290 device or via a voice command, the command activation may turn on (a) component(s) and associated component functions such as a television to a channel televising the game and/or a radio broadcasting said content and/or a display showing/communicating streaming media and/or web site stats associated with a URL that is associated with said game.

In yet another embodiment of the present invention system described herein and utilizing a controller 290 or web server 400 entertainment mode trigger condition program addressed in the filing application herein and in previous filing applications submitted by the inventor, said situational content identifier may be in the form of team and game-specific trigger conditions that may automatically activate a preferred appliance or set of appliances, such as, but not limited to, the activation of a television and the associated game channel upon the occurrence of said identifier parameter such as, for example, a tied game condition. Said activation may be originated from the web server 400 program with an instruction set in said program or from an instruction set in said display and controller 290 program via a user and/or media appliance profile.

2) Generating and Utilizing Personalized Content from Media Sources, Objects, and Temporal, Location, Situational and Search Parameters:

As previously stated herein, the present invention system content identifiers facilitate the personalization of any content from any form of media and other sources. The utilities associated with said identifiers and their respective applications adds significant value to system users, any media entity, content provider entity, advertising, as well as any entity that requires promoting its product and/or service.

One of the utilities associated with said present invention system is to enable any user of a cell phone or wide area network device to engage any form of media and associated content, including, but not limited to, programming and associated content related to, but not limited to, broadcast, cable, and/or satellite television and radio media, print, movie, music, show, concert, sports event, celebrity, and recorded media.

The present invention system also accounts for various forms of functionality at the device and server level to facilitate media and content access (as well as other forms of information of interest to a user), and its respective use and personalization. Said innovations will be accounted for further in the narrative.

Said present invention system does not require enhanced functionality at the device level to accomplish its basic utilities of personalizing media and content. In one embodiment of said present invention system which may utilize a cell phone, said system may comprise the following: a cell phone or other wide area network communications device; a form of media; a content identifier and/or object coding and record system; and at least one server or gateway interface with the associated communications, software, and memory to support interaction with said cell phone or other wide area network communications device and digital content or links associated with said content identifier and media system. In addition said system may comprise at least one server to comprise said digital content associated with said media and a communications, software and memory means to support interaction with said server or gateway interface.

The purpose for the preceding components is to facilitate the use and/or management of content when the user desires in a means that compels the user to engage such action. To be more descriptive of the utilities of the present invention system, the following narrative will account for said utilities which may be delivered from the illustrative embodiments, but not limited to said embodiments, accounted for in print, radio and television media adapted for the present invention system.

Print Media:

The present invention print media content identifier system may support and comprise any form of print media, such as but not limited to, newspaper, magazine, billboard, poster, digital signage, and even plaques or signs that may be associated with a variety of subject matter, from museum piece plaques residing in a museum to plaques or signs related to historical homes or buildings to zoo exhibits.

Said print media content identifier system comprises a content and/or object coding system. Said system may be architected under, but not limited to, a library records system, an information technology data archive and records system (including tagging systems), and/or combinations thereof. Each content and/or object classification code may be associated with other content or object classifications. For example, an advertising campaign that may comprise a number of advertisements in a variety of print media (newspapers, magazines, etc.) may comprise a series of codes that are associated with the user or reader, the media provider, the media publication, the media issue, as well as the section, region, page number and column, etc. that the campaigns ads may appear. In addition, each content and/or object classification may be associated with other content or object classifications such as URLs and other advertising categories. This latter point will be explained in further detail herein.

An example of a user's use, out of a variety of uses, for said content and associated coding may occur when one is scanning a newspaper. The user, utilizing a cell phone or other device with an input means and a wide area network communications capability or communications means that may interface with a device that supports a wide area network communications capability, may perform, but not be limited to, the following procedures and steps to review content of interest to said user at a more convenient time or engage said content in a convenient on-demand manner.

If the user is interested in reviewing said content and/or ads at a more convenient time, the user, utilizing a basic cell phone, may input a telephone number or text number/name/code/character string associated with the media publication (said number or character string may be saved as an abbreviated dial number, such as "WSJ" for the Wall Street Journal or "USA" for USA Today). Alternate means to facilitate input are noted further in the narrative. For the purpose of illustration, the initial input sequence associated with this embodiment's operation description may be associated with a telephone number. Upon the input of said number, the user may insert a pause character, such as a ",", to input a series of character, code strings and/or code/character ranges. Said code, character strings and/or ranges represent the code indentifiers associated with articles, ads and/or other media, products, services and/or commands related to said print articles, content and/or ads that the user may be interested in, but not limited to, reviewing, storing, commenting on, tagging, blogging and/or sending to other associates who may also be interested in said content.

In accounting for the respective content of interest, the user may perform the following: input one code and/or code range or string which may be for the entire publication, or section(s); or input a series of codes which may be for the preceding or highlighted articles and/or ads.

The user, upon inputting the codes of interest, may hit the "Send" or "Call" key or character/function key that enables the transmission of said input information to a server or gateway port associated with said dialed or text-transmitted number or address (pending on said user's communications device).

Upon the receipt of said transmission, the respective present invention system gateway port and server may generate a program that captures at least the originating number or device identifier associated with the transmitting device and time and date stamp the receipt of said communication. The program may also initiate a match lookup of said originating number/ANI or device identifier from a user profile database. As previously noted herein, said server program may also accommodate users who desire to block the use of the ANI associated with their respective communications device.

If there is a match, the user profile may be retrieved and processed to generate another program or sub-program regarding the instruction set for handling user preferences associated with said content. For example, the user profile instruction may be to retrieve the designated digital media version of the print media content and associated advertising and collateral (designated herein as the "associated digital content") from (a) designated server(s) and/or storage medium and process and store said content in a designated and catalogued manner for said retrieval, review, management and/or processing by said user. The associated digital content may be stored, retrieved, managed and processed through a number of varieties and means. One of the means, but not limited to such means, is a personalized web site adapted for the present invention system.

The present invention personalized web site may be accessible to the user as a URL that is part of the present invention gateway server. The personalized web site may comprise tagged content from any media or other source such as, but not limited to, the content and media described herein via the present invention system and its device components, as well as user generated and/or submitted and categorized or tagged content. Said content or associated content headers and identifiers may be optioned to be shared, private, and/or a combination thereof. Said personalized web site may also comprise content and media user profile settings, wherein said settings may vary by, but not limited to, content, media, frequency of use and/or other hierarchical thresholds. Said web site may also offer a variety of user services, such as, but are not limited to, online auction services, means for facilitating said auction services (which include services uniquely adapted for the present invention system), a variety of search services, which include, but are not limited to, search services uniquely adapted for the present invention system, classifieds services, micro-payment services (which include, but are not limited to, payment services uniquely adapted for the present invention system, such as a charity donation service associated with each user's activation of a tagged call or communication to (a) designated content identifier telephone or text number/address), download services (which include, but are not limited to, download services adapted to the present invention system) games, (which include, but are not limited to, gaming adapted to the present invention system) and content storage/classification, and email/messaging (including, but not limited to, present invention integrated voice messaging or commentary) services associated with said content and/or separate from said content. Said display, storage and processing of content may be supported via a variety of advertising, a subscription service, sales transactions, sales commissions, content tagging transactions, content conversion transactions and/or (a) combinations thereof.

The present invention personalized web site may also be a locker or hyperlink as part of an existing web site, not residing on said present invention gateway server. Said site may comprise, but is not limited to comprising, the same functions, media, support and service offerings as described in the preceding paragraph.

The user profile may also account for performing functions associated with certain data, for example, recipes associated with a media form or program (i.e. print, television, radio etc.) may go to designated storage, as well as device(s) and/or communications means such as, but not limited to, an email, podcast, videocast or present invention system personalized content display as noted herein and illustrated as part of the present invention system.

Said user may utilize the content identifier embodiments of the present invention system without the requirement for pre-registration. For example, if the user is interested in a print ad or article in a newspaper, such as the Wall Street Journal, for example a real estate advertisement, the user may input the number associated with said present invention server or gateway port that supports said present invention system service for said publication, input a pause character and input the content identifier number or character set associated with the respective real estate ad, and upon depressing the respective call or send button, the user need only listen to a voice response or receive a text response (pending on the present invention system embodiment and said user's desired options) acknowledging that said personalized content transaction was completed. Said user may then be prompted to register via a voice, cell phone keypad or smart phone keypad input sequence or not opt to register and receive instruction or a callback at a designated time or interval wherein said instruction is associated with said user going to the present invention gateway server or the respective media company's server adapted for said present invention system or another web server adapted for the present invention system and input the user's reach number or address associated with the device that the user utilized for said personalized content conversion or input another means that said user opted to use via the initial transaction or callback sequence. Upon accessing the respective server, the user may input his/her respective device identifier or telephone number and access the desired content for the purpose of utilizing said content for a variety of functions, including, but not limited to, tagging, parking, retrieving and/or storing the content/collateral/pictures/specs associated with the real estate advertisement. Alternatively, the user may be required to register before accessing said content. The user may have other options and require other input means before retrieving the user's designated personalized content.

Additional Present Invention System Functionality:

In addition, the user, pending on the type of communications device being used, may input the content identifiers associated with said media publication and/or content and input a command to have the respective content display on the user's device and/or other devices. The utility associated with this present invention transaction saves the user time, because the user is not required to input or go to a designated URL and then go to a particular section associated with said URL. An additional benefit to the user and other system participants is that said content, article, advertising or collateral, may be supported with additional advertising or information that may be more pertinent for the user, because the processing and delivery of said additional content may comprise a user profile match based on said user's initial connection to the respective present invention server port. It is to be appreciated that there are many embodiments and applications associated with the present invention system that are useful for a variety of users, especially for a variety of mobile device users.

The capability or preference for having desired print media content and/or other related content appear on a user's device (or user designated devices) as described in the preceding paragraph may also be accomplished automatically via a user profile. For example, but not limited to said example, a user may be reading an article or report associated with a football game. To review said game or game highlights or even a referenced highlight on the user's portable device, wherein said highlights may be in a variety of forms, such as but not limited to, video, audio or text, the user may input the respective content identifier(s) associated with said content and transmit said identifiers to the present invention system server associated with said content. In addition, the present invention system server's user profile or said user's cell phone adapted for the present invention system may comprise a profile with a preference setting that automatically stores video sports content or links to the designated content on said user's present invention system personalized web site or cell phone for later review. This capability, like many other present invention device and software enhancement levels, minimizes additional input or command sequences for the user to perform.

Additional functions and/or profile preferences may be to receive event or event related promotions, music, and/or video downloads to a user's device, such as, but not limited to electronic coupons and performing a transaction associated with said promotion. A sample application may be associated with a race program guide advertisement, wherein upon the day of the race, the user may read an ad to receive an electronic coupon or initiate a transaction at a special discount within a certain time-bounded period by inputting the media provider or sponsor (i.e. NASCAR) number or speed dialing or texting, etc. said number or address with the respective content identifier(s) associated with said promotion. The present invention system may also enable the purchase of a respective product or coupon via a user profile account or other account means that is registered and set up to support said transaction (through a variety of means, for example, credit, debit, monthly limits, limit or threshold notification and authorizations etc.). The security of said device identifier coupled with other security means and advertising and/or transaction codes and content identifiers may easily accommodate said transaction. In addition to a variety of purchase transactions, said present invention system supports a variety of other interactions, including combination purchase and interaction transactions. One example of said combination is the donation of a micropayment or small or other amount of money upon a user's use of the present invention system. For example, a listener of a radio show who is interested in donating to a certain charity and also interested in tagging certain program content such as an interview transcript or more information about a particular book, may utilize a present invention user profile feature that may utilize said user's debit or credit card account (among other means for performing (a) transaction adapted to the present invention system) for every type or a certain type of personalized content conversion the user may perform up to a certain threshold or other parameter. For example, said user-donated personalized content conversion may be associated with the user speed dialing the number associated with the present invention system server port that is associated with said program and said user acknowledging, but not necessarily, a confirmation of said donation. Such use of said system could facilitate and provide for additional finds to charities without burdening each respective donator.

There are a variety of related and other features and functions associated with the present invention system to facilitate simplicity, ease of use and convenience for the respective user at the web server and user device level, especially for the portable device user. Pending on the capabilities of the user devices adapted for the present invention system, the user may send content as well as commentary to other user's devices via web server interaction and/or desktop search interaction or email interaction via retrieval of designated recipients and the tagging and parking of said digital content to said message(s) recipients. It is to be appreciated that the present invention system may support a variety of users associated with the preceding statement, for example, a user may convert an item of interest and choose to verbally comment about said item wherein said verbal commentary may be initiated through an interaction with the present invention server program or initiated as a voice messaging application through said user's cell phone or cell phone carrier service (or through a present invention dictating apparatus integrated or separate from said cell phone that may have an upload capability to said present invention server) wherein said voice message may be posted to said present invention server program as a personalized content conversion and tag coupled with said user's converted content of interest.

The preceding verbal commentary embodiments and their respective interactions are illustrative of the variety of present invention system utilities supported by said system. For example in a basic form, said system users may submit and categorize their verbal commentary for, at least one of, private and community use to facilitate the organization of memos, reminders, to-do lists, answering machine or voice messages, innovative thoughts, as well as a variety of greetings, as separate content items of interest that may be tagged, stored reviewed and disseminated through a variety of means. As noted in the preceding paragraph, the present invention system may also support said commentary functions with additional converted content, from digital pictures to RFID transmitted (or other code and transmit means) item identifiers from a storefront display or a store shelf that a user may choose to convert, tag and comment on as a more convenient and helpful window shopping—"Add to Cart" function, to other uses that an engaged user community will create through the use of the present invention embodiments described herein.

In addition, pending on the device and/or device interface capabilities, the present invention content identifier code(s) may be input to the device via OCR, bar code, RFID, audible, verbal and/or other scanned and/or transmitted means. In addition, as RFID tags and related evolving technologies become more commercially viable, the present invention system accounts for, but is not limited to, said means such as RFID tags, printable RFID, bar code, and electronic paper text and graphics that may be linked to (a) communications transmitter(s) to facilitate user input, wherein, for example, said RFID-equipped user device, upon receiving a RFID chip transmission, identifying the media provider content identifier or number, may generate a look up program to retrieve the device call function, such that the user may scan and edit the articles/ads of interest and depress the call button, wherein the user may not need to perform any input function other than depressing the device call button.

Radio Media:

The present invention radio media content identifier system may support any form of radio broadcast and program, such as but not limited to, satellite radio, digital radio, AM and FM radio, RDS transmission, HD transmission, as well as regional and national programming. In addition, the present invention system supports a variety of program content and related subject matter (such as, but not limited to, advertising, books, services, music, audio book and video downloads, etc.) formats, for example, from talk radio to music to combinations thereof, and transactions (some of which was described in the previous section herein).

Said present invention radio media content identifier system may also comprise a content and/or object coding system. Said system may be architected under, but not limited to, a library records system, an information technology data archive and records system (including tagging systems), and/or combinations thereof. Each content and/or object classification code may be associated with other content or object classifications.

For example, an advertising campaign that may account for a number of advertisements in a variety of media outlets (radio, newspapers, magazines, etc.) may comprise a series of present invention system content identifier codes that are associated with, but not limited to, the following: the user, reader, listener, viewer, the media provider, the station, the advertiser, the advertisement (there may be a number of codes associated with the advertisement), the sponsor, the sponsor's product and/or service, and the broadcast time slot. In addition, each content and/or object classification may be associated with other content or object classifications such as URLs and other advertising categories.

An example of a user's use, out of a variety of uses, for said content and associated said content identifier coding may occur when one is listening to the radio while commuting. The user, utilizing a cell phone or other device with an input means and a wide area network communications capability or communications means that may interface with a device that supports a wide area network communications capability, may perform the following procedures and steps to review content of interest to said user at a more convenient time or engage said content in a more convenient and safe (for example, when said user may be driving a motor vehicle) on-demand manner.

If the user is interested in reviewing said content and/or ads at a more convenient time, requesting product or service information, or performing a transaction or other interaction associated with said radio program content, the user, utilizing a basic cell phone, may input a telephone number or text number associated with the radio station/channel (said number may be saved as an abbreviated dial number, such as, but not limited to, "WEEI", "WFAN" or "WCBS"). Upon the input of said number, the user may insert a pause character, such as a ",", to input a code or series of character or code strings and/or code/character ranges associated with said content of interest. Said code or character strings and/or ranges may represent a variety of content such as, but not limited to, the content identifier codes associated with a commercial or a book or present invention system commands that, for example, but not limited to said example, facilitate the purchase of said book that may be marketed through the respective radio program.

As an alternative, to facilitate convenience, simplicity and safety, the user, upon responding to the respective content of interest, may speed dial, text or enunciate the number, address or name associated with the broadcast station delivering said content, such as enunciating, for example, "WFAN".

In another system embodiment, the user may not need to input the number associated with the broadcaster, for example, but not limited to such example, the broadcaster number or present invention content identifier code for said broadcast may be transmitted as part of the broadcast frequency band signal, such as, for example a RDS transmission. Upon the user's activation of a radio adapted for said present invention system embodiment, said radio, equipped with a wireless communications technology protocol such as, but not limited to, Bluetooth or ZigBee, may transmit the broadcast telephone number and/or said identifier code associated with the respective present invention gateway or server identifier for said station. Upon the receipt of said communication by the user's device, such as but not limited to, a cell phone equipped with the associated communications means to support said receipt, said receipt may activate a program that generates the call program for said device. The call program function may differ pending on the content received from the radio, for example content identifier code versus telephone number (wherein as previously noted, said telephone number may be utilized by the present invention system as a content identifier code embodiment).

In the instance of receiving the telephone number associated with personalizing and/or converting said broadcast content, said telephone number may be automatically dialed upon the user's depression of the call or send button or voice command associated with said activation. In the instance of receiving the personalization/conversion code associated with the respective station program content, the cell phone device program may retrieve the general number for the present invention gateway or server and append said number with a pause character followed by the respective station code. In the latter example, said function supports calling the present invention capability of calling one number and stringing the pertinent code(s) associated with the user's interest/transaction. In either application, both transactions are captured. There are other means associated with the present invention system for accessing and converting information of interest to personalized content.

In another present invention system embodiment, said radio program content identifier code(s) may be transmitted via RDS and displayed on said motor vehicles radio or console system, from the respective telephone number to the respective codes. Said codes could be displayed and or manipulated or managed via an input means associated with said radio or console. Said user, upon viewing said present invention identifier information, may input or speed dial or voice command the respective codes or names to initiate the present invention personalized content conversion. In addition, pending on the type of motor vehicle console and car communications system adapted for the present invention system (including, but not limited to, the present invention information and device controller system), said user may voice command the instruction associated with the management of said identifier codes in the car system as well as with the present invention server system. For example, said content identifier code or code string may be or comprise a GPS coordinate associated with a restaurant location or the location of an event, wherein said code may be input into the vehicles GPS system as a mash-up input to said system. Said driver may choose to save said code and/or string for retrieval and input into either or both the car GPS system as well as a map system on said user's personal web site. Even though, the content management of said codes and string may be performed in a convenient manner, said user who is interested in focusing on driving through traffic may opt to tag and park said information in both said present invention GPS system and web server for review or management at a more convenient time.

While said user may be driving, upon activating a parking command to the present invention web server wherein said command is associated with storing said event and event related content identifier codes at the user's respective personalized web site or web site locker, said user may also voice command or input a search command for restaurants based on said user's preference profile that are in proximity to said event. Said search results may be voiced back to said user and/or transmitted to a user-designated device via a user command or user profile setting. One of the selected devices may be the present invention information and device controller system that may comprise said present invention GPS mash-up system. It is to be appreciated that the present invention system may support a variety of functions to facilitate user convenience.

With respect to accessing the variety of present invention servers, the present invention system accounts for other means for accessing the appropriate port and/or operator (real or virtual) associated with the user's desired transaction(s) whether the user has a number or content identifier code(s) associated with the broadcast media program.

Upon the call activation to the designated port and/or agent, a user, who for example, has taken action associated with an ad and/or program content, may either reach a live operator associated with the respective ad or automatically tag and park the content (content includes, but is not limited to including, video—i.e. podcasts, audio—i.e. podcasts, merchandise, advertising, transcripts, articles) associated with the respective broadcast via the present invention gateway or server, at minimum, the content can be, again, parked at the user's personal web space and/or web site (there are a number of choices for easy minimum-step registration), or pending on the cell phone/portable device, the associated program or program-related content can be parked on the user's portable device for live interaction or post for later use, or the content may be automatically managed and/or disseminated per the user's profile in the present invention system server or gateway without the need for user interaction.

As previously noted herein, the present invention system also accounts for means to facilitate the personalization and engagement of said radio program content through other software and device enhancements, including radio device and cell phone or other user device enhancements adapted for the present invention system.

Television Media:

The present invention television media content identifier system may support any form of television broadcast and program, such as but not limited to, satellite, cable, broadcast spectrum, and broadband, as well as community, regional and national programming. In addition the present invention supports a variety of program content and related subject matter (such as, but not limited to, advertising, television shopping, talk show collateral and related products, services, music, video, movies as well as audio and video downloads, etc.) and associated formats.

Said present invention television media content identifier system may also comprise a content and/or object coding system. Said system may be architected under, but not limited to, a library records system, an information technology data archive and records system (including tagging systems), and/or combinations thereof. Each content and/or object classification code may be associated with other content or object classifications. For example, an advertising campaign that may comprise a number of advertisements in a variety of media outlets (radio, newspapers, magazines, etc.) may comprise a series of codes that are associated with, but not limited to the following: the user, reader, listener, viewer, the media provider, the station, the advertiser, the advertisement (there may be a number of codes associated with the advertisement), the sponsor, the sponsor's product and/or service, and the broadcast time slot. In addition, each content and/or object classification may be associated with other content or object classifications such as URLs and other advertising categories.

As previously noted in this filing application, an example of a user's use, out of a variety of uses, for said content and associated coding may occur when one is viewing a cooking show program. The user, utilizing a cell phone or other device with an input means and a wide area network communications capability or communications means that may interface with a device that supports a wide area network communications capability, may perform the following procedures and steps to review content of interest to said user at a more convenient time and/or instantaneously.

If the user is interested in reviewing said content and/or advertisements at a more convenient time, requesting product or service information, or performing a transaction or other interaction associated with said program content, the user, utilizing a basic cell phone, may input a telephone number or text number associated with the television station, channel and/or network (said number may be saved as an abbreviated dial number, such as "FoodNet", "ESPN" or "MTV"). Upon the input of said number, the user may insert a pause character, such as a ",", to input a content identifier code or series of character or code strings or ranges associated with said content of interest. Said code or character strings or ranges may represent a variety of content such as, but not limited to, the code associated with a commercial, book or a recipe that may be featured through the respective television program, as well as, as previously noted herein, a company or company product brand or ad slogan.

Alternatively, for the support of convenience and simplicity, the user, upon responding to content of interest, may speed dial, text or enunciate the number, address or name associated with the channel delivering said content, such as enunciating, for example, "FoodNet".

In another system embodiment, the user may not need to input the number associated with the broadcaster, for example, but not limited to such example, the broadcaster number or content identifier code for said broadcast may be transmitted as part of the broadcast frequency band signal. Upon the user's activation of a television or set top box adapted for said present invention system embodiment, said television/box, equipped with a wireless communications technology protocol such as, but not limited to, ZigBee or Bluetooth, may transmit the broadcast telephone number or code associated with the respective present invention gateway or server identifier for the station. Upon the receipt of said communication by the user's device, such as but not limited to, a cell phone equipped with the associated communications means to support said receipt, said receipt may activate a program that generates the call program for said device. The call program function may differ pending on the content received from the television/box, for example a content identifier code versus a telephone number.

In the instance of receiving the telephone number associated with personalizing and/or converting the broadcast content, said telephone number may be automatically dialed upon the user's depression of the call or send button or upon said user's voice command (pending on the capability of the calling device). In the instance of receiving said personalization/conversion content identifier code associated with the respective station program content, the cell phone device program may retrieve the general number for the present invention gateway or server and append said number with a pause character followed by the present invention system respective station identifier code. In the latter example, said function supports the present invention capability of calling one number and stringing the pertinent present invention content identifier code(s) associated with the user's interest/transaction. In either application, both transactions are captured.

The present invention system accounts for other means for accessing the appropriate port and/or operator (real or virtual) associated with the user's desired transaction(s) whether the user has a number or said identifier code associated with the broadcast media program. The present invention system also accounts for other means to transmit said program station code or telephone or text number associated with the present invention system server port supporting said television channel or program content to the user device/cell phone or remote control unit adapted for the present invention system. One of said means is via any one of the various embodiments of the present invention information and device controller.

Upon the call activation to the designated port and/or agent, a user, who for example, has taken action associated with an advertisement and/or other program content, may either reach a live operator associated with the respective ad or automatically tag and park the content associated with the respective broadcast via the present invention gateway or server, at minimum, the content can be parked at the user's personal web space and/or web site (there are a number of choices for easy and convenient minimum-step registration), or pending on the cell phone/portable device, the associated program or program-related content can be parked on the user's portable device for live interaction or post for later use, or the content may be automatically managed and/or disseminated per the user's profile without the need for user interaction, wherein said content may be posted to a device such as a present invention personalized content display that may be in a user's kitchen. As previously noted, said display may also automatically receive and display a desired recipe associated with said cooking program as a result of the user depressing the send or call button associated with the abbreviated/speed dial menu name, "FoodNet", based on said user's profile.

As previously stated herein, the present invention system also accounts for means to facilitate the personalization and engagement of said television program content through software and device enhancements, including television and cell phone or other user device enhancements adapted for the present invention system. Said enhancements will be accounted for further in the narrative. In addition, the present invention system accounts for broadcast content adapted with said user device(s) and/or any form of communications device to facilitate greater interaction and engagement such as instant polling and gaming to enhance the viewing experience, such as, but not limited to voting or predicting how a certain ending may happen while watching a show.

Temporal, Location, Situational and Search Parameters:

As previously described herein, the present invention system content identifiers also may support the personalization of content based on parameters, such as, but not limited to, temporal, location, situational and search criteria or factors.

Present invention embodiments that may comprise temporal content identifiers may range from a default time and date stamp parameter, such as utilizing the time and date stamp of the receipt of a call initiated from a cell phone and recorded on the respective present invention server program associated with capturing said stamp recording and the respective server port associated with said program to utilize as an identifier of a current running program (absent any other input), to special character content identifiers as an input parameter associated with capturing content associated with a block of time or an immediate instant, such as, for example, capturing content associated with the last ten minutes of a program or capturing and downloading a current-playing song over a radio program.

Present invention embodiments that may comprise location content identifiers may range from inputting GPS coordinates as part of a personalized content conversion to utilizing GPS outputs from a personalized content profile as inputs to a user, device and/or system invoked application. As noted in a previous example herein, a GPS coordinate content identifier set associated with the location of an event may be utilized in a search application to find certain types of restaurants in proximity to said event.

A system-invoked content identifier application may complement said preceding search application wherein said search may comprise at least a two-step process wherein the results of said search (wherein said search may account for a variety of criteria such as, but not limited prior clicks by said user), may be output to a personalized profile program that compares said search results against a list of preferences by said user, wherein said preferences may account for a variety of criteria and potential additional search requests, before said results are output. For example, an initial restaurant proximal location search may deliver results for a variety of restaurants, said result output may serve as input to said user profile program wherein said program may indicate a preference for Chinese food and/or a certain type of Chinese food wherein said program output may serve as input to a more refined search. It is to be appreciated that said present invention search and user profile program(s) may account for a variety of criteria, such as, but not limited to, hierarchical preferences, food preferences and menu searches, etc.

The present invention system system-invoked content identifier functions may support a variety of other present invention embodiments, such as, but not limited to, the present invention telematics system's information and device controller. For example, said controller's or web server 400's receipt of a traffic backup alert, wherein said alert may comprise a content identifier such as an estimated backup duration period, may trigger a system program for capturing said motor vehicle's GPS coordinates and searching for user preferences associated with a stopover in proximity to said content identifier GPS coordinates.

Present invention embodiments that may comprise situational content identifiers may range from, but not limited to, social networking applications to game parameters (some of which have been noted herin) to online auction updates to refined targeted advertising. An embodiment example of utilizing the present invention system content identifiers in a social setting may apply to a user at a night club or interested in going to said club performing a query or a posting associated with meeting a compatible person. In this example, said club may post or advertise a domain content identifier wherein said domain identifier may comprise sub identifiers, such as but not limited to, GPS coordinates, address, website URL(s), bands or entertainers, music, seating, promotions, a menu, etc. Said user may have a profile setting that characterizes said user's social profile and interests represented by a domain content identifier or content identifier string and/or range. If said user is contemplating going to said club, said user may choose to post his/her entire social profile or parts of said profile along with the respective content identifiers wherein on e f said identifiers may be a text message address (said address may be for said user or a screening or social networking service for said user) and said user may also post said club's domain content identifier and/or sub identifiers such as its address and/or GPS coordinates. Upon performing said posting, wherein said posting may take place at said present invention server, said server may perform a variety of functions, such as, but not limited to, for example, automatically (pending on said user's profile preferences with said present invention server) perform a search for like user profiles at said club or at like clubs via content identifiers or identifier ranges. Upon finding a match, said present invention server program may inform said user(s), and said server program may perform a variety of other functions, such as, but not limited to, interact with said users to support the downloading of user-permitted pictures and profile settings as well as query permissions for device addressing or numbers and user-to-user text messaging. The present invention content identifier system has a variety of other embodiments to support social networking applications which will be addressed in subsequent patent application filings.

Another embodiment of the present invention system situational content identifier may be utilized to support refined advertising. For example, upon a user's personalized content conversion of a television or radio program or a section of a newspaper, with said user's pre-selected permission, the present invention system media and personalized content conversion process may comprise a program match of said user's profile, wherein said profile may contain characteristics and/or statistics that support the placement of a sponsors product in place of said sponsor's product that may have been placed in said program or newspaper section. For example, upon said profile program match, the advertisement placement of a men's deodorant product in place of a women's deodorant or an acne treatment product may deliver more value to said sponsor and media provider. The present invention system has a variety of embodiments for supporting advertising, such as, but not limited to, more complex factors associated with user profiles and relevant brand, product, and service choice, placement and media.

Present invention embodiments that may comprise search content identifiers may range from, but not limited to, what has been previously disclosed herein to accounting for user search patterns and identifiers when placing advertisements associated with said user's personalized content. A present invention embodiment example of the latter point, but not limited to said example, is a user's personalized content conversion of a real estate advertisement wherein said conversion process accounts for the posting of advertisements on said user's personal web site page associated with said conversion process accounts for reviewing a history of said user's prior relevant and recent ad clicks and/or searches to account for relevant advertising. For example, if said user had performed searches and/or ad clicks associated with mortgages, then the real estate advertisement information posting may be accompanied with mortgage advertisements.

3) Personalized Content Management and Applications:

The present invention system accounts for a variety of functions and means for managing personalized content. Said personalized content management accounts for content conversion, creation, processing, storage, tagging, posting or parking, interaction, adaptation and dissemination. Much of these functions have been accounted for in what has been described herein.

Utilities associated with the present invention system that have not been covered in as much detail are associated with tagging and posting, interactive telephony, and adaptation applications.

The classification means for tagging and posting the present invention personalized content may range from privacy tagging and posting to community tagging and sharing. Said privacy tagging and posting may be initiated by the user and/or initiated and facilitated by the present invention system, for example the user may opt to keep the content identifier associated with, said converted content as the tag identity for said content. Said personalized content that the user may designate as content to be shared by (a) community(ies) may be tagged and posted to reflect the respective community(ies) participation. Part of said community participation may be, but not limited to, the posting of relevant advertising, blogging, wiki and text messaging fields, digital pictures and video and audio clips associated with said user's personalized content website or locker or gateway associated with said user's personalized content web site.

The present invention system accounts for a variety of telephonic interaction to facilitate personalized content use and management, some of which has been previously noted herein. Said telephonic interaction may range from said web server 400 functionality of informing a user of a certain message or amount of messages on answering apparatus 190 to personalized content conversions annotated with user comments to ordering take out or a pizza delivery based on converting a radio, television or print media advertisement.

The latter illustration may account for a user converting an advertisement for a pizza via his/her cell phone, text messaging device or other communications device by conveniently ordering said pizza by utilizing the present invention system's content identifiers and said telephonic enhancements. For example, said user, upon viewing or listening to an ad wherein said ad may incent the user to place an order within a certain time period, may place a call to, but not limited to, the present invention server port associated with said advertisement and/or media provider promoting said ad and/or said present invention system. Upon the capture of said user's ANI or device identifier, said server may generate a program to search for said user's profile to perform at least one of a variety of functions, such as, but not limited to, from crediting said user's account profile for placing another order to tabulating a rewards point promotion. One of said server program functions for recording said ANI and/or retrieving said profile is to confirm said user's location for a delivery and generating a program activation for a participating franchise locator. Pending on the user device, said user may also input or activate GPS coordinate inputs to facilitate the delivery at a designated location. Pending on the user's profile and/or sponsor options, said present invention server may perform a range of functions, such as, but not limited to, from initiating a call to said regional franchise and bridging said user on said call to performing an instant messaging interaction to text said order.

Said present invention server may also provide transaction services associated with said pizza ad, wherein said server program user profile may have a credit card and/or debit account that debits each transaction with the respective account card, pizza franchise loyalty credit, and/or record, etc. Said account record user profile may comprise limits and other security related features, as well as support a variety of marketing services.

The present invention system accounts for a variety of personalized content adaptations to support a variety of utilities for the end user and a number of other parties associated with said content. One of the primary utilities of said present invention system adaptation embodiments is to facilitate user engagement in creating content out of a variety of media and other sources and facilitate the procurement of gifts, products and services.

4) Networked Device Personalized Content Functions and Adaptations:

The user device enhancements adapted for said present invention system in the embodiments of, but are not limited to said embodiments, cell phones, portable communications devices and/or device adjuncts, and/or communications and/or console devices are intended to facilitate the convenience and frequency of use of said system.

Said enhancements are to primarily support functions such as, but not limited to, personalized content conversion, creation, processing, storage, tagging, posting or parking, interaction, adaptation and dissemination.

Said enhancements may be provided through software and device configurations that may comprise communications technologies or protocols, device adjuncts, and the associated electronics, memory, processing and power means.

In a present invention device embodiment with software, said software may reside in a menu and associated program that may comprise present invention server addresses or port telephone or text numbers/characters, content identifier code tables, local area networked device address tables as well as command tables that may be associated with the present invention system components such as, but not limited to, devices, web server system, content or media appliances (e.g. radio, television, etc.) and/or combinations thereof.

One example of a software and device/server/appliance integration program may be in present invention system embodiments that support a personalized radio media application. Said system embodiments may utilize the enhanced radio appliance noted in the radio media section, wherein said appliance and said cell phone or portable device may comprise a device to device communications means, such as, but not limited to, Bluetooth or ZigBee. In addition or alternatively, said cell phone/portable device may comprise OLED encapsulated button keypads wherein said keypads may display a series of station names or call signs (for example, but not limited to said example, "WEEI", "WFAN", "WCBS", etc.) when said device is in a certain mode such as a personalized content conversion mode. In yet another alternative, said conversion mode may display a listing of said call signs in alphabetical or most frequently used order, wherein upon the user's interest in engaging a conversion, said conversion may be performed by either voice messaging or scrolling said device cursor over said entry and depressing said call sign. In yet another embodiment of the functionality associated with said system, said OLED keypads or touchscreen may display certain functions when said device may be in an interactive mode with said server in performing said personalized media enhancement functions. Said functions may also display interactive sequences via touch screen frames/commands.

Said functionality may also be adapted and/or automatically supported for television-appliance as well as server-based entertainment system interaction and functionality. It is to be appreciated that said device functions such as, but not limited to, tagging, conversion, dissemination and management may be generated at the device or server level or combinations thereof. Said device functionality, via a web server or IP addressing, may also extend to remote desktop functions, such as calling up and interacting with an email distribution list for the purpose of adding certain email list's addresses to add as a server or portable device personalized content dissemination listing/distribution, The present invention system comprises a variety of other enhanced devices and software enhancements to facilitate the utility of personalizing content from a variety of media and other sources.

5) Networked Appliances for Facilitating the Use of Personalized Content:

As previously described herein, the present invention system also comprises a variety of radio and television device enhancements, wherein the intent of said enhancements is to facilitate the convenience and frequency of use of said system. As illustrated throughout the filing application herein, said enhancements are to primarily support a variety of content dissemination and conversion functions.

Said enhancements may be provided through software and device configurations that may comprise communications technologies or protocols, device adjuncts (such as, but not limited to, set top boxes), and the associated electronics, memory, processing and power means.

Pricing Methods:

The present invention may comprise a variety of pricing methods that support widespread acceptance for personalizing content and supports a variety of pricing options to purchase system hardware and software components and the receipt of certain media content, from subscription-based plans to tiered services to one-time purchase prices of hardto combinations thereof.

Said tiered services may comprise a selection of personalized content and, for example, a medical/health information products and access service wherein, for example, a family member, with appropriate permissions may follow up on medication regimen compliance or health metrics associated with a relation wherein said relation or family member may purchase present invention (as noted in previous patent filing applications submitted by the inventor) medical and health products, devices and application software that may be bundled or added to the personalized content service. Another subscription service may comprise an alert, notification, and/or intervention embodiment wherein, for example, a family member may be a primary recipient of an alert message upon a trigger event, wherein said event may be generated by , but not limited to, an indoor temperature reading being in an out of range condition. Another service adapted for the present invention system may comprise both of the preceding embodiments. Another present pricing method associated with a present invention system service embodiement may comprise the preceding with a monthly subscription to a home security and alert/messaging service comprising the embodiments described herein. The preceding may also be bundled with a home environmental information and monitoring service offering.

Said subscriber service may deliver discounts off of certain equipment and/or subscription packages pending on the amount of family/constituent member subscribers and/or amount of services associated with said subscribers.

Said subscription service and/or associated equipment may also be discounted for the end user by offering it to the end user as part of a package service bundle that may include communications and/or cable provider offerings. Said subscription service and/or associated equipment may also provide and promote a certain amount of proceeds for charitable causes such as, but not limited to, medical research, non-profit hospitals and safety or local safety and rescue organizations.

As previously noted, many of the present invention system embodiments may be sold separately; however, they may also be priced as part of other service bundles. For example, a present invention multi-utility enclosure in a certain lighting fixture embodiment, as depicted in FIG. 8, which may serve as a communications hub for a variety of, for example, home networked products, may be available at a variety of pricing points based on the type and/or quantity of subscription services a user may purchase. The linkage of said lighting and communications fixture to such services may be where said services may comprise, for example, broadband communications services wherein said fixture may comprise the embodiments described herein that utilize or interact with said package offerings.

The present invention embodiments may also utilize pricing, discounting and credit methods based on present invention services that may utilize a marketing database in conjunction with promotional transactions, such as, but not limited to, coupon transactions.

The present invention may comprise other pricing methods, such as, but not limited to, paid subscription information and/or database services for industry, academic and government entities who desire various marketing and/or demographic data under appropriate individual consent and state and federal guidelines.

Another preferable pricing embodiment method is charging for a variety of advertising and marketing mediums and services that are targeted at present invention user segments wherein said mediums may be or be comprised of, but not limited to the following: electronic and/or direct mail coupons, search engine services, banners, pop-ups, messaging, games, interactive and/or direct mail questionnaires, and/or electronic and/or direct mail messaging and newsletters. Said advertising and marketing mediums complement the variety of present invention embodiments described herein such as the, variety of personalized content multi-media conversions, search service offerings, electronic transactions, including, but not limited to, a variety of electronic coupon embodiments that are all adapted for the present invention system, as well as other embodiments as described in previous filing applications submitted by the inventor.

The advertising and pricing methods adapted for the present invention system described herein provide the means, in separate and/or combination form, to support the variety of uses of and for said services, personalized content, and advertising media in conjunction with said services, as well as the means to support the widespread acceptance of said present invention system embodiments.

The sensors, processors, memory, circuitry, electrical components, housings, fittings and bonding and securing means for the components described herein are comprised of conventional materials, designs and configurations, except for the designs associated with the present invention embodiments, as well as other evolving technology designs, fabrications and configurations as described herein.

It is to be appreciated that the software, memory, processing, communications, powering technologies and means, as well as their uses thereof for supporting the personalized content utilities described herein and contemplated by one skilled in the art may evolve or be modified wherein said modification may support other configurations or protocol standards that may also be adapted with the present invention system and its applications and be construed as present invention embodiments when utilized, integrated or comprised with or in said present invention apparatuses, devices, systems, adjuncts and/or software. For example, network protocols such as, but not limited to, ZigBee, Wi Fi, Bluetooth, UWB, X10, Zensys, HomePlug™ and Ethernet compatible network protocols, and respective offshoots of said protocols apply to the preceding statement they relate to said present invention embodiments. In addition, the Wi Fi standards associated with or supporting at least one or more of the present invention embodiments described herein are, but not limited to, the following: 802.11g; 802.11b; 802.11a; and 802.11n (as well as MIMO and MIMO-based communications technologies). Portions of the present invention system, such as, for example, information and device controllers 120, 220, 240 and 290, and/or router and/or other networked communications embodiments may comprise or be connected to Wide Area Network communications interfaces to, but not limited to, one or more of the following: Wi Max, broadband, DSL, high-speed cable, satellite television or radio, broadcast television or radio, cable television, (and)/or dial-up networks.

It is to be appreciated that the terms herein of processor or microcontroller may represent one or more said processors or microcontrollers, which may be in a standalone or integrated configuration, such as, but not limited to, an integrated chip set or data bus architecture. Said processor or microcontroller range from a low end to a high end to, as previously noted, a development design that may be adapted to the present invention system, such as but not limited to, a Cell (code-name) chip set, which is being developed by IBM, Sony and Toshiba. Said higher end chip sets and associated present invention configurations may support, but are not limited to supporting, the following: comprehensive video (including from high end image search and video surveillance to high definition broadcast and streaming wireless or broadband video), audio, entertainment, security, environmental, medical and/or health systems that may be adapted for or with the various present invention mode, controller, server, device, application software, and/or peripheral apparatus embodiments, The term, server, as referenced herein, may also represent one or more said server or controller devices.

Most of the present invention embodiments may be manufactured of commonly available materials. The electrical, processor and communications device circuitry and electrical elements employed are commonly available and known to one skilled in the art, although not in the configurations and arrangements of the present invention.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A system comprising:
a media appliance for receiving content from at least one form of media and presenting said content to the user, said media appliance being selected from the group consisting of a television media appliance, a radio media appliance, and a web media appliance;
at least one communications device configured to initiate distribution of related content based on input from the user including at least one code associated with said related content, wherein said code is associated with said related content as a content identifier that is configured to identify said related content; and
at least one server, different from the media appliance and the communications device, configured to recognize said code transmitted from said communications device, and process said code based on a server program that determines said related content based at least in part on said code, wherein said server program is configured to:
search for a user profile associated with an identifier of said communications device in a user profile database, wherein a user profile is found in the user profile database if there is a match between a communications device identifier and information stored in the user profile database,
form a collection of said related content based only on said code in response to said searching for a user profile resulting in no user profile being found, or based on said code and said user profile in response to said searching for a user profile resulting in a user profile being found, wherein said collection of related content formed by said server program includes at least a portion of the content that is presented to the user from said media appliance,
process said user profile to execute instructions for handling preferences associated with said related content in response to said searching for a user profile resulting in a user profile being found, wherein said instructions include instructions for retrieving a designated digital media version of said related content, and
distribute said collection of related content to multiple destinations that include at least one destination different from said media appliance, wherein said distributing is based at least in part on at least one profile preference that is included in said user profile.

2. The system of claim 1 wherein said media includes at least one of audio media or visual media.

3. The system of claim 2 wherein said input from the user including at least one code is at least one input selected from the group consisting of submitting categorized content, submitting and categorizing content, submitting pre-defined codes associated with content, moving content from a general medium to a personalized medium, and combinations thereof.

4. The system of claim 3 wherein said code associated with said related content is at least one of a user-generated code, a code generated by a web community, a code revised by a web community, or a combination thereof.

5. The system of claim 3 wherein said code associated with said related content is at least one of: (a) associated with at least one of an ad slogan, a company name, a product name, a company brand, and combinations thereof; and (b) is at least one of an ad slogan, a company name, a product name, a company brand, and combinations thereof.

6. The system of claim 2 wherein said related content includes advertising.

7. The system of claim 2 wherein said code is at least one of: (a) associated with at least one of an ad slogan, a company name, a product name, a company brand, and combinations thereof, and (b) is at least one of an ad slogan, a company name, a product name, a company brand, and combinations thereof.

8. The system of claim 1 wherein said input from the user including at least one code is at least one input selected from the group consisting of submitting categorized content, submitting and categorizing content, submitting pre-defined codes associated with content, moving content from a general medium to a personalized medium, and combinations thereof.

9. The system of claim 8 wherein said code associated with said related content is at least one of a user-generated code, a code generated by a web community, a code revised by a web community, or a combination thereof.

10. The system of claim 8 wherein said code associated with said related content is at least one of: (a) associated with at least one of an ad slogan, a company name, a product name, a company brand, and combinations thereof; and (b) is at least one of an ad slogan, a company name, a product name, a company brand, and combinations thereof.

11. The system of claim 1 wherein said code associated with said related content is at least one of a user-generated code, a code generated by a web community, a code revised by a web community, or a combination thereof.

12. The system of claim 1 wherein said code associated with said related content is at least one of: (a) associated with at least one of an ad slogan, a company name, a product name, a company brand, and combinations thereof, and (b) is at least one of an ad slogan, a company name, a product name, a company brand, and combinations thereof.

13. The system of claim 1 wherein said processing of said code associated with said related content by said server is selected from a group consisting of at least one retrieval function, at least one output function, an interactive session with said user, an interactive session with at least one user and combinations thereof.

14. The system of claim 13 wherein said interactive session with said user has a functional means that is selected from the group consisting of user input through the communications device of said user, user voice input through the communications device of said user, at least one server program associated with said user profile, at least one server program associated with said media provider, and combinations thereof.

15. The system of claim 13 wherein said related content includes advertising.

16. The system of claim 1 wherein said user profile includes content that is used in at least one of one search function and at least one additional search function wherein said additional search function is based on prior search output comparisons with at least one of user profile preference entries, community profile preference entries, system profile update entries, and combinations thereof.

17. The system of claim 16 wherein said search function comprises output that includes advertising relevant to said search function content.

18. The system of claim 1 wherein said related content includes advertising.

19. The system of claim 1 wherein said code associated with said related content is transmitted for the use of television media wherein said code is associated with said television media content and is:
(a) at least one of visually displayed, audibly announced, and communicated to a local area networked device via a communications link, from a unit that is selected from the group consisting of a television appliance, a device connected to a television appliance, a server, a local network device connected to a server, and combinations thereof, wherein said selected unit from said group is connected to a television program content and code software program and communications link associated with at least one of a television network and a television service provider that support(s) the delivery of said program content to at least one of said unit that is selected from said group consisting of a television appliance, a server, a local network device connected to a server, and combinations thereof and wherein at least one of said television network and said television service provider also support(s) the delivery of said code associated with said program content to at least one of said selected unit from said group;
b) communicated to a wide area networked device wherein said device comprises a communications interface to, at least one of, a user, a unit selected from the group consisting of a television appliance, a device connected to a television appliance, a server, a local network device connected to a server, and combinations thereof, and a device capable of communicating with said selected unit from said group, wherein said associated program content code is delivered from a television program content and code software program and communications link associated with at least one of a television network and television service provider that support(s) the delivery of said program content associated with said code to at least one of said unit from said group; and
c) communicated to a web server that comprises sufficient hardware and software to receive said associated program content code and support a software program that reads said code and provides a processing and output function associated with certain predefined code data, wherein at least one output function is at least one of retrieving, copying and storing said associated television program content, and retrieving and storing a copy of said associated television program content.

20. The system of claim 1 wherein said code is transmitted for the use of radio media wherein said code is associated with said radio media content and is:
(a) at least one of visually displayed, audibly announced, and communicated to a local area networked device via a communications link, from a unit that is selected from the group consisting of a radio appliance, a device connected to a radio appliance, a server, a local network device connected to a server, and combinations thereof, wherein said selected unit from said group is connected to a radio program content and code software program and communications link associated with at least one of a radio network and radio service provider that supports the delivery of said program content to at least one of said unit that is selected from said group consisting of a radio appliance, a device connected to a radio appliance, a server, a local network device connected to a server, and combinations thereof, and wherein at least one of said radio network and said radio service provider also support(s) the delivery of said code associated with said program content to at least one of said selected unit from said group;
b) communicated to a wide area networked device wherein said device comprises a communications interface to, at least one of, a user, a unit selected from the group consisting of a radio appliance, a device connected to a radio appliance, a server, a local network device connected to a server, and combinations thereof, and a device capable of communicating with said selected unit from said group, wherein said associated program content code is delivered from a radio program content and code software program and communications link associated with at least one of a radio network and radio service provider that support(s) the delivery of said program content associated with said code to at least one of said unit from said group; and
c) communicated to a web server that comprises sufficient hardware and software to receive said associated program content code and support a software program that reads said code and provides a processing and output function associated with certain predefined code data, wherein at least one output function is at least one of retrieving, copying and storing said associated radio program content, and retrieving and storing a copy of said associated radio program content.

21. The system of claim 1 wherein said server program provides output associated with said related content that is downloaded to a device selected from the group consisting of a cell phone, a messaging device, a smartphone, a PDA, a networked display, a server, a media appliance, and combinations thereof.

22. The system of claim 21 wherein said output includes advertising.

23. The system of claim 22, wherein said advertising includes at least one incentive for the user to convert said advertising.

24. The system of claim 21 wherein the output associated with said related content is selected from the group consisting of the purchase of a product or service, the tagging of said content, the storage of said content, a request for additional content, and combinations thereof.

25. The system of claim 21 wherein said output is a voice call, a conference call, a call transfer, a voice message, and a voice memo.

26. The system of claim 21 wherein said output includes at least one incentive.

27. The system of claim 26, wherein the incentive is selected from the group consisting of an electronic coupon, loyalty program credit, rewards points, donation credit, advertising information, and combinations thereof.

28. The system of claim 1 wherein said related content includes at least one selected from the group consisting of motor vehicle system data, GPS system data, device indication of presence of said communications device in a location, a combined subsystem of data that includes GPS system data and other source content data, and combinations thereof.

29. The system of claim 1 wherein said related content is from a plurality of sources and said plurality of sources is arranged in priority tiers having at least two tiers and wherein at least one of said at least two tiers automatically overrides any other tier when predetermined priority data is processed and wherein said priority data is selected from the group consisting of emergency data, weather data, calendar data, optional calendar data, advertising data, and sports data.

30. The system of claim 29 wherein said system includes user selection of tier priorities.

31. The system of claim 1 wherein said related content includes data selected from the group consisting of a thermostat system, an irrigation system, a security system, caller identification system and a voice message system.

32. The system of claim 1 wherein said related content includes data selected from the group consisting of text messages, voice mail, email, blog data, visual output data, audible output data, and online auction status.

33. The system of claim 1 wherein the said related content data presentation is managed from a resource selected from the group consisting of said device input, a separate cell phone input, a remote input, a server input, and combinations thereof.

34. The system of claim 1 that further includes at least one communications link with said communications device.

35. The system of claim 1, wherein said communications device is selected from the group consisting of a wireless cellular device, a messaging device, a wireless device, a wired device, a set top box, and combinations thereof.

36. The system of claim 1, wherein said code is selected from the group consisting of a telephone number, a server program address, at least one set of characters, a range of characters, displayed text, a bar code, a wireless transmitted code, a RFID code, an announced code, and combinations thereof.

37. The system of claim 1, wherein said code is delivered with said content presented to the user by said media appliance.

38. The system of claim 37, wherein said code is inputted into said communications device by said user.

39. The system of claim 37, wherein said input from the user includes at least one instruction associated with management of said code delivered with said content.

40. The system of claim 1, wherein said code is inputted into said communications device by said user.

41. The system of claim 1, wherein said server is further configured to recognize a device identifier associated with said communications device.

42. The system of claim 41, wherein said device identifier comprises an originating telephone number associated with said communications device.

43. The system of claim 1, wherein said code is transmitted from said communications device after being received from an interface associated with said communications device, or a device networked with said communications device.

44. The system of claim 43, wherein said interface associated with said communications device comprises an interface component that receives at least a portion of said content in audible form.

45. The system of claim 1, wherein said server further processes said content based on at least one parameter selected from the group consisting of a temporal parameter, a location parameter, a situational parameter, a search parameter, and combinations thereof.

46. The system of claim 45, wherein the situational parameter is selected from the group consisting of a social networking application parameter, a game parameter, a targeted advertising parameter, an online auction update parameter, and combinations thereof.

47. The system of claim 45 wherein said parameter is associated with at least one of advertising or marketing services.

48. The system of claim 1, wherein the function is selected from the group consisting of crediting said user profile for placing an order, and tabulating a rewards point promotion, and combinations thereof.

49. The system of claim 1, wherein said server program is configured to capture said communication device's GPS coordinates and search for user preferences associated with a stopover in proximity to GPS coordinates associated with a content identifier of said content.

50. The system of claim 1 wherein said multiple destinations include a portal.

51. The system of claim 50, wherein said portal includes at least one of a GPS system portal, or a web site portal.

52. The system of claim 1 wherein said capturing or distributing of said server program is based at least in part on a program mode selected from multiple possible program modes.

53. The system of claim 1 wherein said server program is associated with at least one of advertising or marketing services.

54. The system of claim 1 wherein said code is associated with at least one of advertising or marketing services.

55. The system of claim 1 wherein said user profile is associated with at least one of advertising or marketing services.

56. The system of claim 1 wherein said multiple destinations include a software application on at least one of a communications device, a cell phone, a messaging device, a smartphone, a PDA, a server, a media appliance, or combinations thereof.

57. The system of claim 1, wherein said server program generates a default user profile in response to said searching for a user profile resulting in no user profile being found, and distributing said collection of related content to multiple destinations is based at least in part on a default program associated with said default user profile.

58. The system of claim 1, wherein said server program is configured to automatically tag and park said collection of related content in association with said communications device.

59. A method comprising:

receiving content from at least one form of media at a media appliance and presenting said content to the user, said media appliance being selected from the group consisting of a television media appliance, a radio media appliance, and a web media appliance;

initiating distribution of related content at a communications device based on input from the user including at least one code associated with said related content, wherein said code is associated with said related content as a content identifier that is configured to identify said related content;

transmitting said code from said communications device to at least one server, different from the media appliance and the communications device;

recognizing said code transmitted from said communications device, and processing said code at said server based on a server program that determines said related content based at least in part on said code, wherein said server program is configured to:

search for a user profile associated with an identifier of said communications device in a user profile database, wherein a user profile is found in the user profile database if there is a match between a communications device identifier and information stored in the user profile database, and form a collection of said related content based only on said code in response to said searching for a user profile resulting in no user profile being found, or based on said code and said user profile in response to said searching for a user profile resulting in a user profile being found, wherein said collection of related content formed by said server program includes at least a portion of the content that is presented to the user from said media appliance, process said user profile to execute instructions for handling preferences associated with said related content in response to said searching for a user profile resulting in a user profile being found, wherein said instructions include instructions for retrieving a designated digital media version of said related content, and distribute said collection of related content to multiple destinations that include at least one destination different from said media appliance, wherein said distributing is based at least in part on at least one profile preference that is included in said user profile.

60. The method of claim 59 wherein said input from the user including at least one code is at least one input selected from the group consisting of submitting categorized content, submitting and categorizing content, submitting pre-defined codes associated with content, moving content from a general medium to a personalized medium, and combinations thereof.

61. The method of claim 60 wherein said code associated with said related content is at least one of a user-generated code, a code generated by a web community, a code revised by a web community, or a combination thereof.

62. The method of claim 60 wherein said code associated with said related content is at least one of: (a) associated with at least one of an ad slogan, a company name, a product name, a company brand, and combinations thereof; and (b) is at least one of an ad slogan, a company name, a product name, a company brand, and combinations thereof.

* * * * *